(12) United States Patent
Velez Cano et al.

(10) Patent No.: US 12,483,174 B1
(45) Date of Patent: Nov. 25, 2025

(54) VARIABLE POLE SYSTEM FOR ELECTRIC MOTORS

(71) Applicant: Quantum Aerospace Technology L.L.C., Fair Lawn, NJ (US)

(72) Inventors: Nestor Adrian Velez Cano, Fair Lawn, NJ (US); Deivin Steven Castano Luna, Fair Lawn, NJ (US); Oscar Andres Puerta Hoyos, Fair Lawn, NJ (US)

(73) Assignee: Quantum Aerospace Technology L.L.C, Fair Lawn, NJ (US)

( * ) Notice: Subject to any disclaimer, the term of this patent is extended or adjusted under 35 U.S.C. 154(b) by 0 days.

(21) Appl. No.: 19/034,375

(22) Filed: Jan. 22, 2025

Related U.S. Application Data

(63) Continuation of application No. 18/671,788, filed on May 22, 2024, now Pat. No. 12,212,261.

(51) Int. Cl.
*H02P 25/20* (2006.01)
*H02K 3/28* (2006.01)
*H02K 17/14* (2006.01)
*H02K 17/16* (2006.01)

(52) U.S. Cl.
CPC ............ *H02P 25/20* (2013.01); *H02K 3/28* (2013.01); *H02K 17/14* (2013.01); *H02K 17/168* (2023.05); *H02K 2203/15* (2013.01); *H02K 2213/09* (2013.01); *H02P 2207/01* (2013.01)

(58) Field of Classification Search
CPC ....... H02P 25/20; H02P 2207/01; H02K 3/28; H02K 17/14; H02K 17/168; H02K 2203/15; H02K 2213/09
USPC ................................ 318/773, 772, 767, 727
See application file for complete search history.

(56) References Cited

U.S. PATENT DOCUMENTS

| | | | |
|---|---|---|---|
| 5,754,024 A | 5/1998 | Sugiyama | |
| 6,008,616 A * | 12/1999 | Nagayama | B60L 15/025 |
| | | | 318/773 |
| 9,559,574 B2 | 1/2017 | Hajje et al. | |
| 10,312,846 B2 * | 6/2019 | Hidaka | H02K 3/28 |
| 10,951,150 B2 | 3/2021 | Mao et al. | |
| 11,038,456 B2 * | 6/2021 | Ishida | H02P 21/22 |

\* cited by examiner

*Primary Examiner* — David Luo
(74) *Attorney, Agent, or Firm* — Knobbe, Martens, Olson & Bear, LLP

(57) ABSTRACT

Electric motors having variable poles are disclosed herein. In one aspect, an electric motor includes a stator including a plurality of magnetic conductive wires. The magnetic conductive wires are configured to form a plurality of poles. The electric motor further includes a rotor configured to rotate in response to a magnetic field generated by the poles of the stator and an electronic control module electrically coupled to the magnetic conductive wires. The electronic control module is configured to adjust a configuration of the poles of the stator.

18 Claims, 102 Drawing Sheets

SWITCHING PANEL SLOTS 1-6

SWITCHING PANEL SLOTS 7-12

SWITCHING PANEL SLOTS 13-18

SWITCHING PANEL SLOTS 19-24

SWITCHING PANEL SLOTS 25-30

SWITCHING PANEL SLOTS 31-36

SWITCHING PANEL SLOTS 37-42

SWITCHING PANEL SLOTS 43-48

SWITCHING PANEL SLOTS 49-54

SWITCHING PANEL SLOTS 55-60

SWITCHING PANEL SLOTS 61-66

SWITCHING PANEL SLOTS 67-72

SWITCHING PANEL SLOTS 1-6
24 POLES CONFIGURATION

SWITCHING PANEL SLOTS 13-18
24 POLES CONFIGURATION

SWITCHING PANEL SLOTS 19-24
24 POLES CONFIGURATION

U ———————
V — — — —
W —‥—‥—‥

SWITCHING PANEL SLOTS 25-30
24 POLES CONFIGURATION

SWITCHING PANEL SLOTS 43-48
24 POLES CONFIGURATION

U ———————
V — — — —
W — ·· — ·· —

SWITCHING PANEL SLOTS 55-60
24 POLES CONFIGURATION

SWITCHING PANEL SLOTS 61-66
24 POLES CONFIGURATION

SWITCHING PANEL SLOTS 67-72
24 POLES CONFIGURATION

SWITCHING PANEL SLOTS 13-18
12 POLES CONFIGURATION

SWITCHING PANEL SLOTS 49-54
12 POLES CONFIGURATION

SWITCHING PANEL SLOTS 55-60
12 POLES CONFIGURATION

SWITCHING PANEL SLOTS 67-72
12 POLES CONFIGURATION

SWITCHING PANEL SLOTS 13-18
8 POLES CONFIGURATION

SWITCHING PANEL SLOTS 19-24
8 POLES CONFIGURATION

U ———————
V — — — — —
W —‥—‥—‥—

SWITCHING PANEL SLOTS 31-36
8 POLES CONFIGURATION

SWITCHING PANEL SLOTS 49-54
8 POLES CONFIGURATION

SWITCHING PANEL SLOTS 1-6
6 POLES CONFIGURATION

SWITCHING PANEL SLOTS 7-12
6 POLES CONFIGURATION

SWITCHING PANEL SLOTS 25-30
6 POLES CONFIGURATION

SWITCHING PANEL SLOTS 37-42
6 POLES CONFIGURATION

SWITCHING PANEL SLOTS 43-48
6 POLES CONFIGURATION

SWITCHING PANEL SLOTS 49-54
6 POLES CONFIGURATION

SWITCHING PANEL SLOTS 55-60
6 POLES CONFIGURATION

SWITCHING PANEL SLOTS 7-12
4 POLES CONFIGURATION

SWITCHING PANEL SLOTS 31-36
4 POLES CONFIGURATION

SWITCHING PANEL SLOTS 49-54
4 POLES CONFIGURATION

VARIABLE POLE SYSTEM FOR ELECTRIC MOTORS

INCORPORATION BY REFERENCE TO ANY PRIORITY APPLICATIONS

This application is a continuation of U.S. Non-Provisional patent application Ser. No. 18/671,788, filed May 22, 2024. Moreover, any and all applications for which a foreign or domestic priority claim is identified in the Application Data Sheet as filed with the present application are hereby incorporated by reference under 37 CFR 1.57.

BACKGROUND

Field

The present disclosure relates generally to electric motors, and in particular, to electric motor having variable poles.

Description of the Related Technology

Electric motors have a large number of different applications, including automotive, drones, aerospace, rovers, among many others. Electric motors can efficiently convert electrical energy into mechanical energy. Many electric motors generate torque by applying an electric current to a wire winding which interacts with a magnetic field.

SUMMARY

The innovations described in the claims each have several aspects, no single one of which is solely responsible for its desirable attributes. Without limiting the scope of the claims, some prominent features of this disclosure will now be briefly described.

One aspect of this disclosure is an electric motor including: a stator including a plurality of magnetic conductive wires, the magnetic conductive wires configured to form a plurality of poles; a rotor configured to rotate in response to a magnetic field generated by the plurality of poles; and an electronic control module electrically coupled to the magnetic conductive wires, the electronic control module configured to adjust a configuration of the plurality of poles.

In some embodiments, the electronic control module is further configured to adjust a number of poles of the plurality of poles.

In some embodiments, the electronic control module includes: an electronic switch electrically coupled to each of the magnetic conductive wires; and a controller configured to control the electronic switch to adjust the configuration of the plurality of poles.

In some embodiments, each of the magnetic conductive wires has two connectors; the electronic switch is electrically coupled to each of the two connectors; and the electronic switch is configured to connect the magnetic conductive wires together to adjust a number of poles of the plurality of poles.

In some embodiments, the electric motor further includes a plurality of electrical wires configured to electrically connect each of the two connectors to the electronic switch; and a plurality of electrical cables, each electrical cable of the plurality of electrical cables including a subset of the plurality of electrical wires.

In some embodiments, the electronic control module is further configured to: connect the magnetic conductive wires to form a plurality of separate paths, each path of the plurality of separate paths being connected between a first voltage and a second voltage provided by the electronic control module.

In some embodiments, the electric control module is further configured to: connect the magnetic conductive wires such that each path of the plurality of paths is interleaved with at least two adjacent magnetic conductive wires of the magnetic conductive wires that have a same polarity.

In some embodiments, the electronic control module is further configured to: receive an input indicative of a requested torque of the electric motor, wherein adjusting the configuration of the plurality of poles includes changing a number of poles of the plurality of poles to increase an efficiency of the electric motor for the requested torque.

In some embodiments, the electronic control module is further configured to: determining that the requested torque is outside of a current band of efficiency of the electric motor associated with the number of poles of the plurality of poles, wherein adjusting the configuration of the plurality of poles is in response to determining that the requested torque is outside of the current band of efficiency.

In some embodiments, the rotor includes a squirrel cage configured to provide a static magnetic field, the plurality of magnetic conductive wires are configured to be connected to an alternating current power source to produce the magnetic field as a rotating magnetic field, and interaction between the rotating magnetic field and the static magnetic field results in a torque in the rotor.

In some embodiments, the electric motor further includes one or more sensors configured to monitor a parameter of the electric motor, wherein adjusting the configuration of the plurality of poles is based at least in part on the monitored parameter of the electric motor.

Another aspect is a method of controlling an electric motor, including: receiving, at an electronic control module of the electric motor, a control signal; adjusting, using the electronic control module, a configuration of a plurality of poles of a stator of the electric motor based on the control signal, the stator including a plurality of magnetic conductive wires configured to form the plurality of poles; and providing an alternating current power source to the plurality of magnetic conductive wires to generate a magnetic field that causes a rotor of the electric motor to produce torque.

In some embodiments, adjusting the configuration of the plurality of poles includes adjust a number of poles of the plurality of poles.

In some embodiments, the method further includes: coupling an electronic switch of the electric control module to each wire of the plurality of magnetic conductive wires; and controlling, using a controller of the electric control module, the electronic switch to adjust the configuration of the plurality of poles.

In some embodiments, each wire of the plurality of magnetic conductive wires has two connectors; the electronic switch is electrically coupled to each of the two connectors; and the method further includes connecting, using the electronic switch, the plurality of magnetic conductive wires together to adjust a number of poles of the plurality of poles.

In some embodiments, the method further includes connecting, using the electronic control module, the plurality of magnetic conductive wires to form a plurality of separate paths; and electrically connecting each path of the plurality of separate paths between a first voltage and a second voltage provided by the electronic control module.

In some embodiments, the method further includes connecting, using the electronic control module, the plurality of magnetic conductive wires such that each path is interleaved with at least two adjacent magnetic conductive wires of the plurality of magnetic conductive wires that have a same polarity.

In some embodiments, the method further includes receiving, at the electronic control module, an input indicative of a requested torque of the electric motor; and adjusting, using the electronic control module, a number of poles of the plurality of poles to increase an efficiency of the electric motor for the requested torque.

In some embodiments, the method further includes determining, using the electronic control module, that the requested torque is outside of a current band of efficiency of the electric motor associated with the number of poles, wherein adjusting the number of poles is in response to determining that the requested torque is outside of the current band of efficiency.

In some embodiments, the method further includes monitoring, using one or more sensors, a parameter of the electric motor; and wherein adjusting the configuration of the plurality of poles is at least in part based on the monitored parameter.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
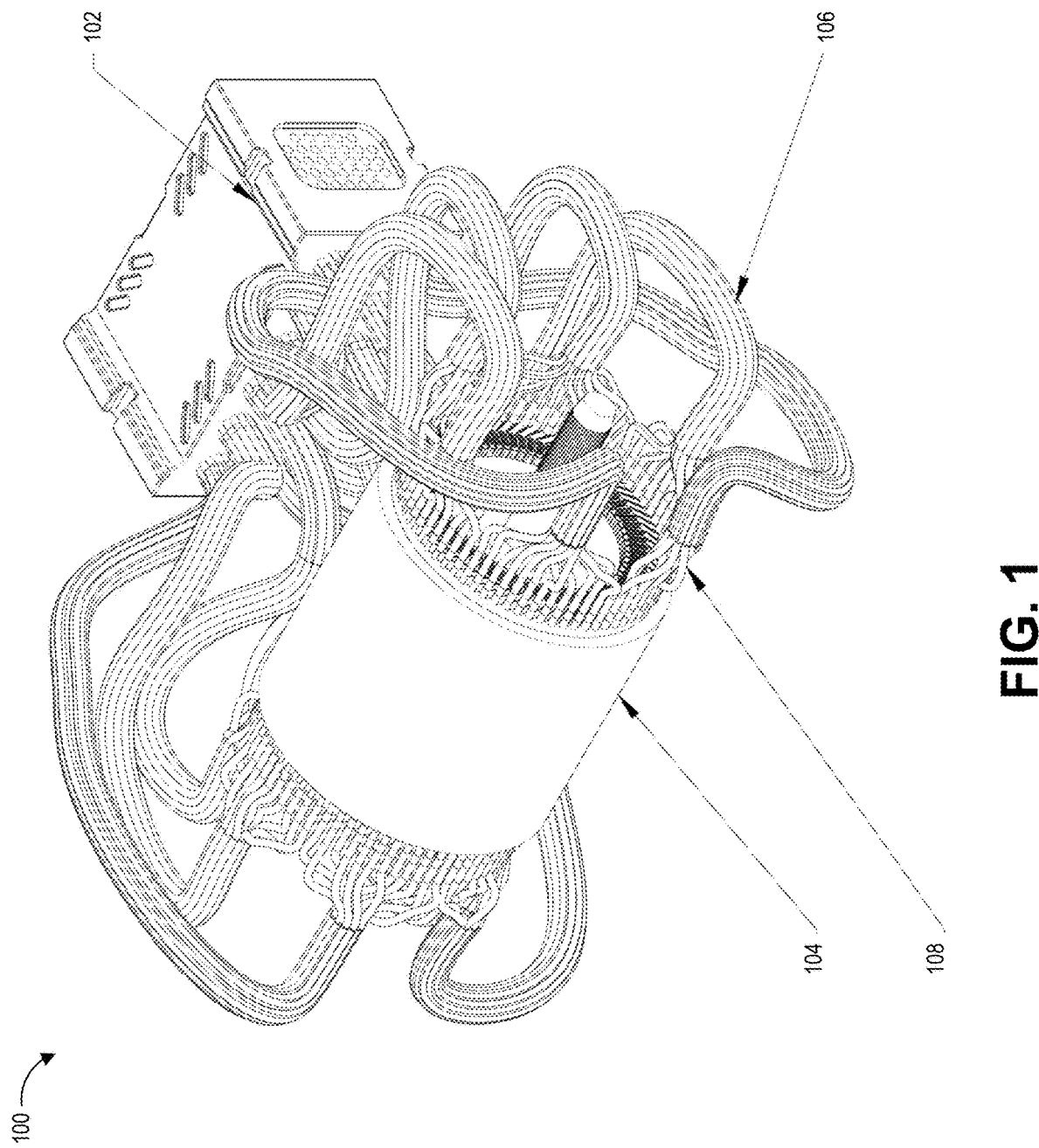
FIG. 1 illustrates an electric motor in accordance with aspects of this disclosure.

Electric motors are useful in a large variety of industries, including, for example: automotive and transportation, maritime industry, power generation, manufacturing and heavy industry, heating, ventilation, and air conditioning (HVAC) and refrigeration, mining industry, construction, agriculture, water and wastewater treatment, aerospace and drone industry, home appliances and consumer electronics, rail sector, etc. Each industry may have many different applications for electric motors, examples of which are provided below.

In the automotive and transportation industries, electric motors can be used in electric, hybrid, and hydrogen vehicles; heavy and freight vehicles; public transport systems' and urban mobility vehicles.

Within the maritime Industry, example applications include: in ship propulsion systems, port operations (cranes, forklifts, etc.), and underwater vehicles, where precise speed control and energy efficiency are desirable.

Example uses of electric motors in power generation include: integration with renewable energy sources such as wind, hydroelectric, wave, among others, where the ability to adapt generator speed can improve energy production.

In manufacturing and heavy industry, example applications include: production machinery that requires precise speed and torque control, automation and robotics systems, and material transport.

For HVAC and refrigeration, electric motors can be used in: fans, blowers, and pumps, where energy efficiency and flow control can be important.

Electric motors are also used in the mining industry, for example, in: drilling and excavation equipment, and material transport systems, where robustness and adaptability to variable conditions can be important.

For construction, example applications include: cranes, lifts, and paving and compaction machinery, where precise control and adaptability to different tasks can improve efficiency and safety.

Example uses of electric motors in agriculture include: agricultural machinery and irrigation systems, where efficiency and adaptability can improve productivity and resource use.

Electric motors are also used in water and wastewater treatment, including in: pumps and aeration systems, seeking energy efficiency and adaptability to flow and demand variations.

Within aerospace and drone industry, example uses for electric motors include: unmanned aerial vehicles and auxiliary systems in aircraft, where efficiency and precise control can be important.

For home appliances and consumer electronics, electric motors can be used in applications where energy efficiency and speed control enhance performance and user experience.

In the rail sector, examples use cases for electric motors include: trains and signaling systems, where energy efficiency and speed control can be important for operation and safety.

While there are many advantages to using electric motors in many different applications, traditional electric motors may have certain challenges. One drawback to traditional electric motors is in operational flexibility. For example, a common challenge with traditional electric motors is their limited ability to adapt to different speeds and torque requirements without compromising efficiency.

Another drawback to traditional electric motors relates to energy efficiency. Many electric motors operate sub-optimally when outside of their specific design conditions, resulting in unnecessarily high energy consumption or inefficiency.

Traditional electric motors may also have an overly complex system design and high costs. Traditional electric motors may rely on external systems for speed and torque control, which adds complexity, costs, and potential failure points to the overall system.

Still another challenge for traditional electric motors relates to dynamic response and control. It is desirable to improve the electric motor's responsiveness and control to rapid changes in load demand.

It can also be difficult to adapt traditional electric motors to new applications. It is desirable to quickly adapt electric motors to new applications or changes in the specifications of an existing application, which is limited with traditional designs.

Traditional electric motors may also be difficult to maintain and have limited durability. It is also desirable to reduce the frequency and complexity of maintenance, as well as extending the electric motor's lifespan.

Another challenge is the integration of advanced technologies with electric motors. For example, in many circumstances it is desirable to incorporate advancements in power electronics, digital control, and intelligent algorithms to enhance motor functionality and performance.

Aspects of this disclosure address some or all of the above challenges. In particular, aspects of this disclosure provide solutions that allows for dynamic and controlled variation of speed and torque, adapting to various applications without the need to change the motor or use external devices like frequency converters. Further aspects of this disclosure improve the electric motor's energy efficiency across a wider range of operational conditions, reducing energy consumption and associated operational costs.

Aspects of this disclosure can further simplify the electric motor setup and reduce the dependence on external components, thereby reducing installation and maintenance costs. Aspects of this disclosure further provide more precise control and quicker response to variations in load conditions, enhancing the overall performance of the electric motor. This disclosure also relates to a more versatile and adaptable electric motor platform, capable of meeting a broader range of needs without extensive redesigns.

Further aspects of this disclosure can also decrease wear and degradation through more efficient and controlled operation, resulting in greater durability and reliability. In addition, aspects of this disclosure can cohesively integrate with advanced technologies to provide enhanced capabilities not possible with traditional electric motor designs.

These improvements and advantages can be implemented in a number of different applications and sectors. Examples of these in the automotive industry, include land vehicles of small and large scale. The electric motor described herein can provide flexibility in drivetrain design, enabling designers of electric and hybrid vehicles to optimize motors for a wide range of speeds and loads without compromising efficiency, offering an improved balance between acceleration and top speed. For example, the electric motor described herein is advantageous for direct installation in vehicle wheels without the need for a gearbox or multiplier. The electric motor described herein can also be used to reduce the number of components in various applications. For example, using the disclosed electric motor can reduce the need for complex transmissions or multiple motors to cover different speed and torque ranges, thus simplifying the drivetrain and potentially reducing weight and cost. The described technology can also provide an improvement to efficiency, for example, by adjusting the configuration of the poles of the electric motor to operate optimally at different speeds, a vehicle's energy efficiency can be improved, extending the battery range and reducing energy consumption. The described technology can also optimize motor efficiency for electric vehicles under different driving conditions, such as acceleration and cruising, thereby improving vehicle range and reducing energy consumption. In certain embodiments, the described electric motor is advantageous for direct installation in vehicle wheels without the need for a gearbox, multiplier, or reducer.

The described technology can also be advantageously applied to maritime vehicles. For example, the described electric motor can improve precision of speed control, which can be particularly useful in maritime applications where precise speed control can be beneficial for maneuvers and port operations. The described technology can offer finer control without additional systems. The electric motor according to aspects of this disclosure can also improve efficiency across the operating range, which is useful for maritime and aquatic vehicles which often operate across a wide range of load and speed conditions. The ability to vary the configuration of the poles can further improve motor performance for any condition, improving fuel efficiency and reducing emissions. The described electric motor is advantageous in hybrid and electric boats by providing the ability to adjust the motor to adapt to different sailing conditions which can significantly improve fuel efficiency and maneuverability.

Another application for the described technology is in electric generators. For example, the described electric motor can provide improved adaptability to renewable energy sources. In generators connected to renewable energy sources, such as wind or hydroelectric, the ability to change the configuration of an electric motor's poles can allow for more efficient adaptation to variations in wind speed or water flow, improving energy generation. The described technology can further provide improvements in energy quality, for example, by adjusting the generation speed to maintain a substantially constant output frequency under different loads, the quality of the generated energy can be improved, which can be important for sensitive applications and to meet electrical grid standards. In energy generation systems, such as wind or hydroelectric turbines, the described technology provides the ability to adapt the speed and torque of the electric generator which can increase energy conversion efficiency based on the variable conditions of wind or water. The described electric motor can also decrease manufacturing costs as it does not require a multiplier or reducer gearbox.

Still another application for the described technology is in the drone industry. For example, improvements can be provided for propulsion and flight control in which increased motor efficiency and control can allow for longer flight times and better maneuverability for drones of all sizes.

For the aviation industry, the described technology can improve electric propulsion systems for aviation. For example, in electric planes or urban air mobility (UAM) vehicles, where motor efficiency and control are fundamental for safety and flight autonomy. The described technology can also improve auxiliary systems in applications such as auxiliary power generation or cargo handling systems in commercial and cargo aircraft, where efficiency and adaptability can improve overall performance.

Another application is in the aerospace industry, including for satellites and spacecraft. For example, the described electric motor can be used for orientation and attitude control systems, where the electric motors can provide an efficient alternative for precise maneuvers and orientation maintenance. The described electric motor can also be used in rovers and planetary exploration vehicles where energy efficiency and reliability are important due to limited energy sources and the inability to perform maintenance.

For the manufacturing industry, the described technology can be used for production machinery. For example, the described electric motor can provide precise control of speed and torque in presses, lathes, and mills. The electric motor can also be used for transportation and conveyor belts, providing speed adjustment according to production needs. In certain industrial applications, such as conveyor belts, cranes, mills, and pumps, the described technology allows for precise and quick adjustments in motor speed and torque, adapting to different production phases and workloads.

Another application is for HVAC, including providing improvements in energy efficiency and flow control for fans, blowers, and/or pumps. Many ventilation, heating, and air conditioning systems can benefit from the ability to adjust motor speed provided by the described technology, including for fans and pumps to meet changing thermal needs, improving energy efficiency.

In the mining industry, the described electric motor can be used in drilling and excavation equipment. For example, the electric motor can provide adaptability to different ground conditions and loads. The described technology can also be used in transport systems to provide more efficient material handling with adaptable conveyor belts.

The described technology can also be used in the construction sector, including in lifting equipment and cranes. The described electric motor can provide finer control over speed and torque for precise maneuvers. Paving and compaction machinery can also employ the disclosed technology to provide for different operating speeds depending on the task.

In the agricultural industry, the described technology can be used for agricultural machinery. For example, the described electric motor can increase efficiency and adaptability to different tasks and ground conditions. The electric motor can also provide adaptable control of water flow and pressure for irrigation systems. In agricultural machinery, such as tractors and irrigation systems, the described technology can be used to adapt the operation of electric motors to varied tasks and terrain conditions, improving energy use and improving productivity.

The described technology can also be applied to the water and wastewater treatment sector. For example, when used in pumps and aeration systems, the described technology can provide an improvement in energy efficiency and adaptability to variations in flow and demand.

The electric motor according to this disclosure can also be used in robotics and automation, where precision in speed and torque control can be important. The described technology allows for fine-tuning of motors used in robotic arms, assembly lines, and other devices, improving the precision and efficiency of operations.

The described technology can also be employed in public transportation, including in electric train and tram systems. The described electric motor can be used to improve energy management during frequent accelerations and decelerations, reduce energy consumption, and enhance operational efficiency.

For pumping and water treatment systems, the described technology can adjust the operation of pump motors to adapt to variations in water demand and flow, improving efficiency and reducing operational costs.

In fitness or exercise equipment, such as treadmills and stationary bikes, the described technology can allow for precise adjustment of resistance and speed, offering a personalized experience for the user.

The described technology can also be used in other industries, including the rail industry. In general, the described electric motor can be used for any system, machine, or device that requires an electric motor.

Example Electric Motors with Variable Poles

In order to address one or more of the above challenges, aspects of this disclosure relate to electric motors having configurable poles that can be varied to, among other things, improve efficiency and control in propulsion systems. For example, embodiments of this disclosure are well suited for direct installation in vehicle wheels without the need for a gearbox or multiplier.

Aspects of this disclosure relate to an electric motor and control system configured to improve the adaptability and efficiency of the electric motor. The control system can include an external switching system that can dynamically vary the motor's number of poles, enabling precise real-time adjustments of the electric motors operational characteristics, such as speed and torque, to adapt to a diversity of applications and load requirements.

FIG. 1 illustrates an electric motor 100 in accordance with aspects of this disclosure. As shown in FIG. 1, the electric motor 100 includes an electronic control module 102, a stator 104, a plurality of electrical cables 106, and a plurality of electrical wires 108. Each of the electrical cables 106 can include a subset of the electrical wires 108. The electrical wires 108 electrically connect the electronic control module 102 to the magnetic conductive wires 110 which are arranged in slots (e.g., see the plurality of slots 105 of FIG. 3B) formed in the stator 104.

Figure 2:
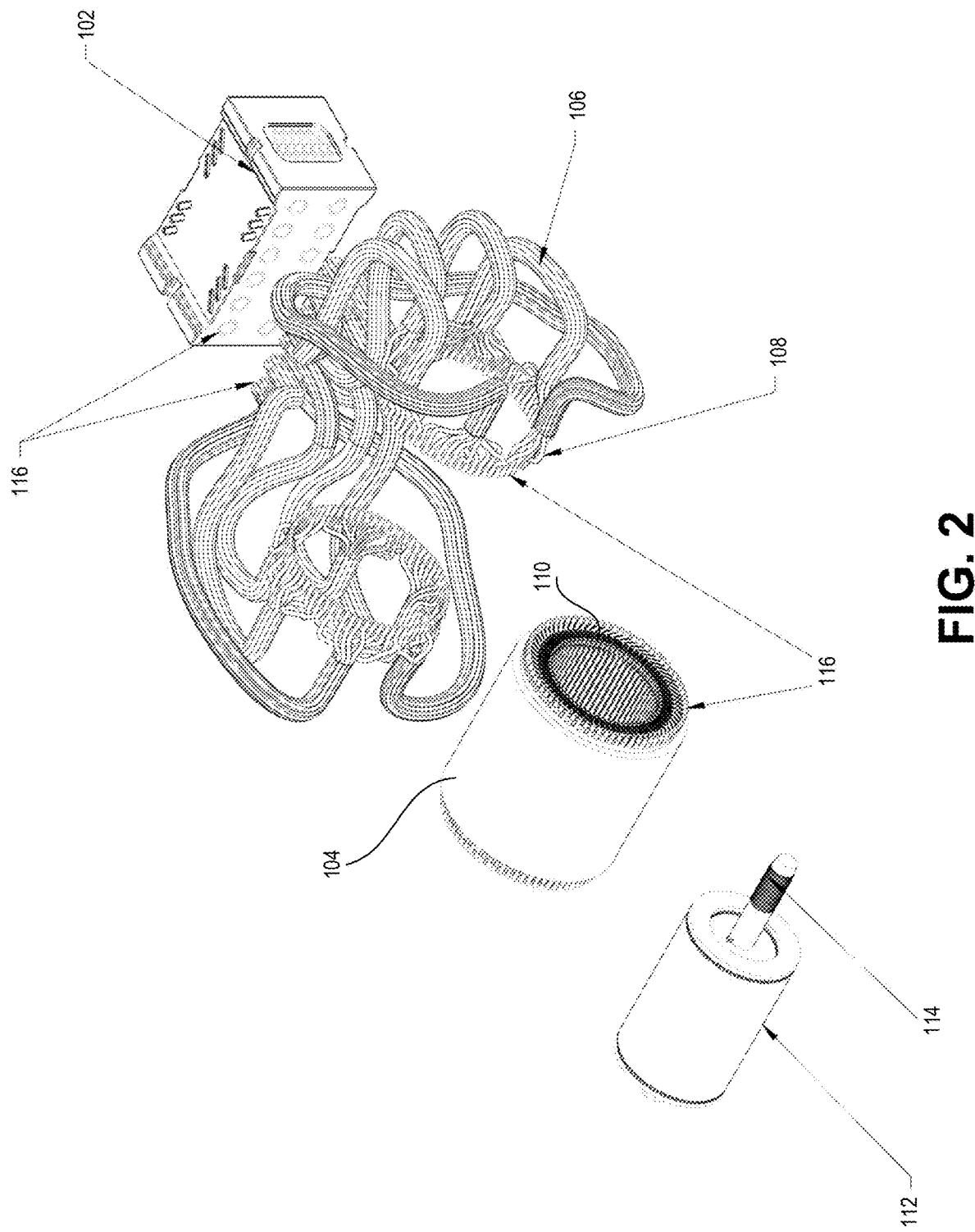
FIG. 2 illustrates an exploded view of the electric motor from FIG. 1 in accordance with aspects of this disclosure.

FIG. 2 illustrates an exploded view of the electric motor 100 in accordance with aspects of this disclosure. As shown in FIG. 2, the stator 104 further includes a plurality of magnetic conductive wires 110 arranged inside the body of the stator 104. The stator 104 is further configured to house a rotor 112 coupled to a shaft 114. Each of the electronic control module 102, the electrical wires 108 and the stator 104 includes a plurality of connectors 116. The connectors 116 are configured to electrically connect one end of the electrical wires 108 to the electronic control module 102 and the other end of the electrical wires 108 to the magnetic conductive wires 110.

Figure 3A:
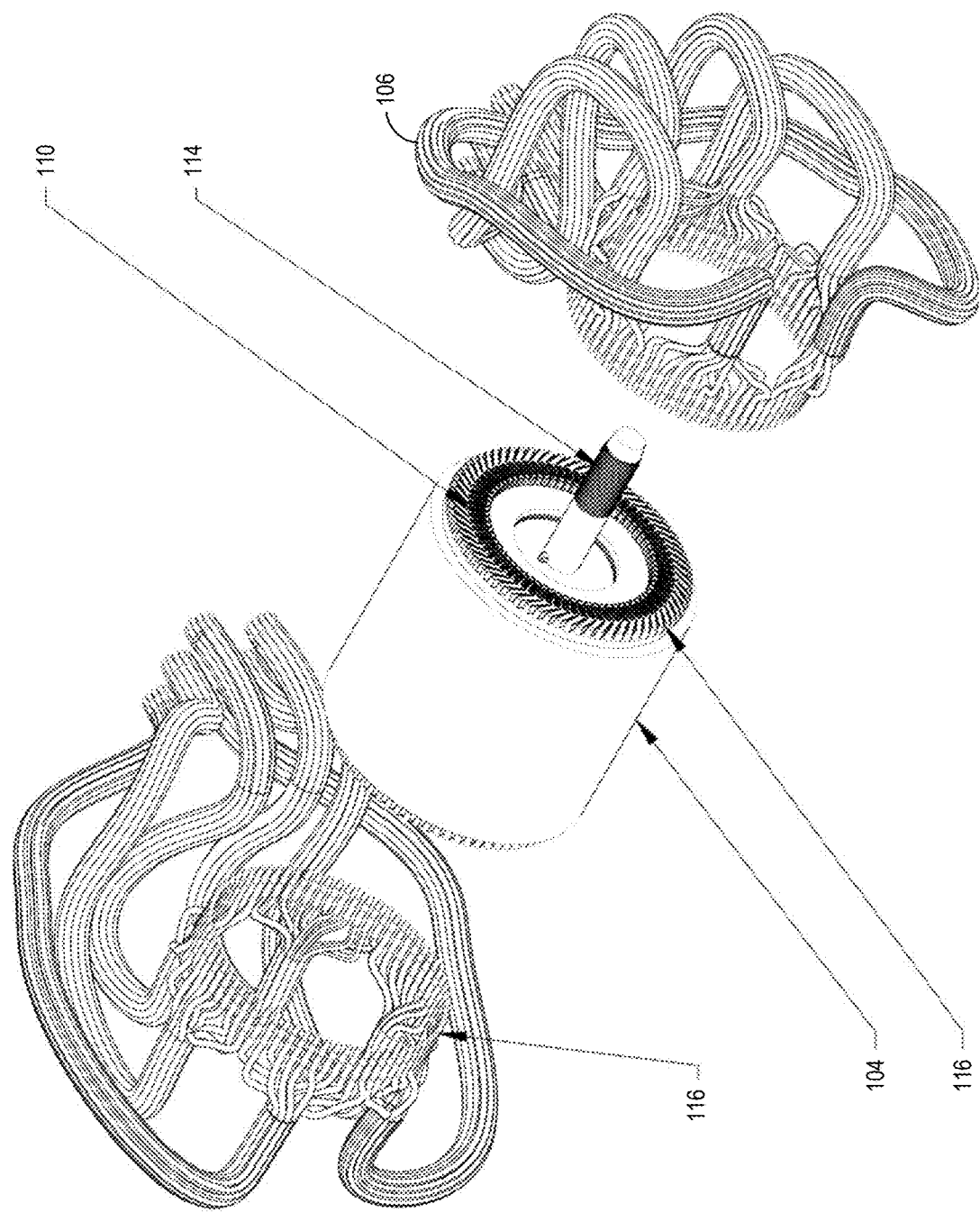
FIGS. 3A and 3B are views of the stator and electrical cables from FIG. 2 in accordance with aspects of this disclosure.
Figure 3B:
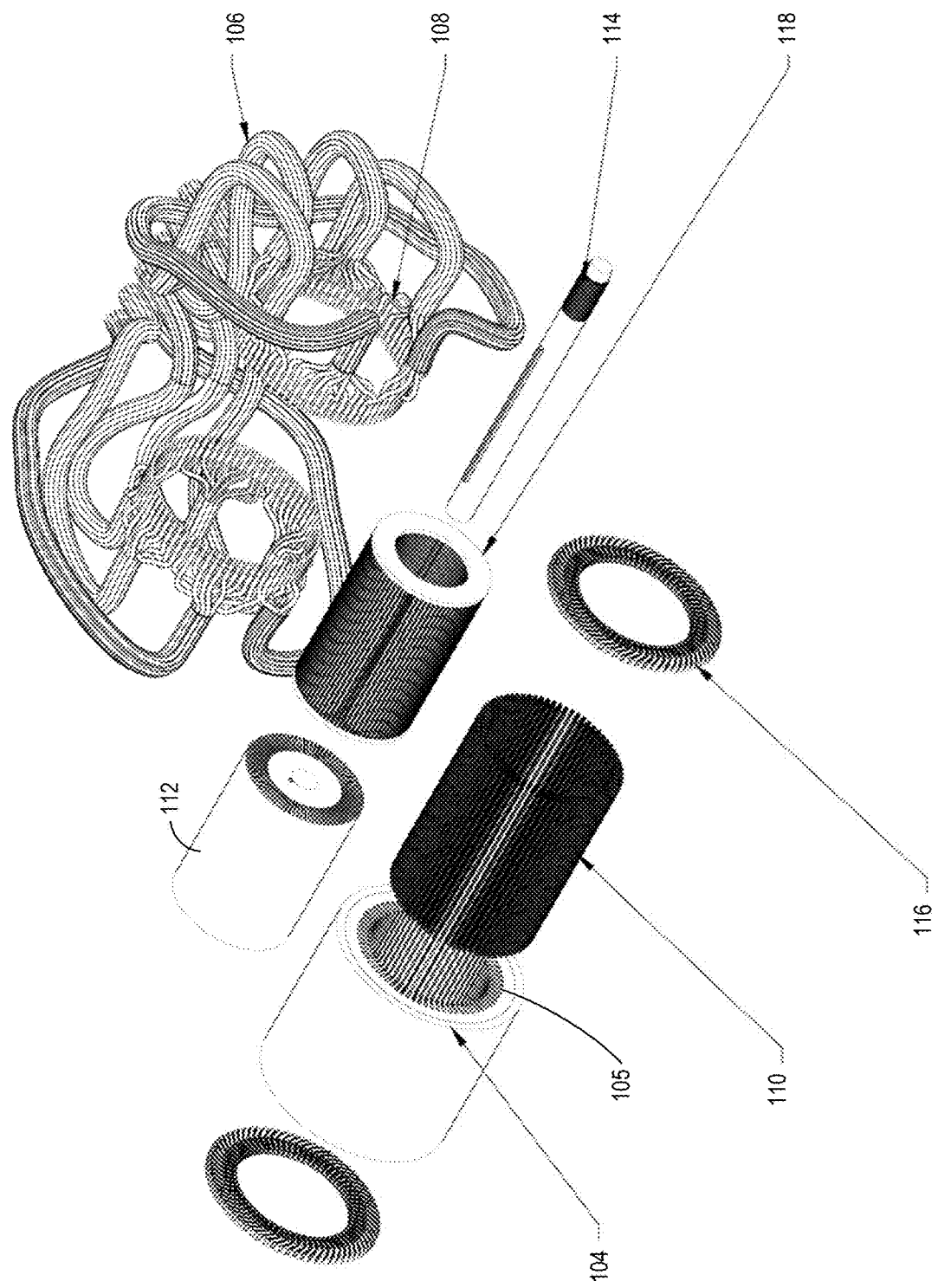

FIGS. 3A and 3B are views of the stator 104 and electrical cables 106 in accordance with aspects of this disclosure. FIG. 3A illustrates a view of the assembled stator 104 in accordance with aspects of this disclosure. FIG. 3B illustrates an exploded view of the stator 104 and the rotor 112 in accordance with aspects of this disclosure.

With reference to FIGS. 3A and 3B, the plurality of magnetic conductive wires 110 can be installed in the stator 104 with connectors 116 coupled to opposing ends of the plurality of magnetic conductive wires 110. The stator 104 can house a squirrel cage 118 and the shaft 114. When assembled, the rotor 112 can be installed into the stator 104 as shown in FIG. 3A.

As shown in FIG. 3B, the stator 104 can include a plurality of slots 105. In certain embodiments, each slot of the plurality of slots 105 is configured to house a corresponding one of the plurality of magnetic conductive wires 110. In some embodiments, the plurality of slots 105 may be formed as recesses in the stator 104.

The electronic control module (e.g., see the electronic control module 102 of FIGS. 1 and 2) is configured to connect the magnetic conductive wires 110 to form a variable number of poles. As discussed herein, the magnetic conductive wires 110 provide the ability for the electric motor 100 to adjust the configuration of the poles of the electric motor 100. Each of the magnetic conductive wires 110 can be formed as a winding, which can include a single or multiple layers and one or multiple turns. The type of winding formed by each of the magnetic conductive wires 110 can be adjusted depending on the particular application for the electric motor 100.

With reference to FIGS. 1-3B, the electronic control module 102 is configured to selectively electrically connect the magnetic conductive wires 110 via the electrical wires 108, thereby providing the ability to adjust the configuration of poles of the electric motor 100. When a voltage is applied to the magnetic conductive wires 110, the magnetic conductive wires 110 can functions as poles of the electric motor 100. Although the embodiments of FIGS. 1-3B relate to an electric motor 100 including an electronic control module 102, aspects of this disclosure are not limited thereto. In particular, in some embodiments, the electric motor 100 can include a switching system that is implemented with mechanical, electronic, or digital components and is configured to adjust the pole configuration of the stator 104 as described herein. For example, a mechanical switching system can be implemented using mechanical switches, such as a system actuating switches with hydraulics and/or pneumatics.

In some embodiments, the electronic control module 102 includes a switching system including solid-state devices configured to adjust the configuration of poles of the electric motor 100. The electronic control module 102 can include an FPGA or other computerized system configured to control the switching system to manage the electrical connections to alter the electric motor's 100 pole configuration. This can enhance the electric motor's 100 operational flexibility and also improve the electric motor's 100 energy efficiency.

The poles formed by the magnetic conductive wires 110 in the stator 104 are configured to produce an adjustable rotating magnetic field. The stator 104 is configured to be connected to an alternating current power source (not illustrated) that produces a rotating magnetic field. In particular, the magnetic conductive wires 110 of the stator can receive the alternating current from the power source to generate the rotating magnetic field. The interaction between the rotating magnetic field of the stator 104 and the static magnetic field provided by the rotor 112 (e.g., by the squirrel cage 118 of FIGS. 1-3B or the squirrel cage 418 of FIGS. 4A and 4B) produces a torque on the rotor 112 which can result in a usable torque output via the shaft 114. Thus, the electric motor 100 is designed to function based on the electromagnetic induction principle for the operation of electric motors. By providing the alternating current to the stator 104 to generate the rotating magnetic field in the stator 104, a magnetic field is induced on the rotor 112, causing the rotor 112 to rotate and produce mechanical work.

Due to the inclusion of the magnetic conductive wires 110 in the stator 104, the magnetic conductive wires 110 can be individually controlled using the electronic control module 102. This enables the electronic control module 102 to form selective connections between each of the magnetic conductive wires 110 in the slots 105, facilitating improved variability in the electric motor's 100 pole configurations.

Figure 4A:
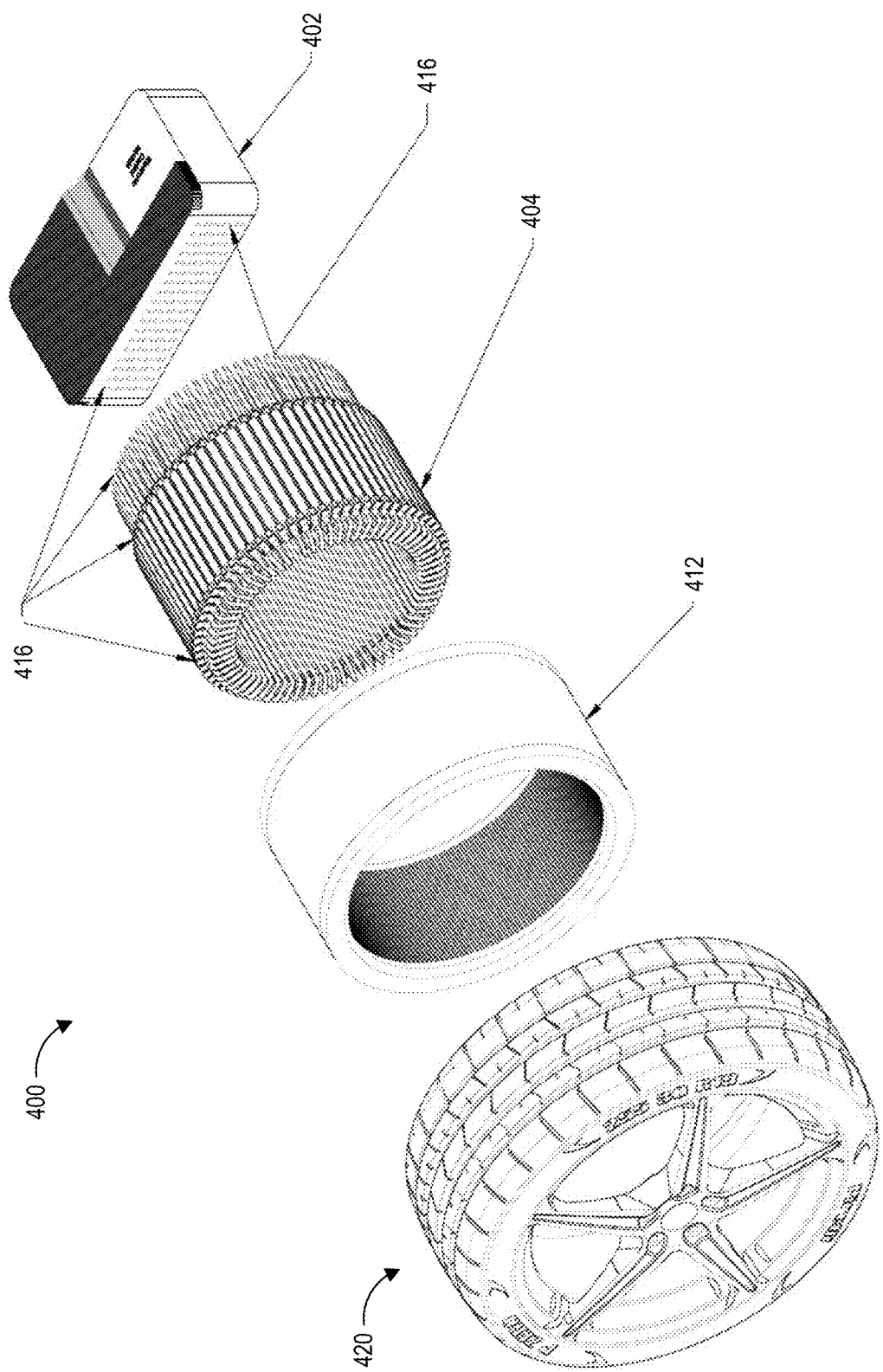
FIGS. 4A and 4B illustrate exploded views of another embodiment of an electric motor installed in a wheel in accordance with aspects of this disclosure.
Figure 4B:
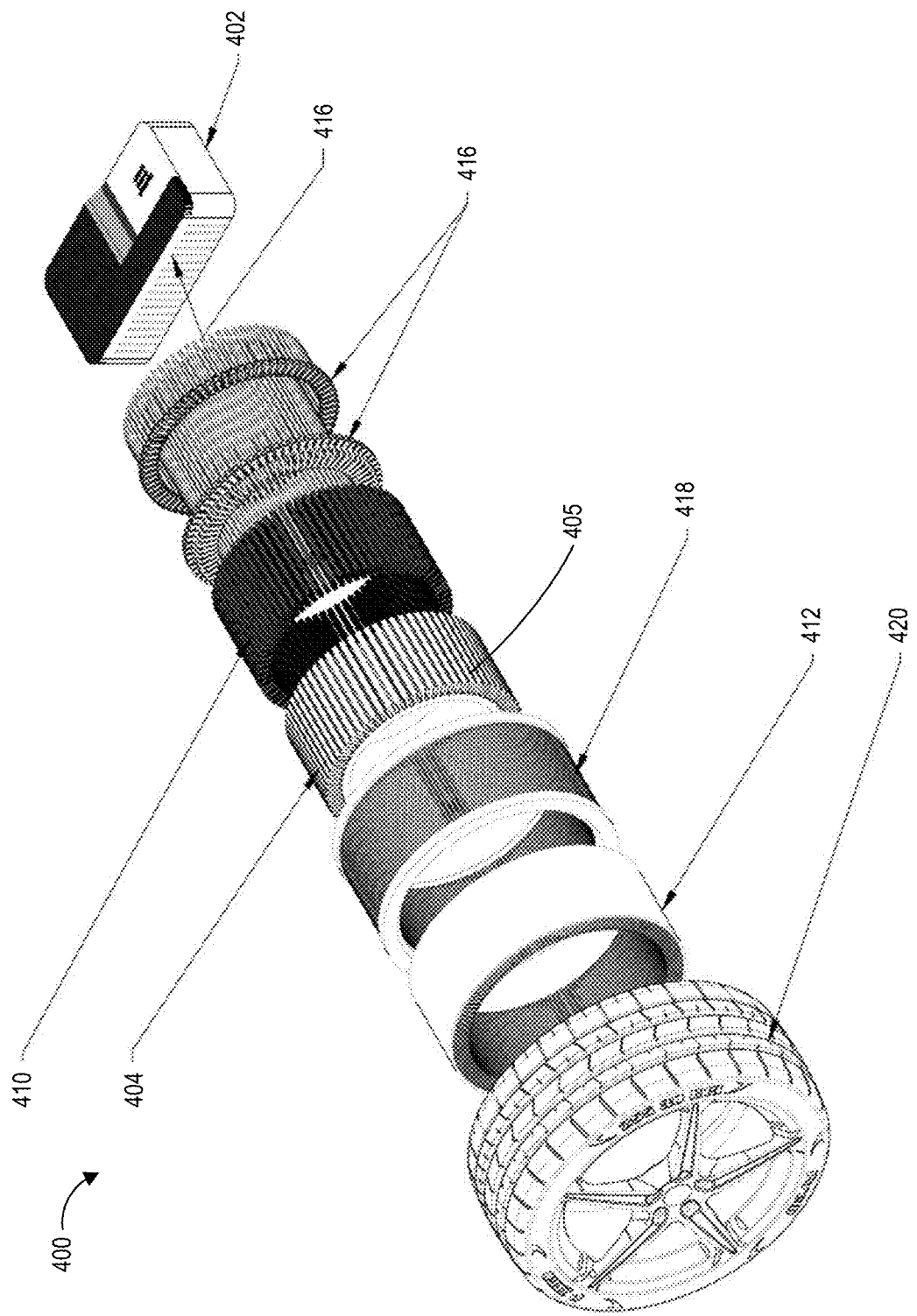

FIGS. 4A and 4B illustrate another embodiment of an electric motor 400 installed in a wheel 420 in accordance with aspects of this disclosure. In FIG. 4A, the stator 404 is shown with the magnetic conductive wires (see the magnetic conductive wires 410 of FIG. 4B) installed and the magnetic conductive wires are not labelled in FIG. 4A to simplify the view of the electric motor 400 and wheel 420. With reference to FIG. 4A, the relative positions of the rotor 412, the stator 404, the connectors 416, and the electronic control module 402 of the electric motor 400 are shown with respect to the wheel 420. In contrast to the embodiments of FIGS. 1-3B, the electric motor 400 of FIGS. 4A and 4B has the stator 404 positioned within the rotor 412. Advantageously, this may simplify the connection of the electric motor 400 to the wheel 420.

FIG. 4B illustrates additional details of the electric motor 400, including the rotor 412, the squirrel cage 418, the stator 404, the magnetic conductive wires 410, the connectors 416, and the electronic control module 402. In certain embodiments, the rotor 412 is connected to the wheel 420, such that the electric motor 400 can cause the wheel 420 to rotate via rotation of the rotor 412, thereby propelling the vehicle. In certain embodiments, the stator 404 can include a plurality of recesses 505, each of which is configured to house a corresponding one of the plurality of magnetic conductive wires 410.

A traditional electric motor can include a plurality of slots and a plurality of poles. In many cases, the slots are embodied as coils located on a fixed stator and the poles are embodied as permanent magnets located on the rotor. In such traditional electric motors, the number of slots may refer to the number of coils while the number of poles may refer to the number of poles of the permanent magnets.

Referring back to the embodiments of FIGS. 1-4B, the squirrel cage 118, 418 can include any number of slots depending on the implementation. In one example, the squirrel cage 118, 418 may include a predetermined number of slots, which may be different than the number of possible poles configurable by the magnetic conductive wires 110, 410. By providing a different number of slots and poles, the electric motor can advantageously reduce or prevent magnetic interlocking of the electric motor 100, 400.

Techniques for Providing Variable Poles

Figure 5:
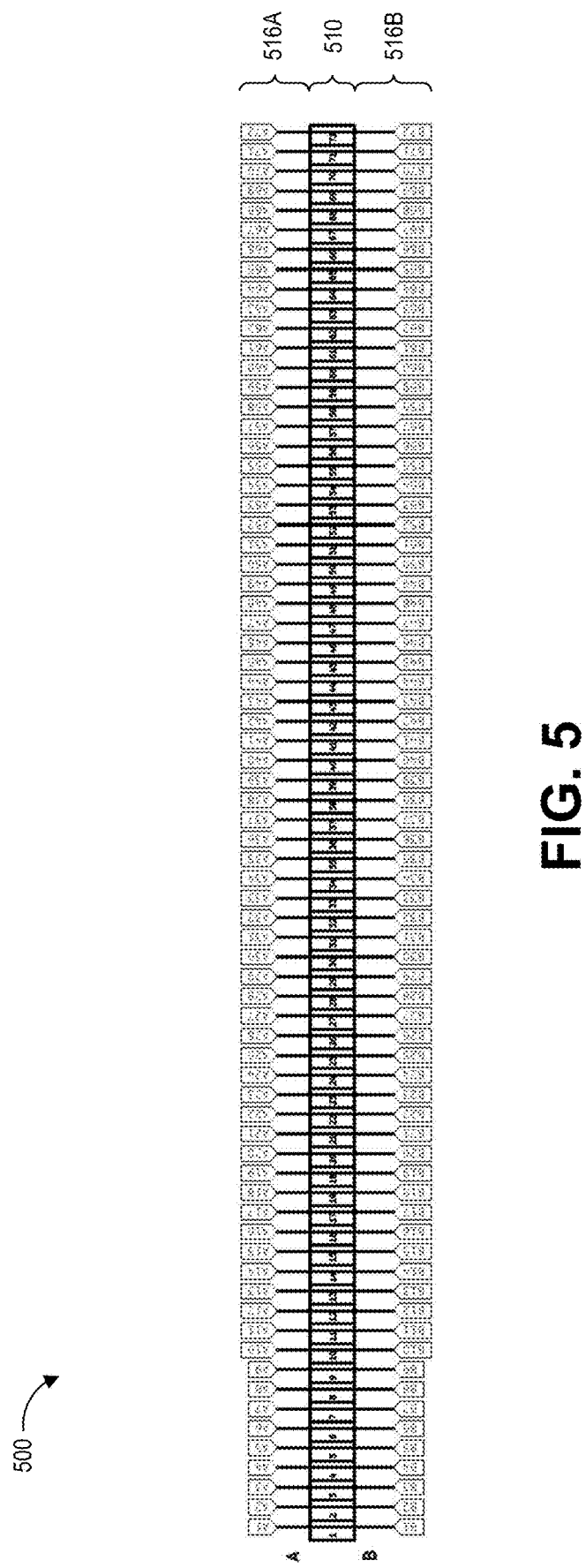
FIG. 5 illustrates a conceptual layout of a plurality of slots for a stator in accordance with aspects of this disclosure.

FIG. 5 illustrates a conceptual layout 500 of a plurality of slots 510 for a stator in accordance with aspects of this disclosure. As shown in FIG. 5, the layout 500 includes the plurality of slots 510 arranged adjacent to each other in a line or linear arrangement. While illustrated in a line for simplicity, in certain embodiments, the plurality of slots 510 will form a circle surrounding a stator (e.g., the stator 104 of FIGS. 1-3B or stator 404 of FIGS. 4A and 4B) in practice. Each of the slots 510 can include a corresponding magnetic conductive wire (e.g., see magnetic conductive wires 110 of FIGS. 1-3B or 410 of FIGS. 4A and 4B).

In the embodiment of FIG. 5, the conceptual layout 500 of the plurality of slots 510 is illustrated as comprising 72 different slots. However, aspects of this disclosure are not limited thereto and the number of slots within the plurality of slots 510 may be greater than or less the 72 in different embodiments. The layout 500 further includes a plurality of connectors 516 including first connectors 516A on a first side A of the plurality of slots 510 and second connectors 516B on a second side B of the plurality of slots 510. In certain embodiments, each of the plurality of connectors 516 can connect the magnetic conductive wire from one of the slots 510 to an electronic control module (e.g., see the electronic control module 102 of FIGS. 1-3B, the electronic control module 402 of FIGS. 4A and 4B, or the electronic control module 700 of FIG. 7).

The magnetic conductive wires 410 arranged to form the slots 510 can be connected in various different configurations to provide a variable number of poles. In some embodiments, the number of poles may be an integer divisor of the total number of plurality of slots 510.

FIGS. 6A-6E illustrate different configurations of the plurality of slots 510 which can provide a different number of poles. In each of FIGS. 6A-6E, there are 72 slots which are coupled in one of three different paths including a first path 602, a second path 604, and a third path 606. In certain embodiments, the first path 602 may be connected between a first voltage U1 and a second voltage U2. In certain embodiments, the second path 604 may be connected between a third voltage W1 and a fourth voltage W2. In certain embodiments, the third path 606 may be connected between a fifth voltage V1 and a sixth voltage V2. In some embodiments, the first voltage U1, the third voltage W1, and the fifth voltage V1 may be substantially the same while the second voltage U2, the fourth voltage W2, and the sixth voltage V2 may be substantially the same.

In certain embodiment, the electric motor can form a pole by a group of the slots 105 in the stator 104 working together to create a magnetic pole. These poles are formed by the configuration of the electrical connections that dictate the polarity in each of the slots 105. For example, in FIG. 6A, a first pole can be formed of slots 1-3, a second pole can be formed of slots 4-6, etc. Here the polarity of the first path 602 is the opposite in slots 1 and 4, the polarity of the second path 604 is the opposite in slots 3 and 6, while the polarity of the third path 606 is the opposite in slots 2 and 5. This exemplary configuration provides for 24 poles in the example of FIG. 6A.

Figure 6A:
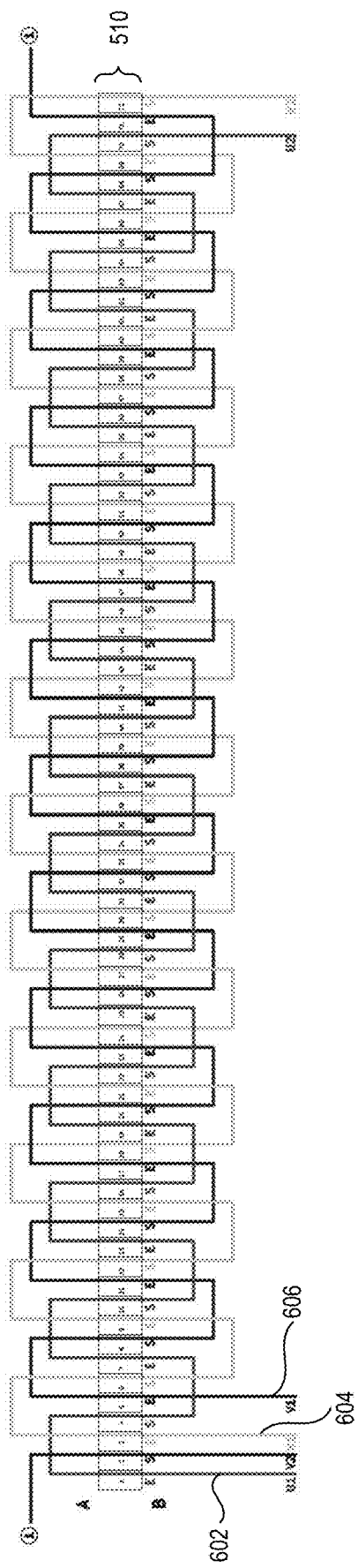
FIGS. 6A-6E illustrate different configurations of the plurality of slots from FIG. 5 which can provide a different number of poles.
Figure 6B:
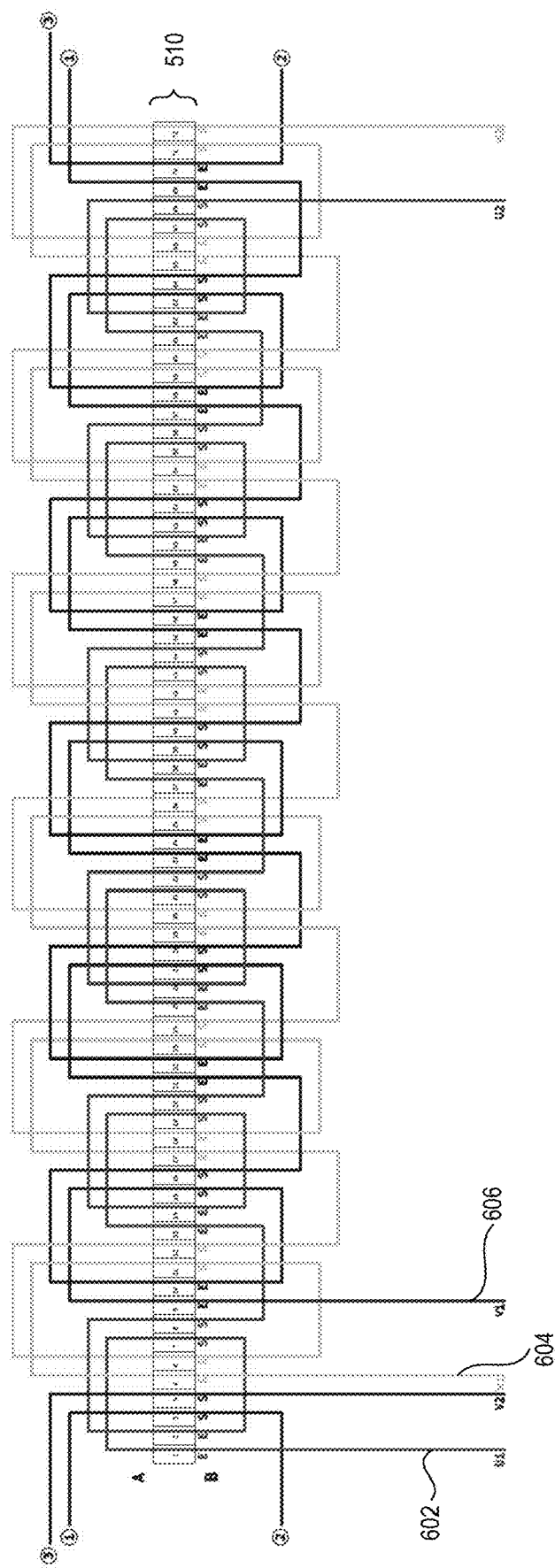

Referring now to FIG. 6B, each of the paths 602-606 are interleaved such that the same path has the same polarity in adjacent slots. For example, the first path 602 is rerouted such that slots 1 and 2 have the same polarity E, the second path 604 provides the same polarity S to slots 3 and 4, while the third path 606 provides the same polarity E to slots 5 and 6. This exemplary configuration results in 12 poles for the configuration of FIG. 6B.

Figure 6C:
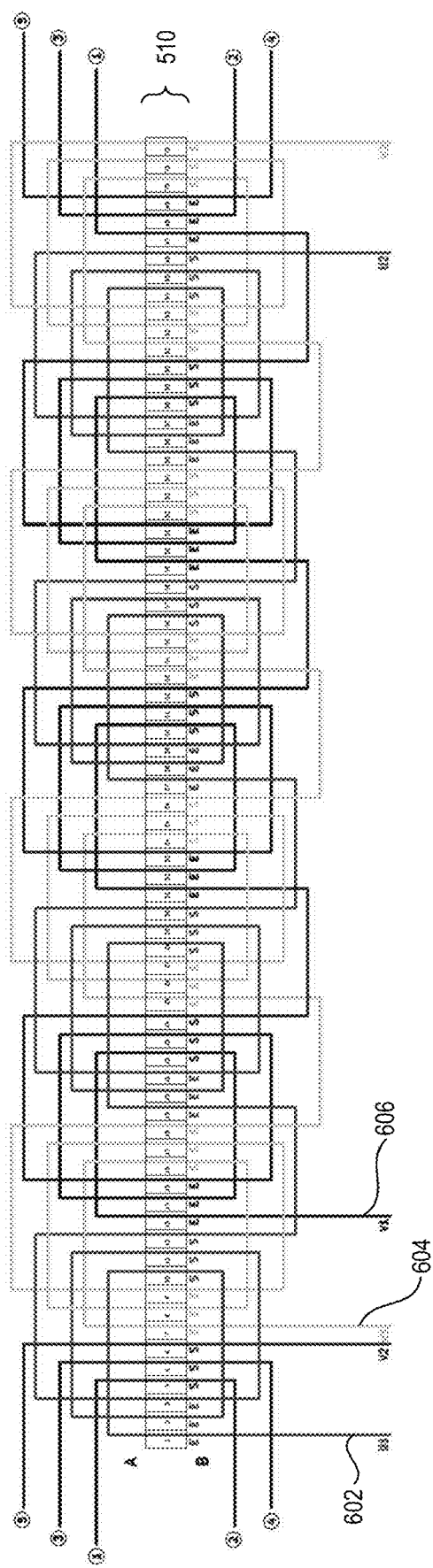
Figure 6D:
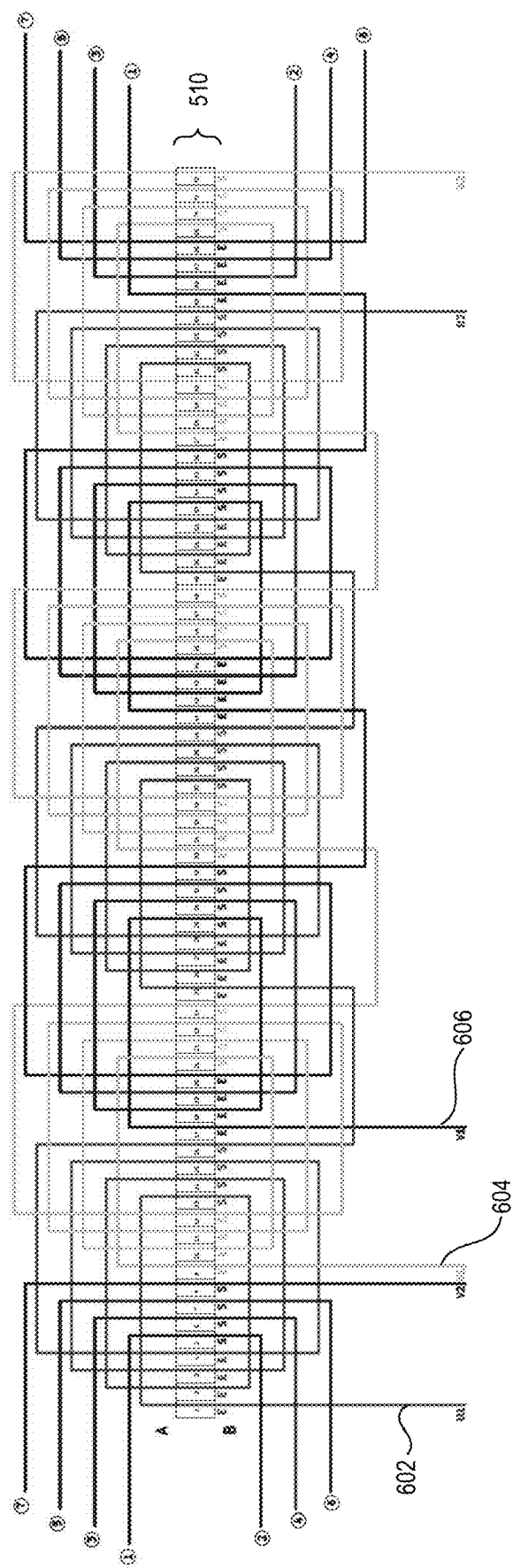
Figure 6E:
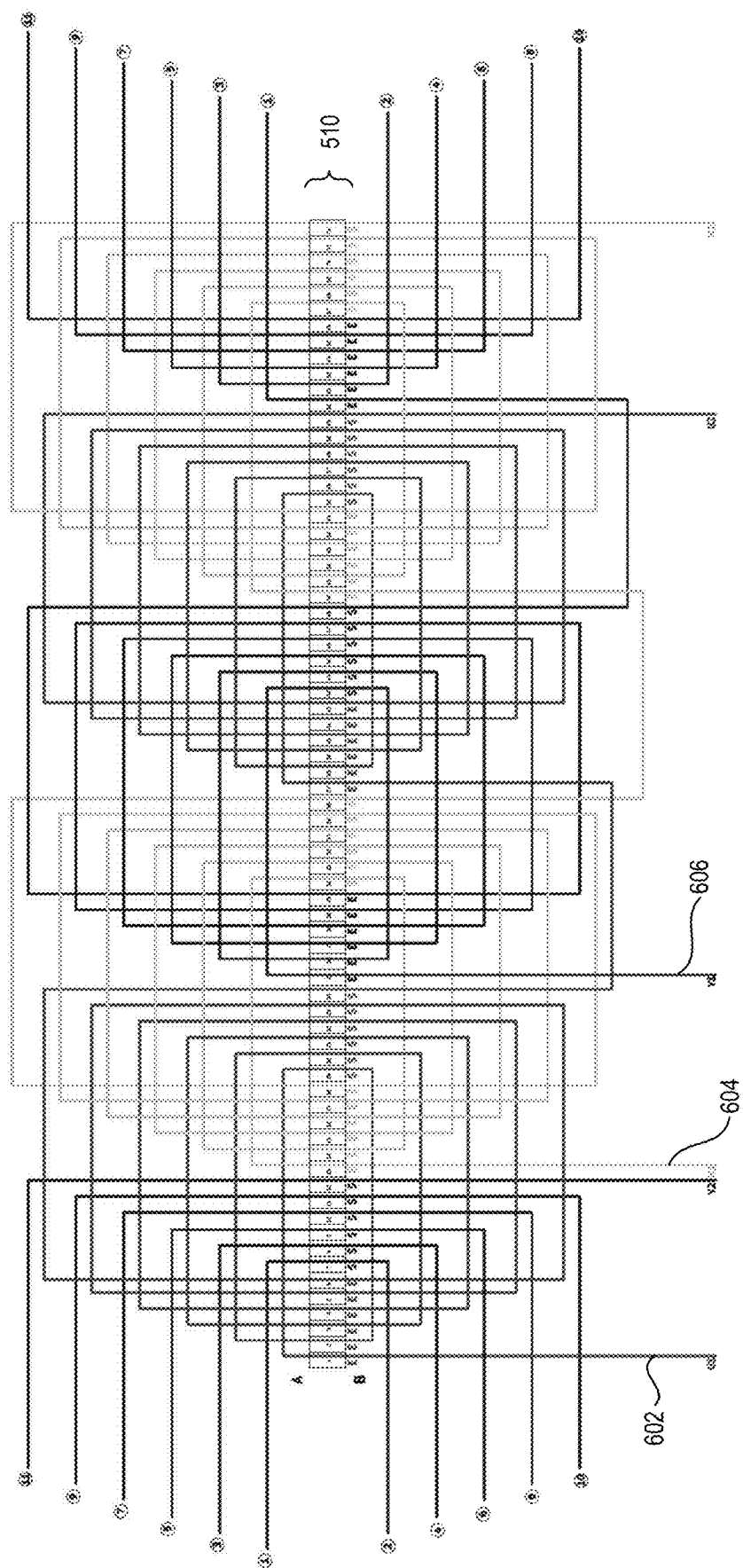

The exemplary configuration of FIG. 6C results in 8 poles. The exemplary configuration of FIG. 6D results in 6 poles. The exemplary configuration of FIG. 6E results in 4 poles.

Figure 7:
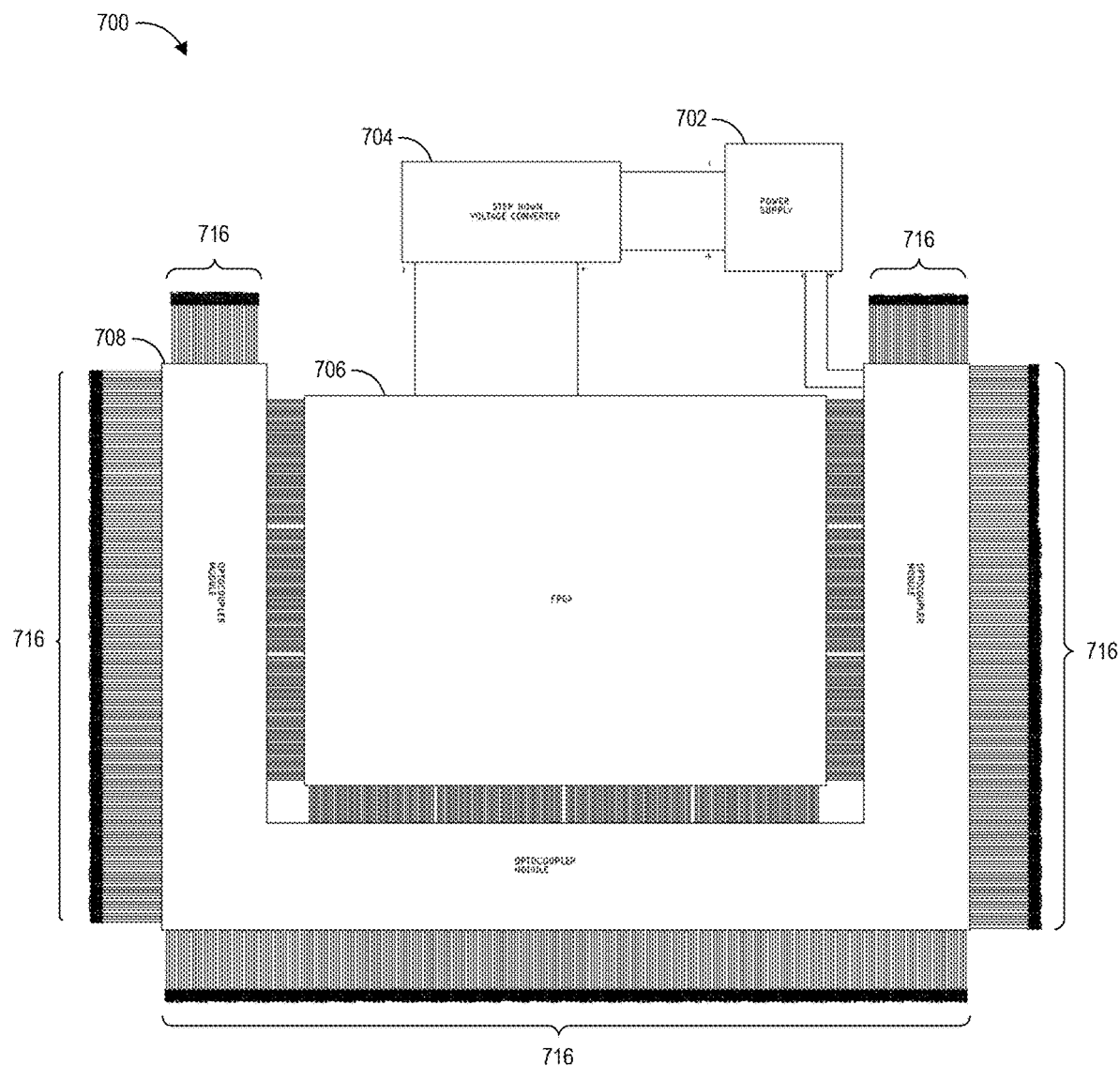
FIG. 7 illustrates an embodiment of an electronic control module in accordance with aspects of this disclosure.

FIG. 7 illustrates an embodiment of an electronic control module 700 in accordance with aspects of this disclosure. As shown in FIG. 7, the electronic control module 700 includes a power supply 702, a step down voltage converter 704, a field programmable gate array (FPGA) 706, and an optocoupler module 708. In certain embodiments, the power supply 702 is configured to provide power to the step down voltage converter 704 and the optocoupler module 708. In certain embodiments, the step down voltage converter 704 is configured to step down the voltage received from the power supply 702 and provide the stepped down voltage to the FPGA 706. In certain embodiments, the FPGA 706 is configured to control the optocoupler module 708 to adjust the connections between the magnetic conductive wires (e.g., the magnetic conductive wires 110 of FIGS. 1-3B or magnetic conductive wires 410 of FIGS. 4A and 4B). In some embodiments, the FPGA 706 can be replaced with another type of controller or microcontroller configured to perform similar functions.

In certain embodiments, the optocoupler module 708 is coupled to a plurality of connectors 716, each of which is coupled to one end of each of the magnetic conductive wires via electrical wires (see, for example, the electrical wires 108 of FIGS. 1-3B). For example, the optocoupler module 708 can be connected to each plurality of slots 510 illustrated in FIG. 5 via both the first connectors 516A and the second connectors 516B.

The electronic control module 700 can be configured to couple the slots of the stator in order to vary the number of poles. For example, in the case that the stator includes 72 slots 510 as in the embodiment of FIG. 5, the electronic control module 700 can be configured to connect the slots 510 to implement the configurations in each of FIGS. 6A-6E, thereby adjusting the number of poles for the stator. In some embodiments, the electronic control module 700 can configure the slots 510 to implement 4, 6, 8, 12, or 24 poles. However, aspects of this disclosure are not limited thereto and the electronic control module 700 can be configured to implement any integer number of poles in various embodiments.

By selecting the number of poles of the stator, the electronic control module 700 can change the ratio of stator poles to the number of slots in the squirrel cage (see, for example the squirrel cage 418 of FIGS. 4A and 4B), thereby adjusting the torque and/or output speed of the electric motor. This can have a similar or analogous effect to changing the gear ratio of a motor, without the need for any gearbox or related components. Advantageously, by adjusting the number of poles of the stator, the electronic control module 700 can select the band of speeds and/or torques under which the electric motor can operate above a threshold efficiency. As the current desired speed and/or torque of the electric motor change (e.g., the requested speed/torque is outside of a current band of efficient output of the electric motor), the electronic control module 700 can adjust the number of poles to better match the current desired speed and/or torque.

In certain embodiments, the optocoupler module 708 is configured to implement an electronic switching system (also referred to as an "electronic switch") configured to couple the slots of the stator in order to vary the number of poles. In certain embodiments, the switching system of the optocoupler module 708 enables dynamic connections between each of the magnetic conductive wires in each of the slots, providing variation in the pole configuration. This optocoupler module 708 can enhance the electric motor's flexibility and efficiency while also reducing the complexity and cost associated with adapting the electric motor for different applications.

While the optocoupler module 708 provides an embodiment of an electric switching system, in other embodiments the switching system can be implemented mechanically. For example, a mechanical switching system can be implemented using mechanical switches, such as a system actuating switches with hydraulics and/or pneumatics. In some embodiments, including mechanical and electric switching systems, the electronic control module 700 is configured to provide precise and real-time management of the electric motor's pol configuration In some embodiments, the optocoupler module 708 is implemented using solid-state components (e.g., MOSFETs, IGBTs, TRIACs, DIACs, etc.) selected for their ability to handle high currents and voltages.

The FPGA 706 can be configured to implement an algorithm to determine a switching sequence to achieve a requested pole configuration in order to improve motor performance to meet dynamic operational requirements.

In some embodiments, the electronic control module 700 can further include a communication interface (not illustrated) configured to enable the electronic control module 700 to communicate with the electric motor (e.g., the electric motor 100 of FIGS. 1-3B or the electric motor 400 of FIGS. 4A and 4B) and/or with an automation management system. Thus, the electronic control module 700 can provide real-time monitoring and fine-tuning of the electric motor's performance.

The electronic control module 700 is advantageously able to provide the ability to dynamically adjust the number of poles of the electric motor through the optocoupler module 708 without physical interventions in the motor. This configuration offers improved adaptability and energy efficiency, precise control of speed and torque, simplification of motor design, and reduction of maintenance and operational costs.

According to aspect of this disclosure, the electric motor described herein can be advantageously integrated with one or more variable frequency drives (VFDs). The integration of the electric motor with one or more VFDs offers an additional layer of control. The synergy between the electric motor and a VFD allows for more granular regulation of motor speed by combining pole variability with the frequency adjustment provided by VFDs, further optimizing energy efficiency and motor performance under a wider range of operational conditions.

In some embodiments, artificial intelligence and/or machine learning can be used to analyze operational data, predict maintenance needs, and proactively adjust motor parameters, enhancing efficiency and durability. For example, artificial intelligence and/or machine learning can be used for predictive analysis by analyzing operational data collected by sensors to identify patterns and predict maintenance needs, providing more efficient operation and failure prevention; proactive adjustment of motor parameters: by automatically adjusting motor parameters, such as the pole number configuration, in response to changes in operational conditions to optimize both efficiency and performance; optimization of durability and efficiency, by making adjustments based on artificial intelligence predictions to enhance energy efficiency and to prolong the motor's lifespan by reducing wear.

In some embodiments, the electric motor can include one or more sensors and/or feedback systems configured to monitor parameters of the electric motor. Feedback from the sensors can be used for continuous adjustments in motor operation, to improve performance. In some embodiments, the sensors can be used to measure parameters such as torque, RPM, current, voltage, and temperature. These sensors provide data for the control and optimization of the electric motor. The specific location and application of the sensors can be varied depending on the embodiment.

Aspects of this disclosure provide significant advantages over the traditional technologies in the field of electric motors. For example, the disclosure technology provides improved flexibility via the ability to dynamically adjust the number of motor poles allows for real-time adaptation to varied operational needs, surpassing the limitations of traditional electric motors with fixed pole configurations.

In some embodiments, the described technology improves energy efficiency by improving the pole configuration for different applications and load conditions. This can significantly improve motor energy efficiency, reducing energy consumption and operational costs.

The electric motor described herein can also provide increased control precision using the external switching system. The switching system can provide more precise and detailed control over motor speed and torque, improving performance and response compared to traditional systems.

Aspects of this disclosure can also reduce the complexity of the electric motor by integrating pole variation functionality directly into the motor control system. This can eliminate the need for additional devices such as frequency converters for certain applications, simplifying system design.

The described electric motors may also be advantageously compatible with VFDs, which can expand motor control capabilities, allowing fine adjustments to speed along with pole variation for even greater optimization.

Figure 8:
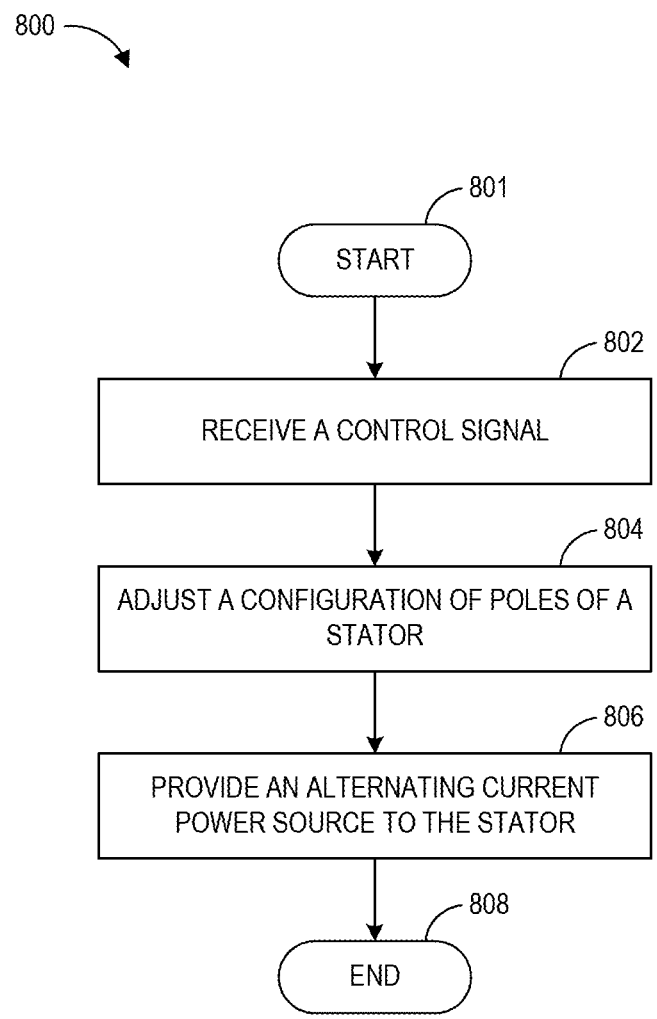
FIG. 8 illustrates an embodiment of a method for controlling an electric motor in accordance with aspects of this disclosure.
Figure 9A:
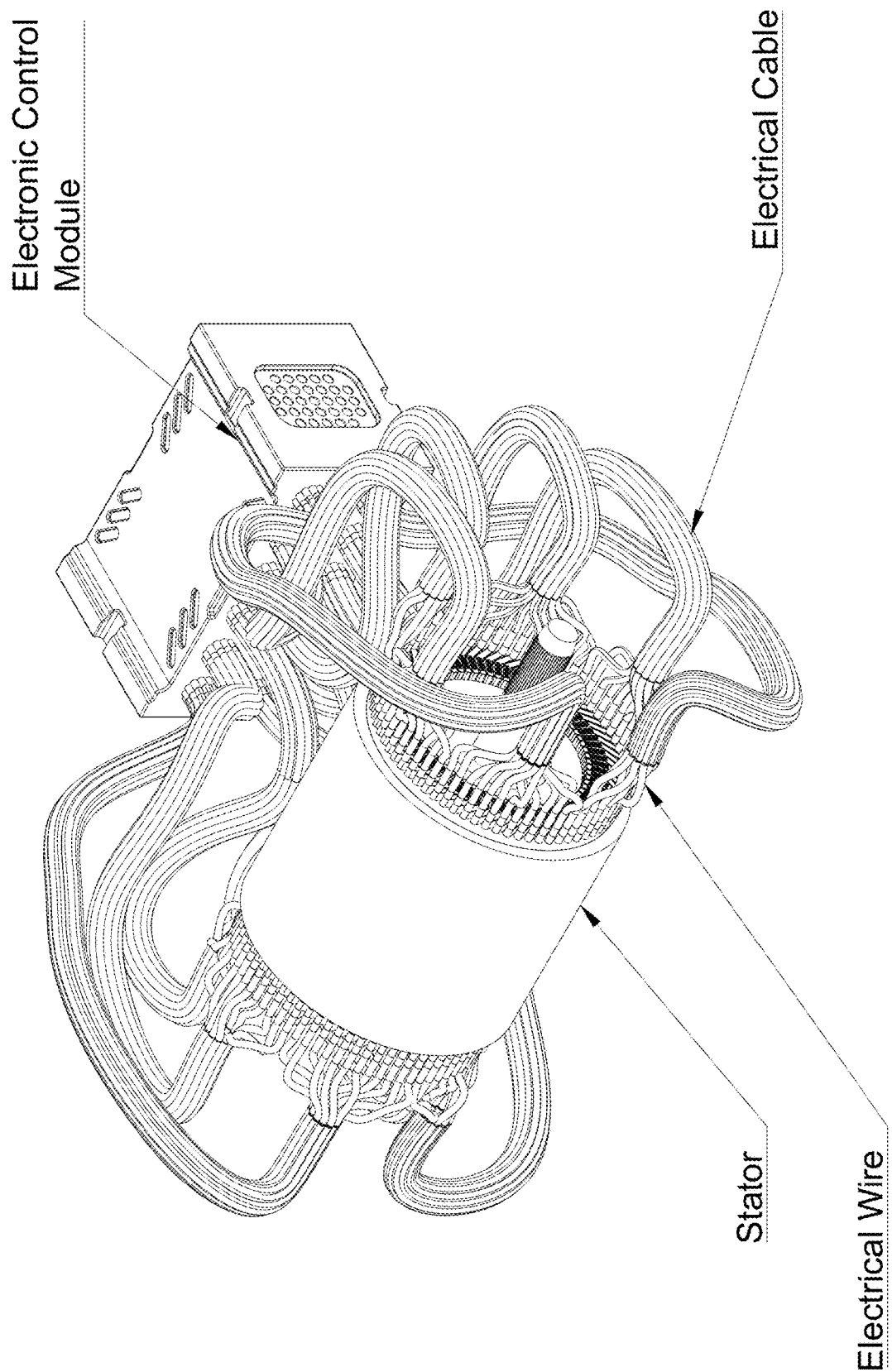
FIGS. 9A-9J illustrates further examples of the electric motor and components of the electric motor in accordance with aspects of this disclosure.
Figure 9B:
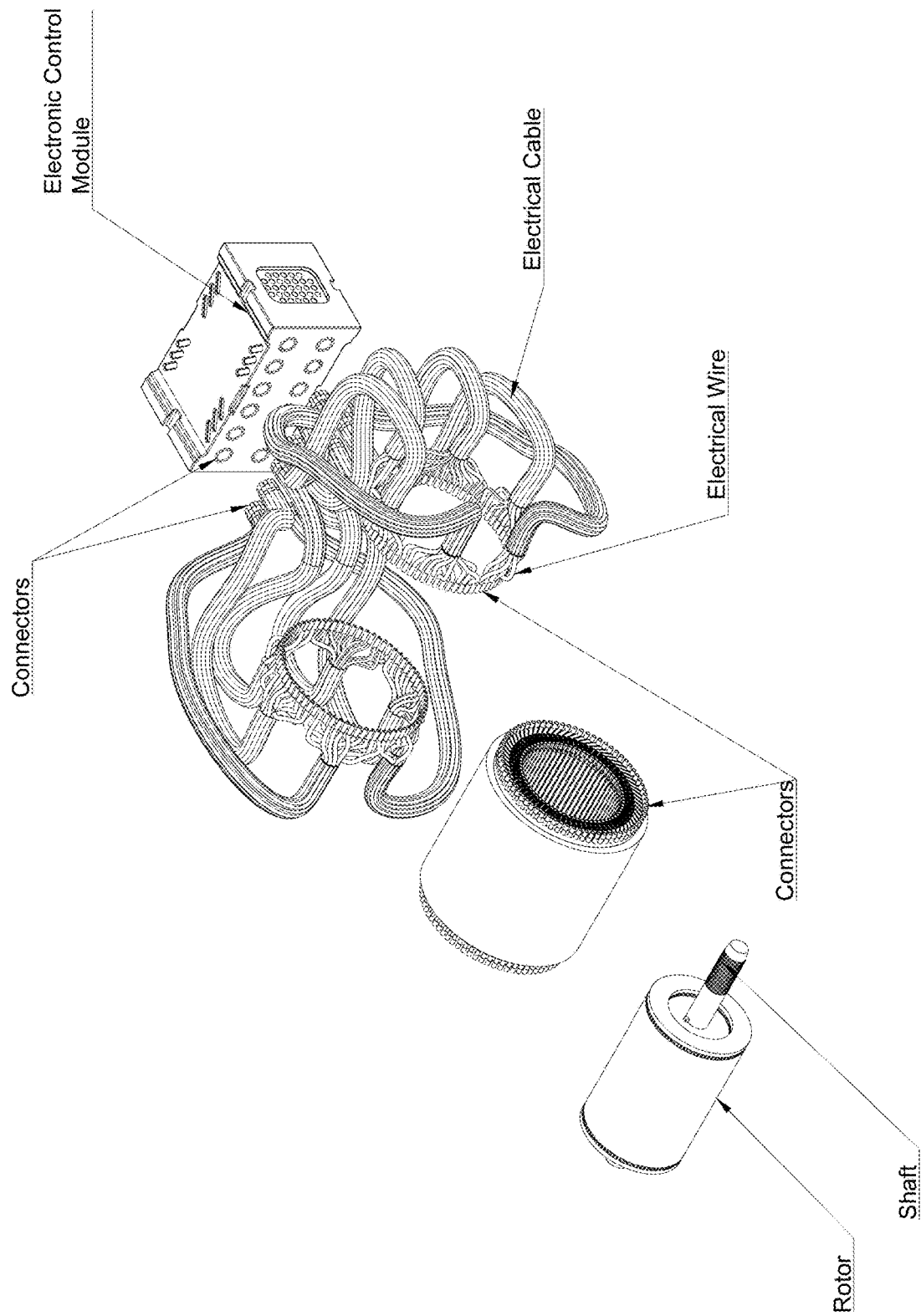
Figure 9C:
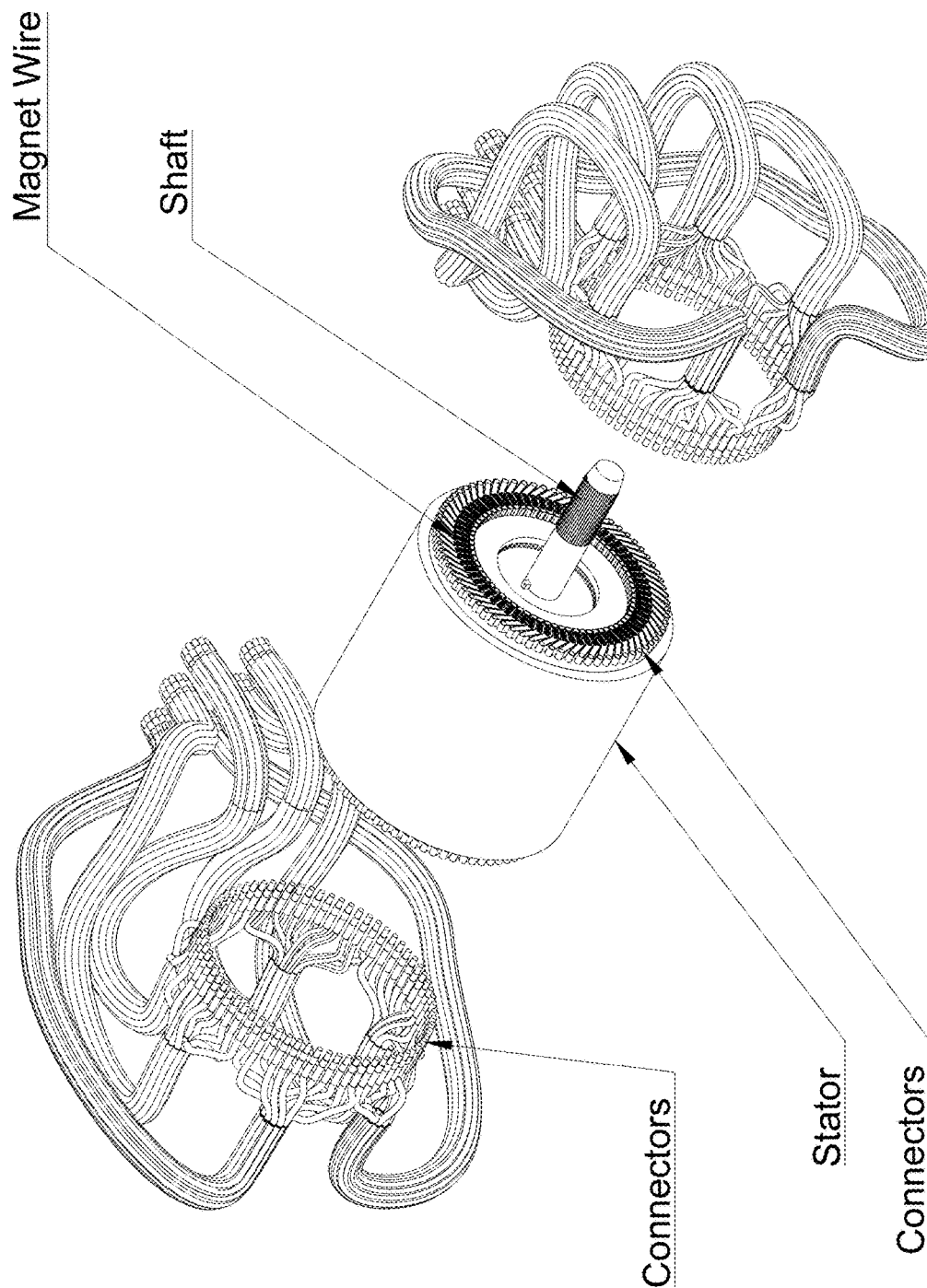
Figure 9D:
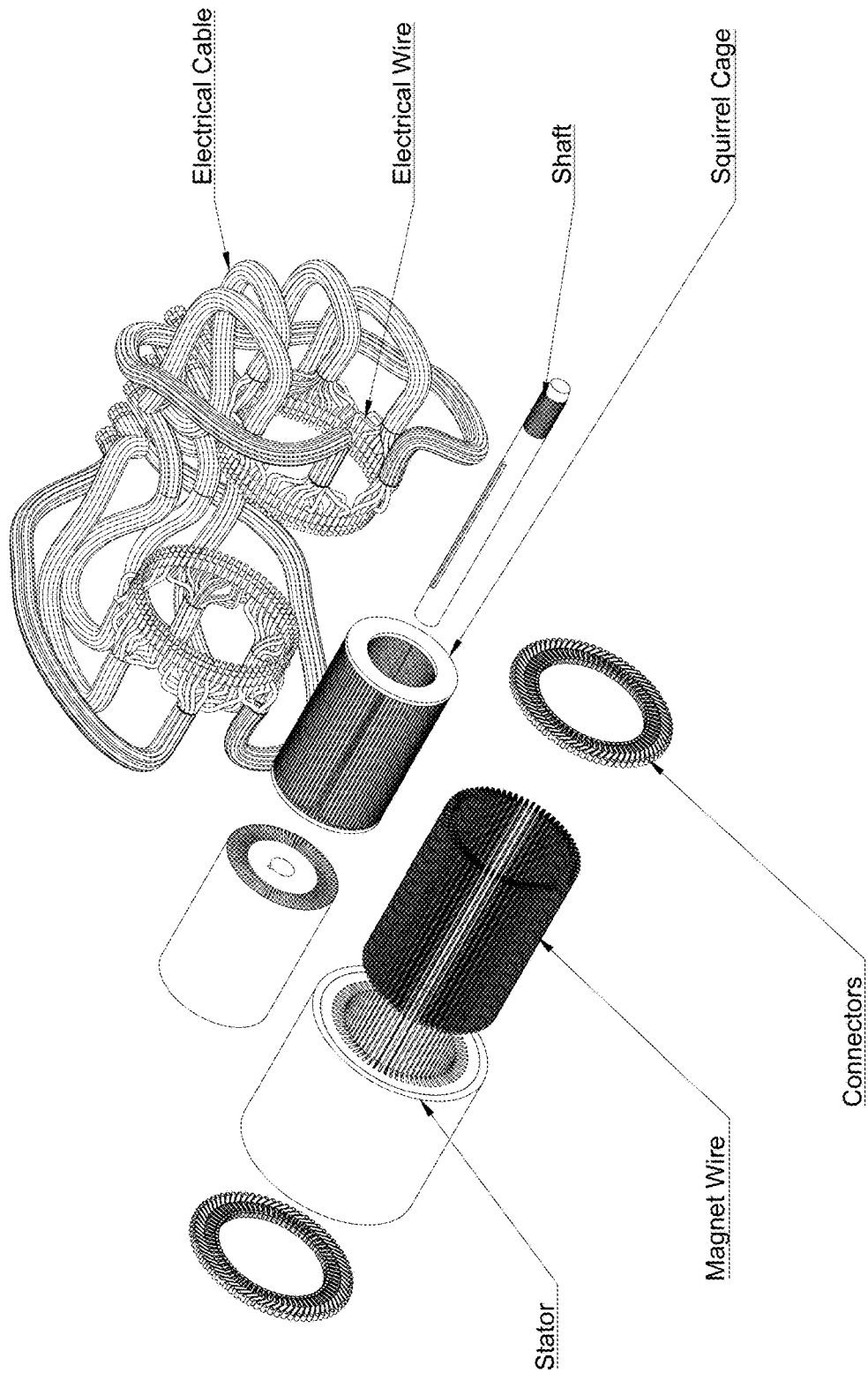
Figure 9E:
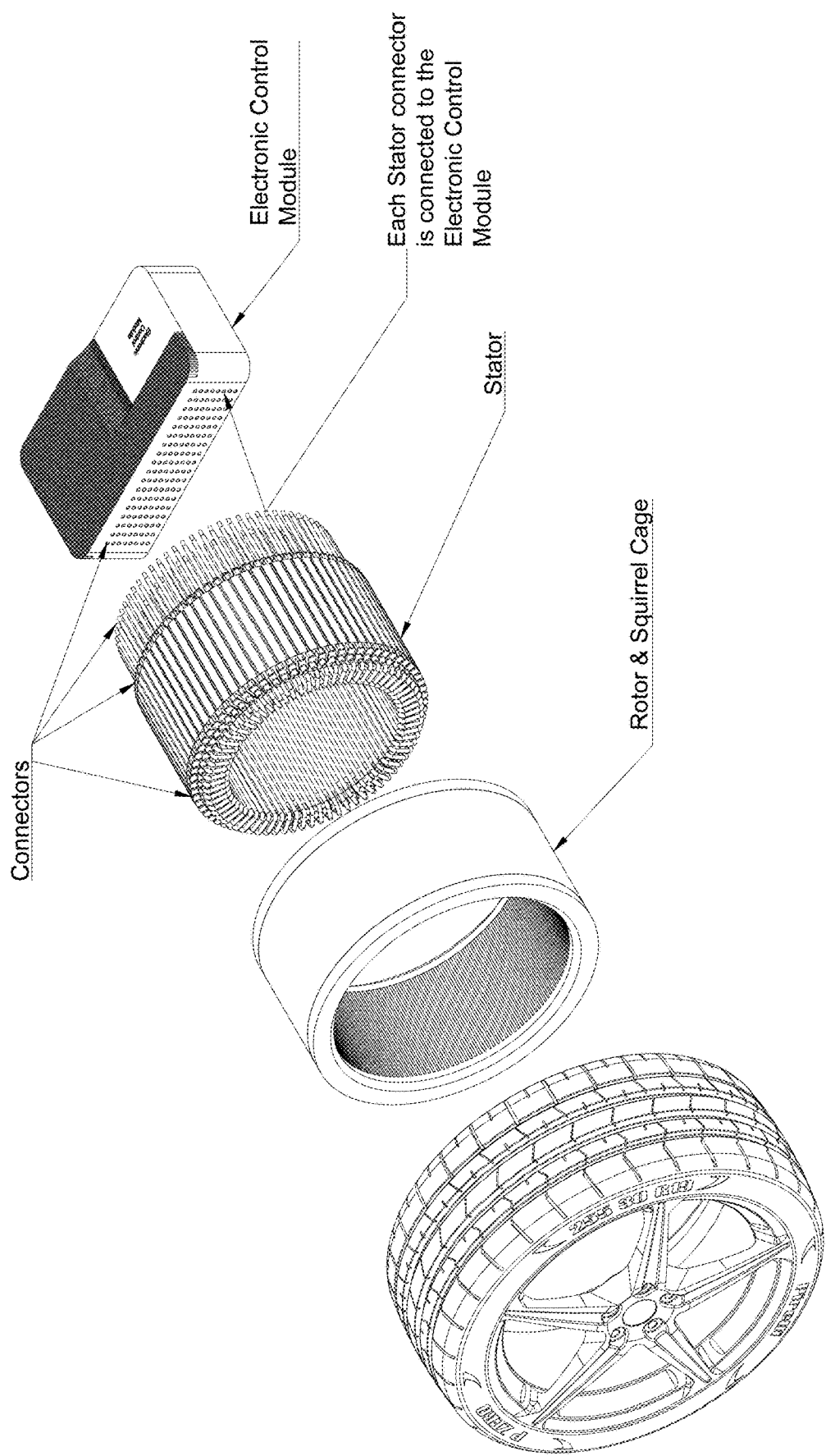
Figure 9F:
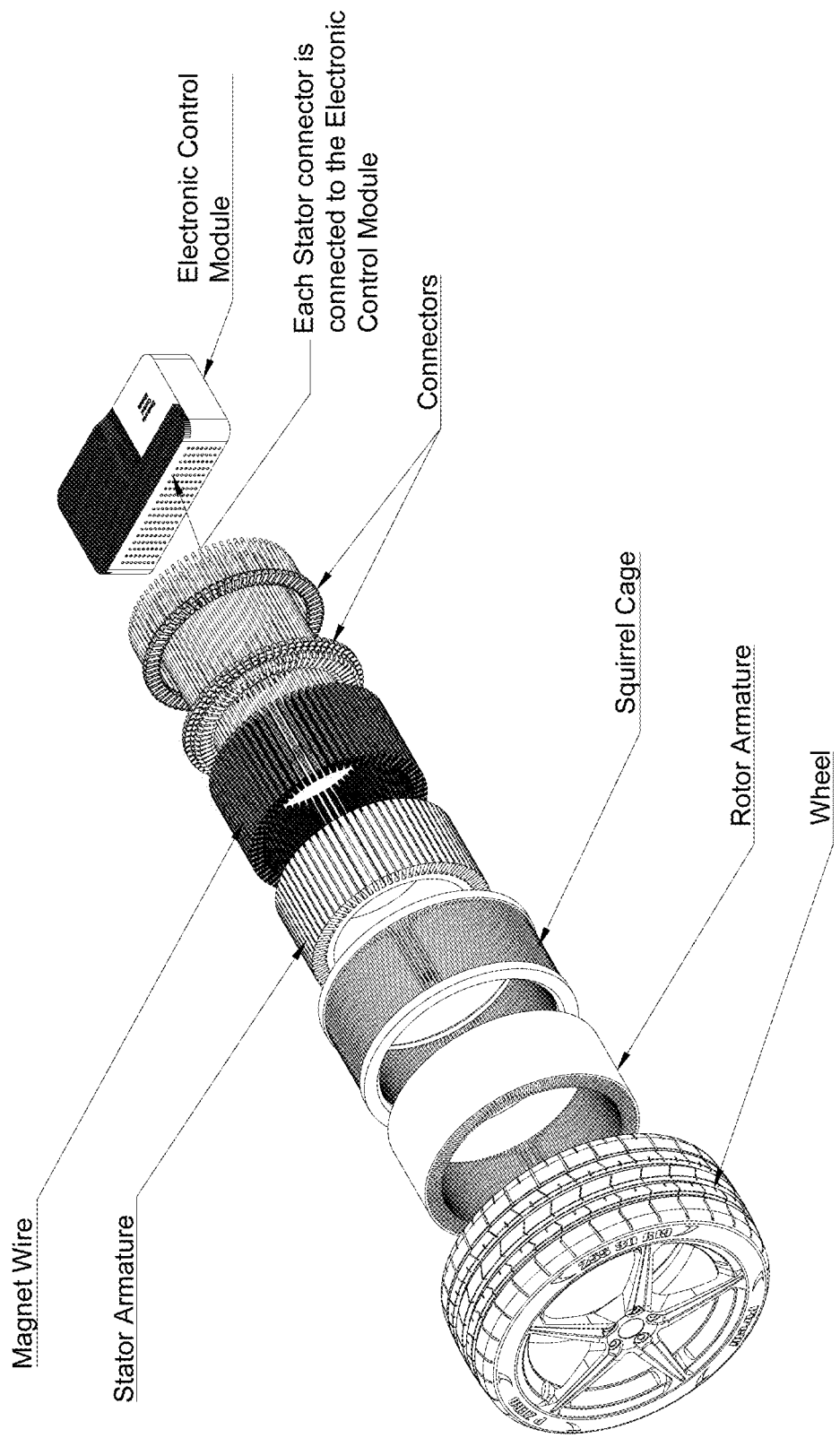
Figure 9G:
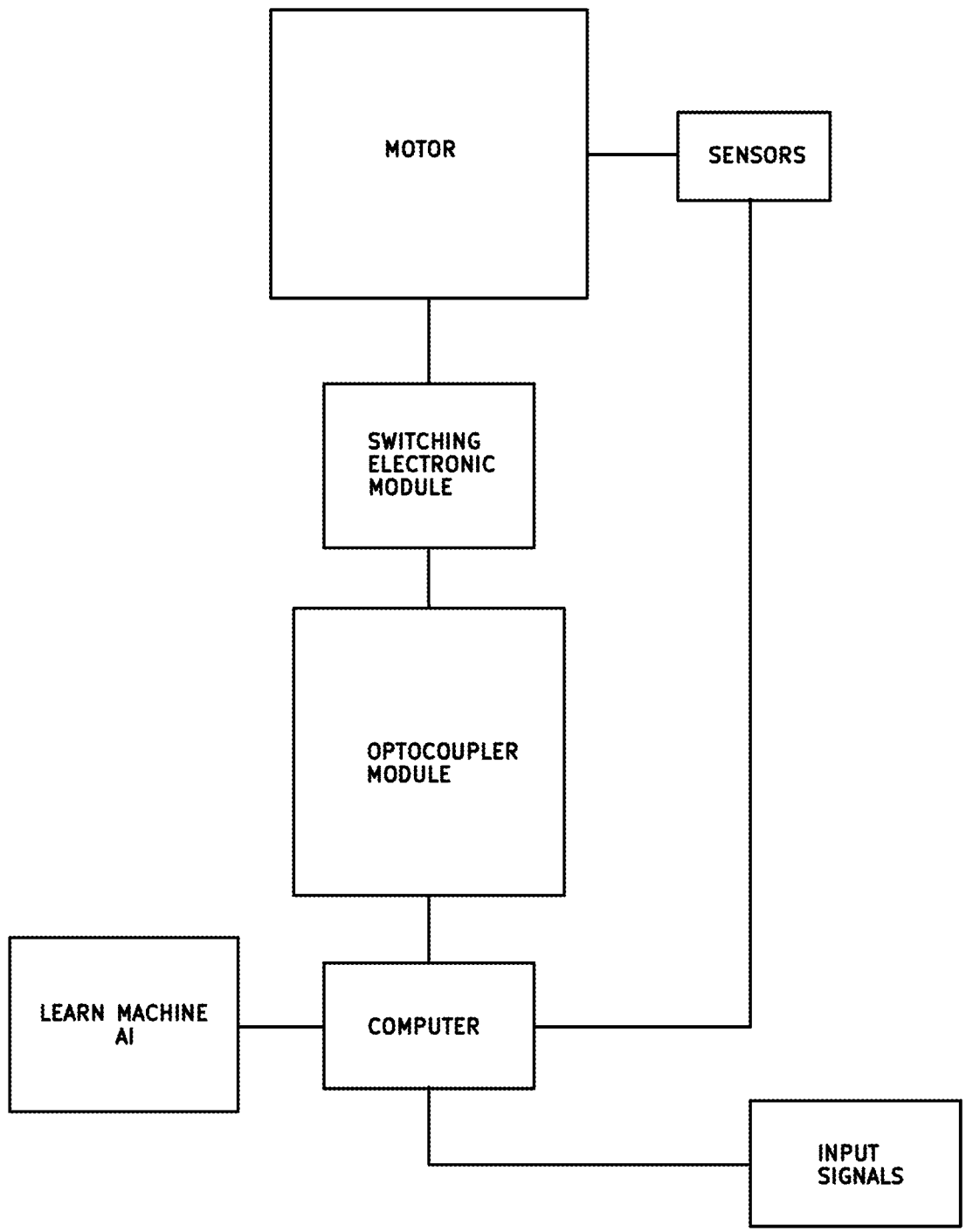
Figure 9H:
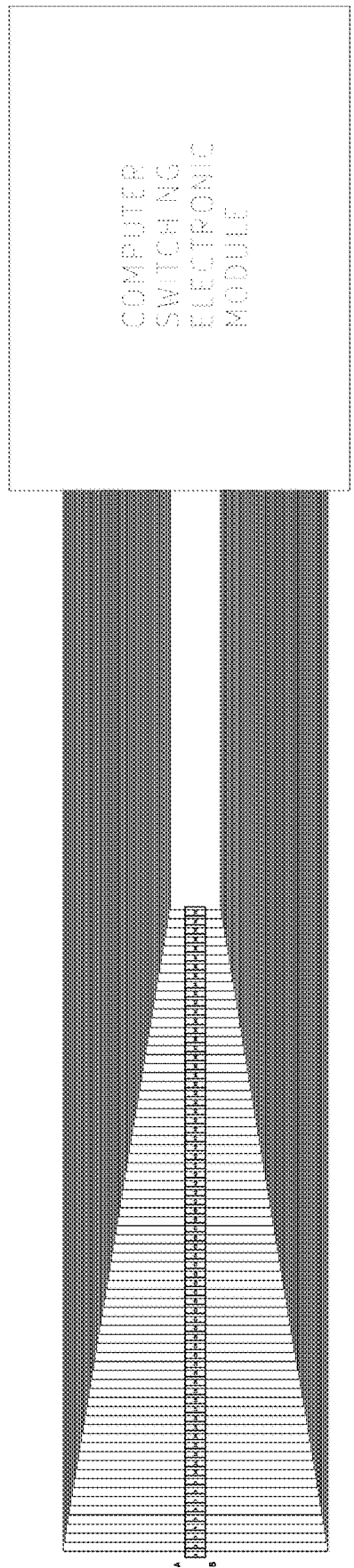
Figure 9I:
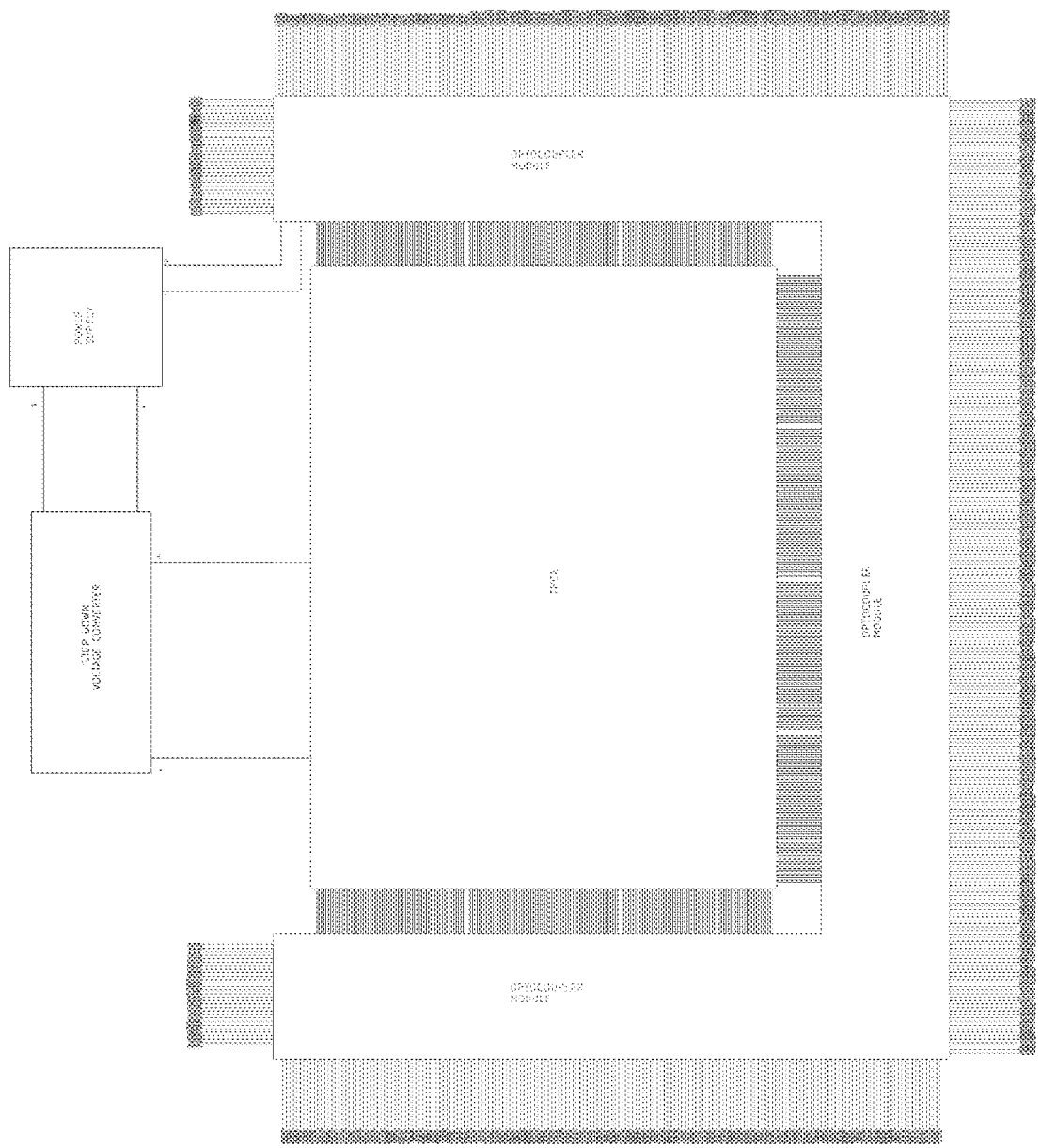
Figure 9J:
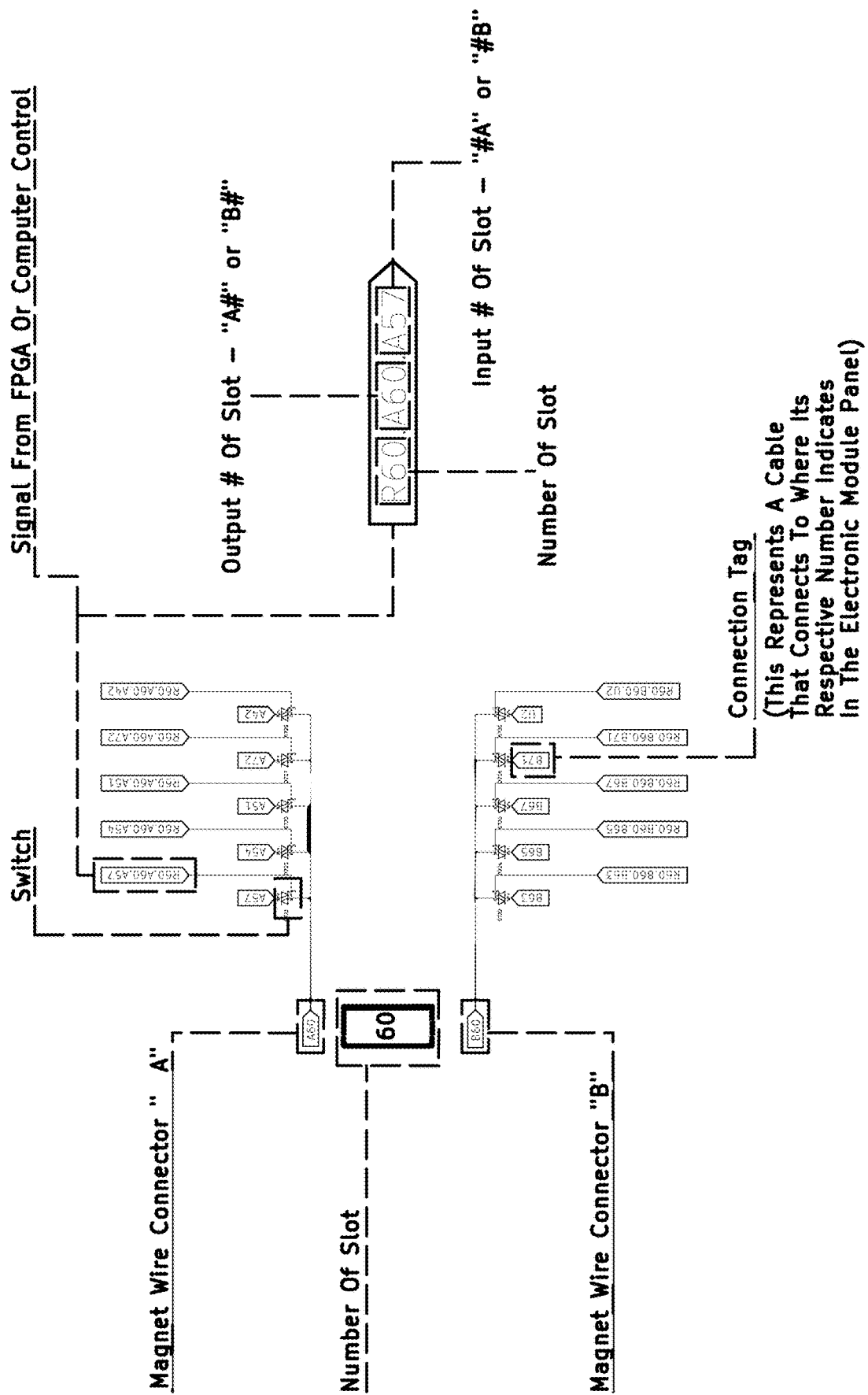

FIG. 8 illustrates an embodiment of a method 800 for controlling an electric motor 100, 400 in accordance with aspects of this disclosure. The steps of the method 800 can be performed, for example, by an electric control module (e.g., the electronic control module 102 of FIGS. 1-3B or the electronic control module 402 of FIGS. 4A and 4B) in some embodiments and may also be performed by other components of an electric motor in other embodiments. The steps of the method 800 may also be performed in other orders and/or concurrently in some implementations.

The method 800 starts at block 801. At block 802, the method 800 involves receiving a control signal. In some embodiments, the control signal is received at an electric control module of the electric motor 100, 400.

At block 804, the method 800 involves adjusting a configuration of a plurality of poles of a stator 104, 404 of the electric motor 100, 400 based on the control signal. The stator 104, 404 can include a plurality of magnetic conductive wires configured to form the plurality of poles. The adjusting can be performed using the electric control module.

At block 806, the method 800 involves providing an alternating current power source to the magnetic conductive wires of the stator 104, 404 to generate a magnetic field to cause a rotor of the electric motor 100, 400 to produce torque. The method 800 ends at block 808.

Additional Examples

FIGS. 9A-9J illustrates further examples of the electric motor and components of the electric motor in accordance with aspects of this disclosure.

Figure 10:
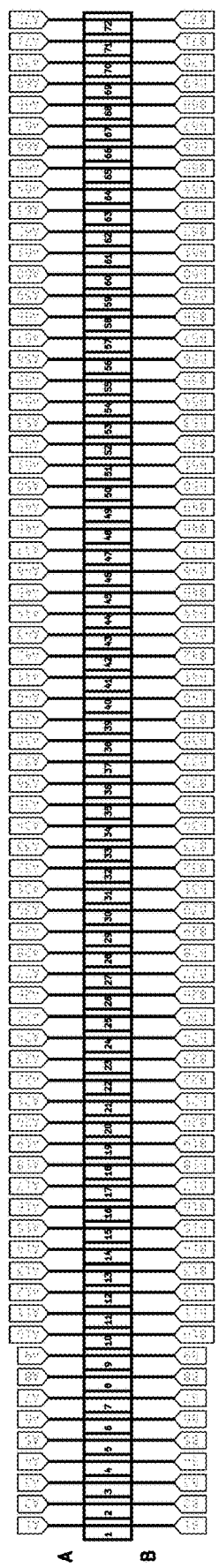
FIG. 10 illustrates a winding diagram of the electric motor in accordance with aspects of this disclosure.
Figure 11A:
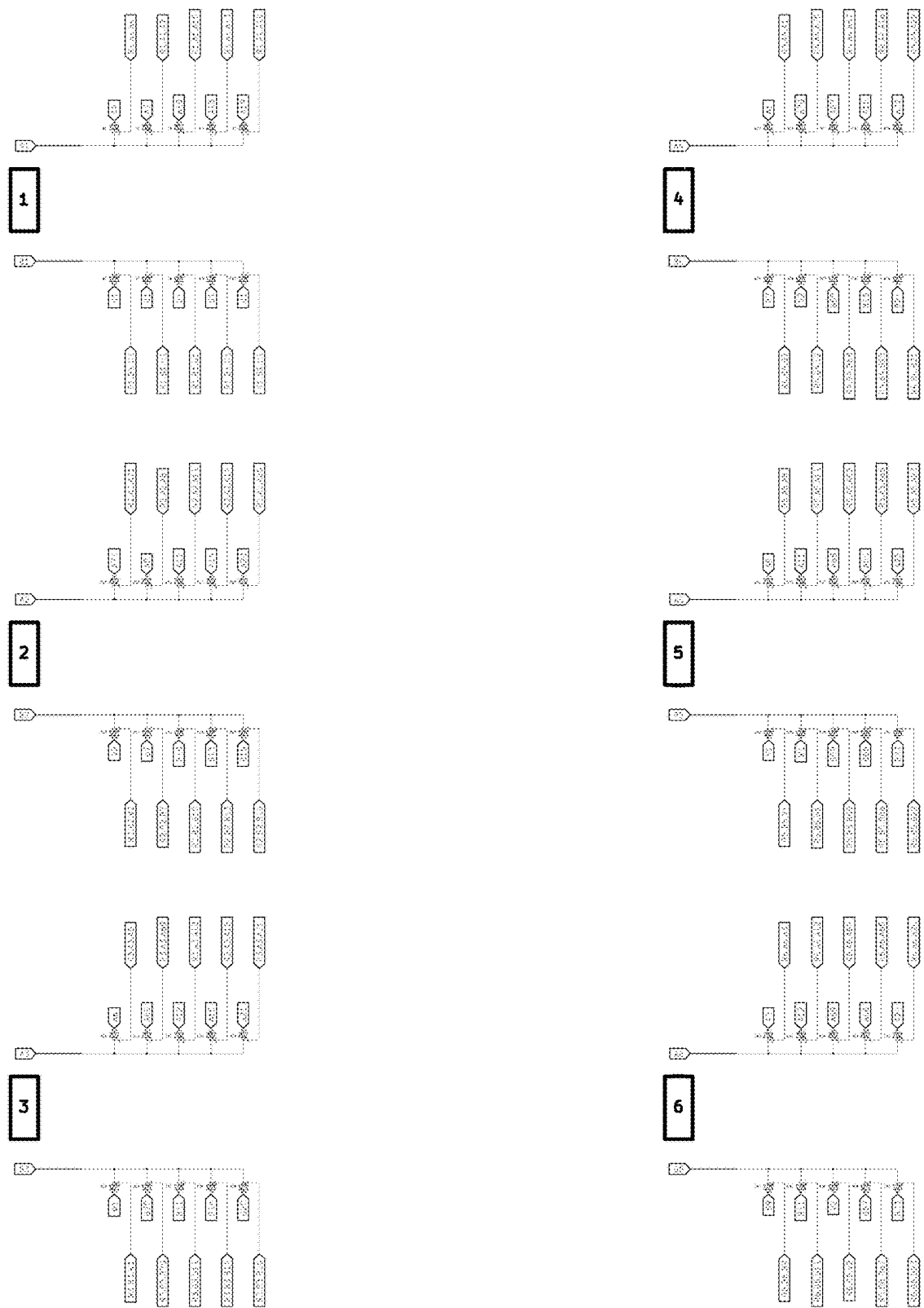
FIGS. 11A-11L illustrate the switching panels slots of the electric motor in accordance with aspects of this disclosure.
Figure 11B:
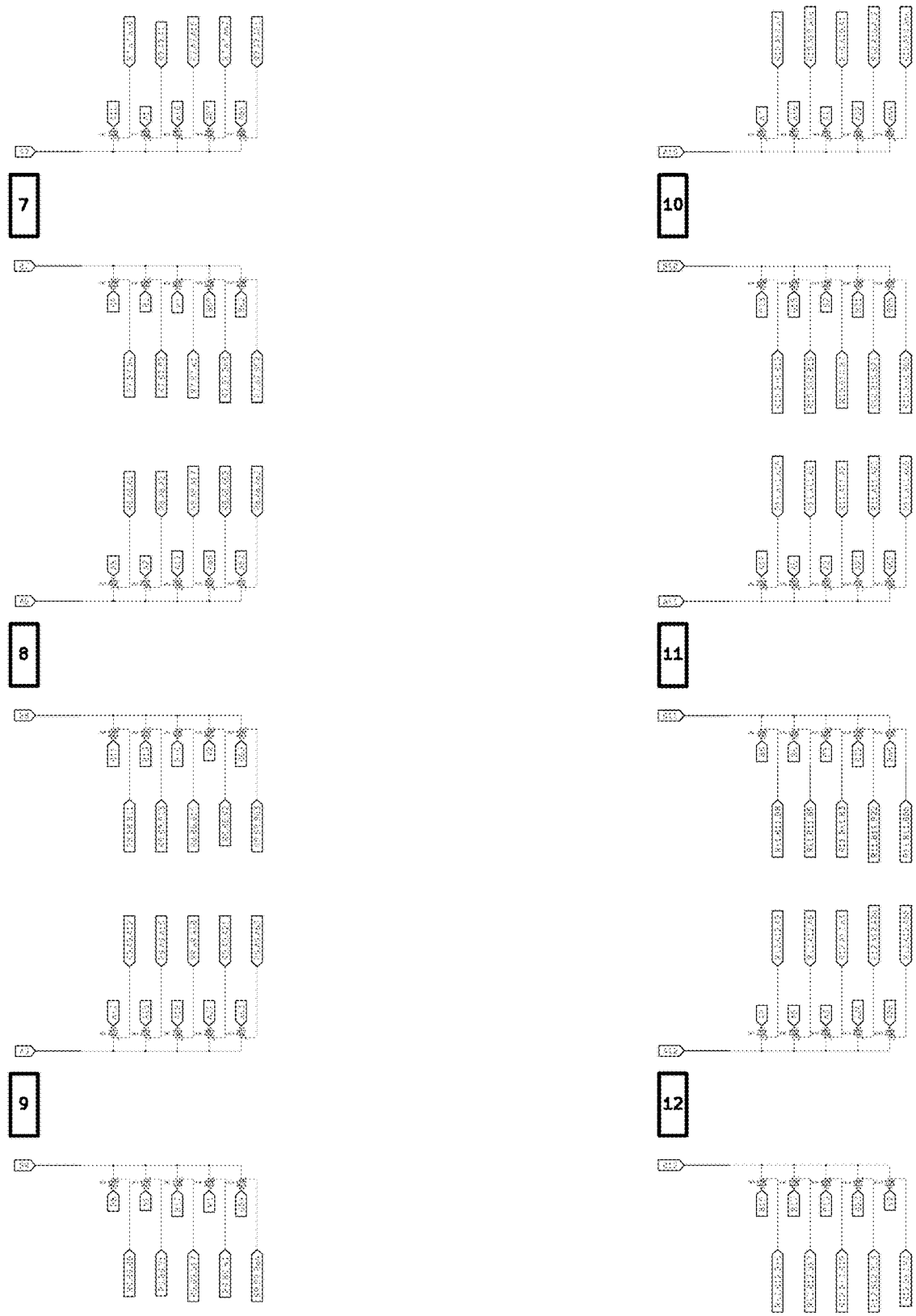
Figure 11C:
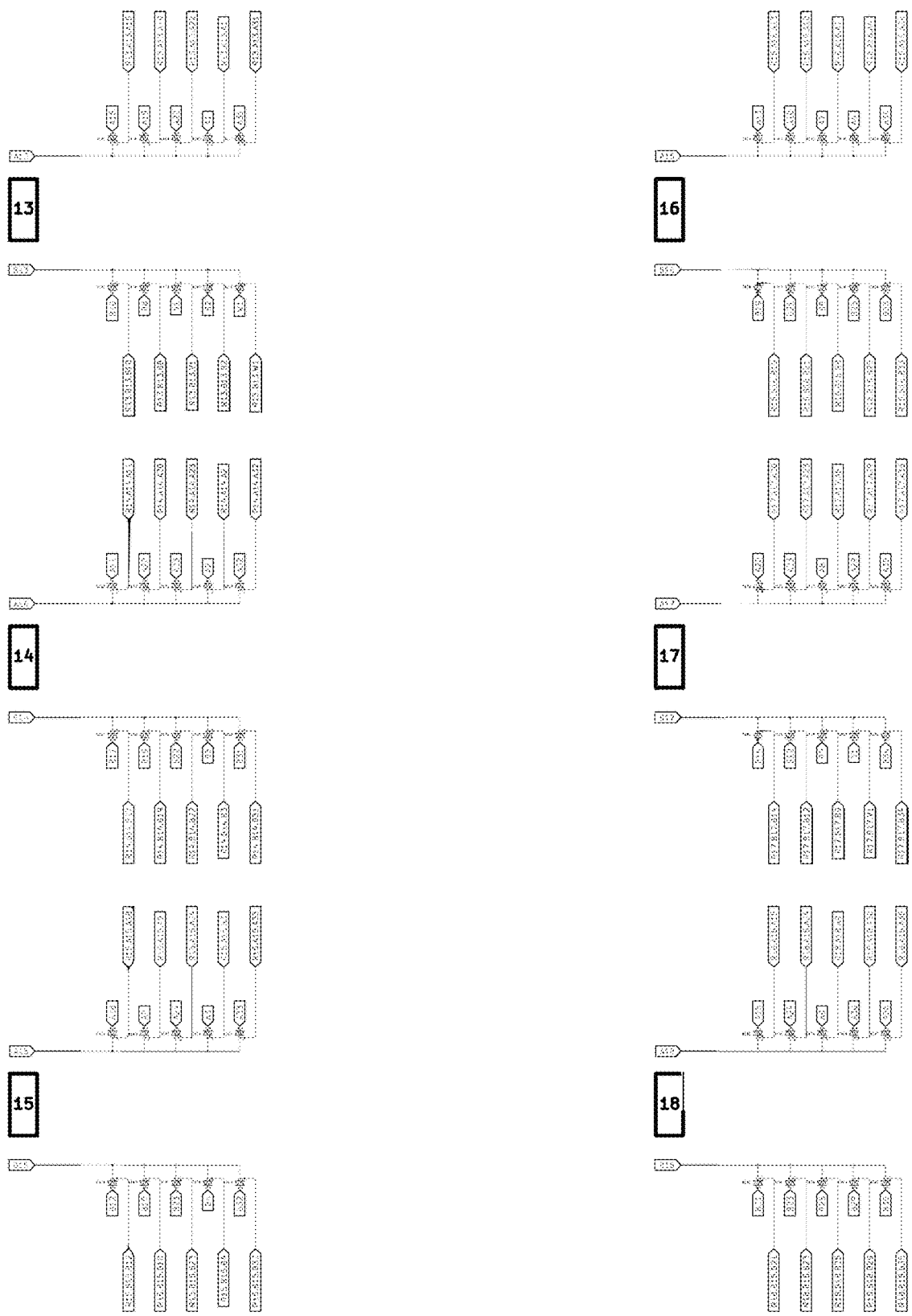
Figure 11D:
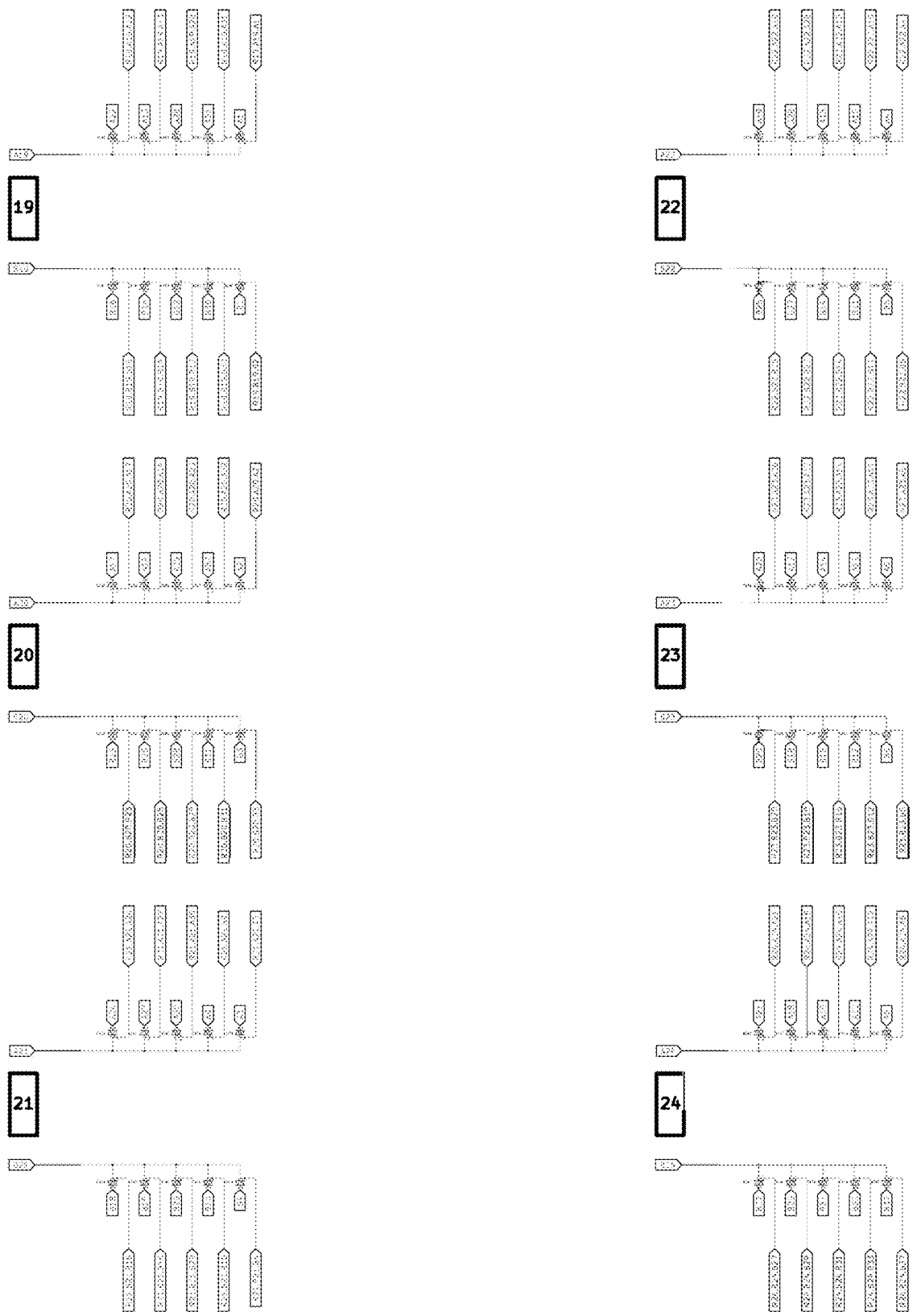
Figure 11E:
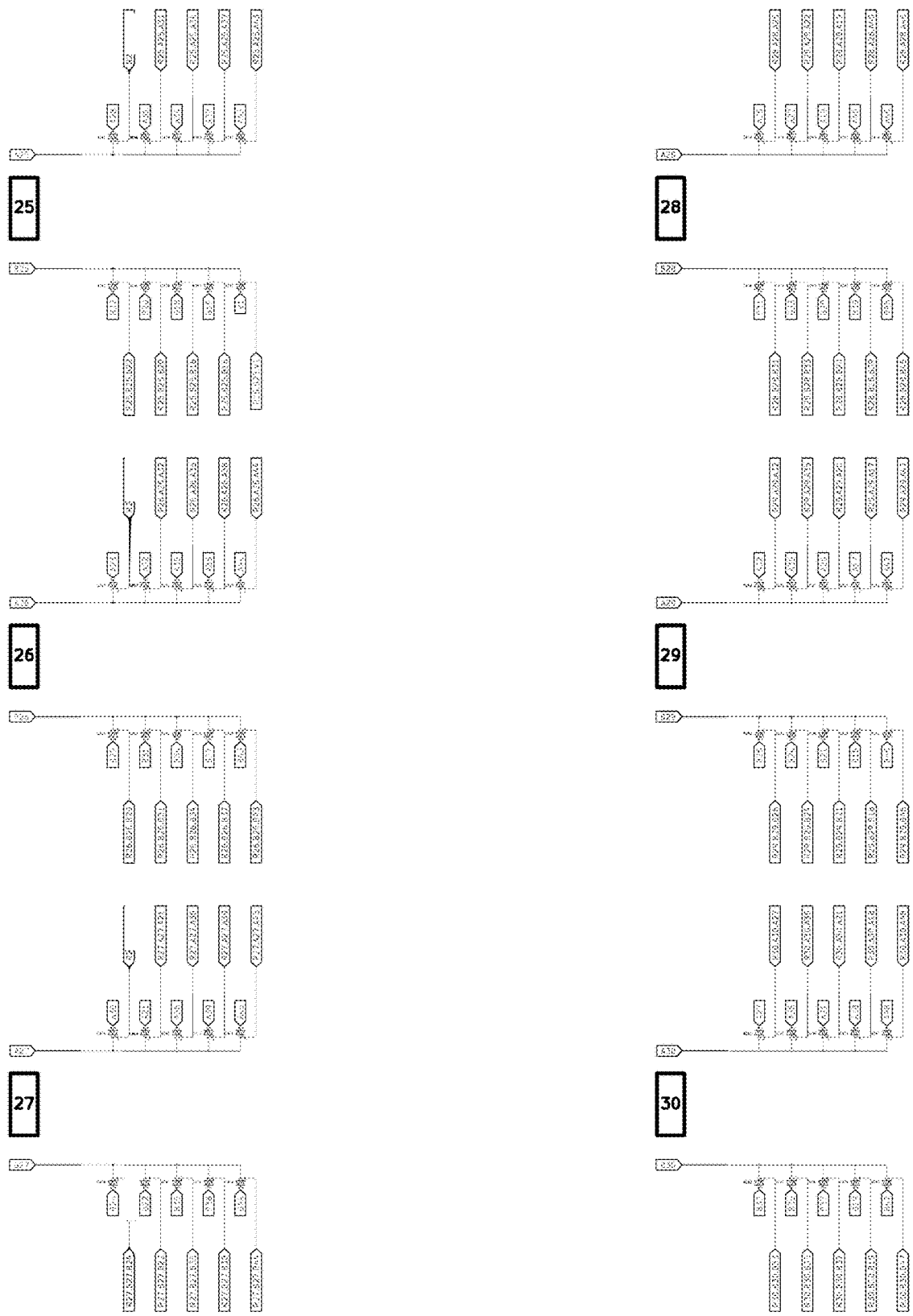
Figure 11F:
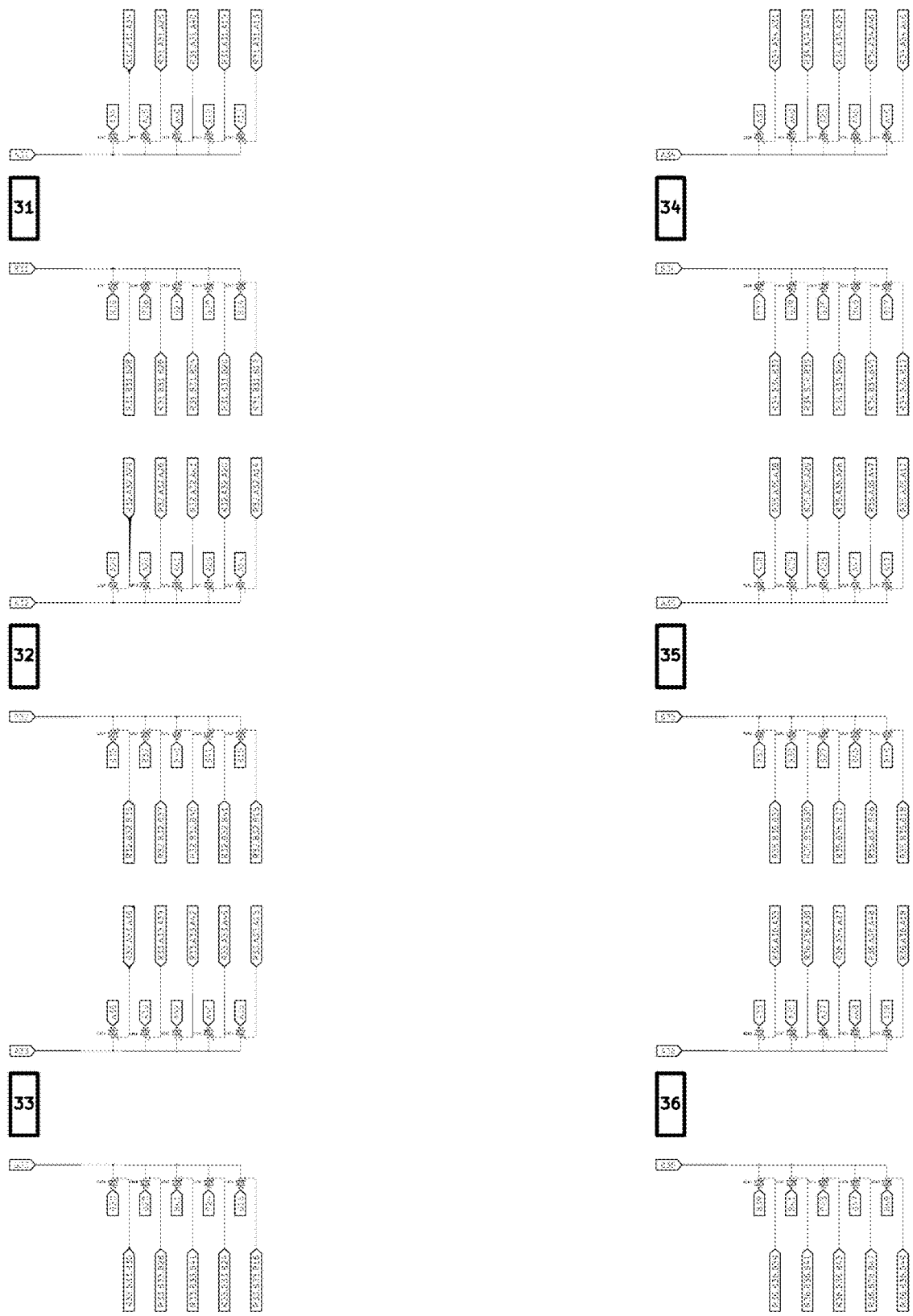
Figure 11G:
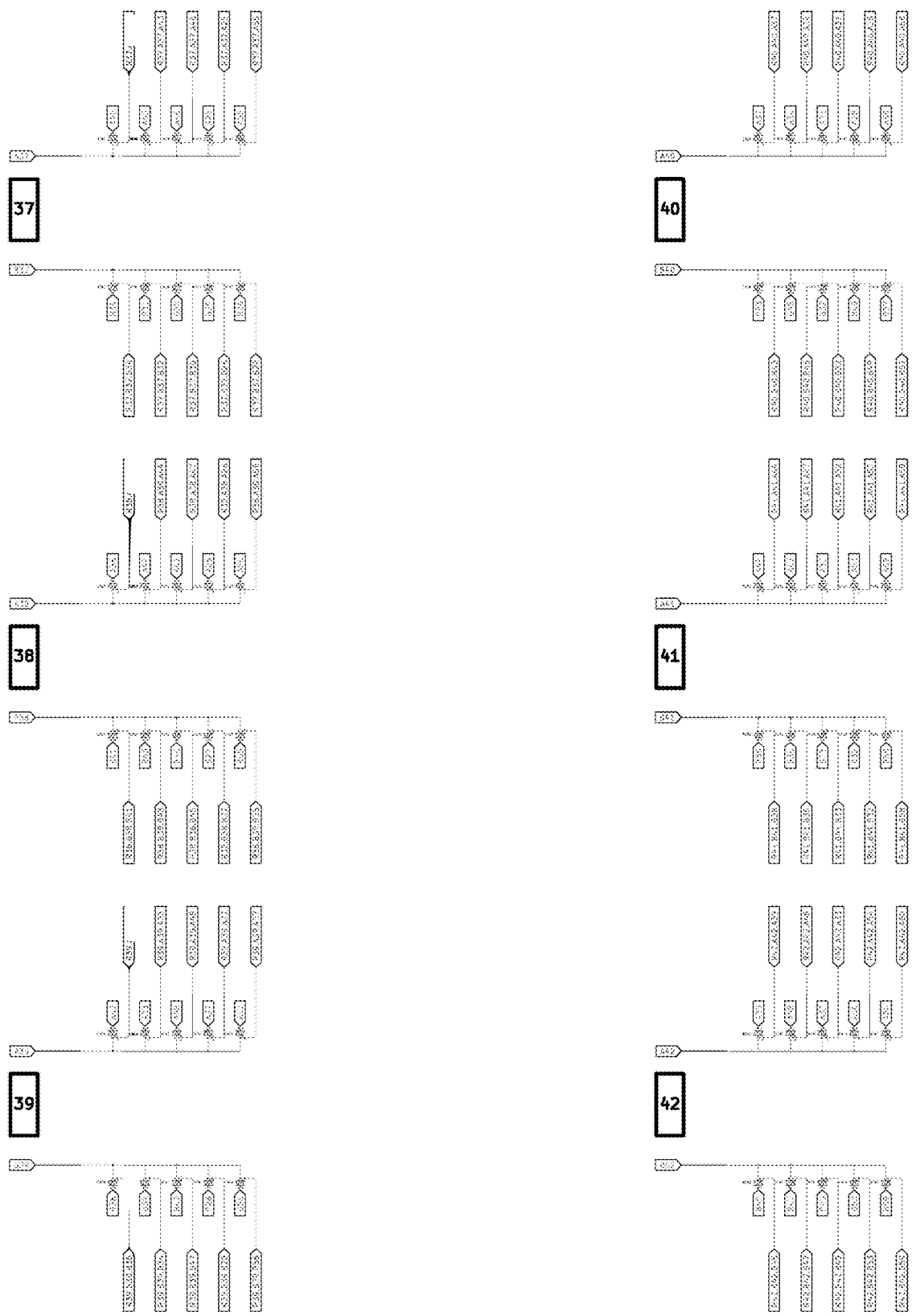
Figure 11H:
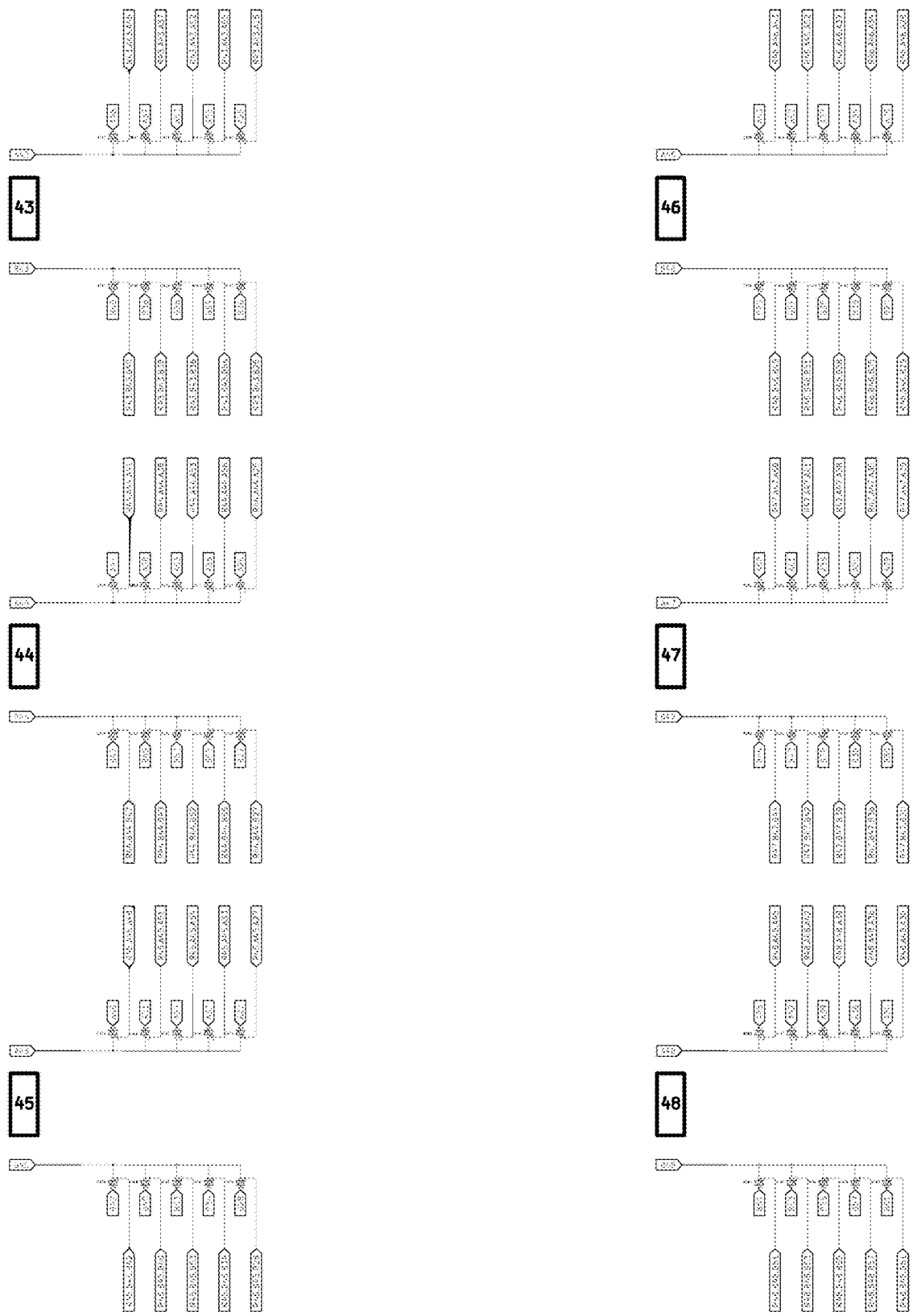
Figure 11I:
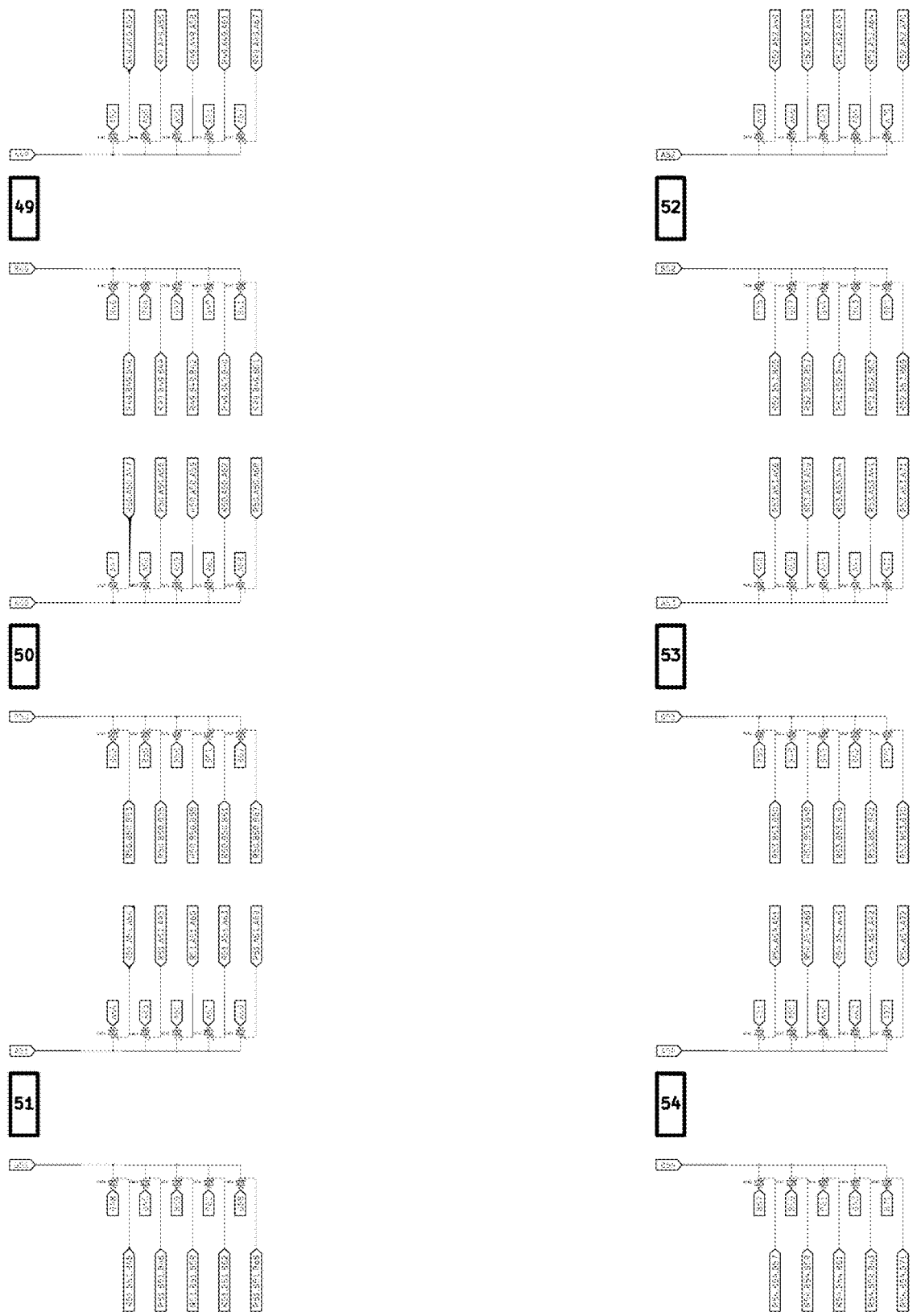
Figure 11J:
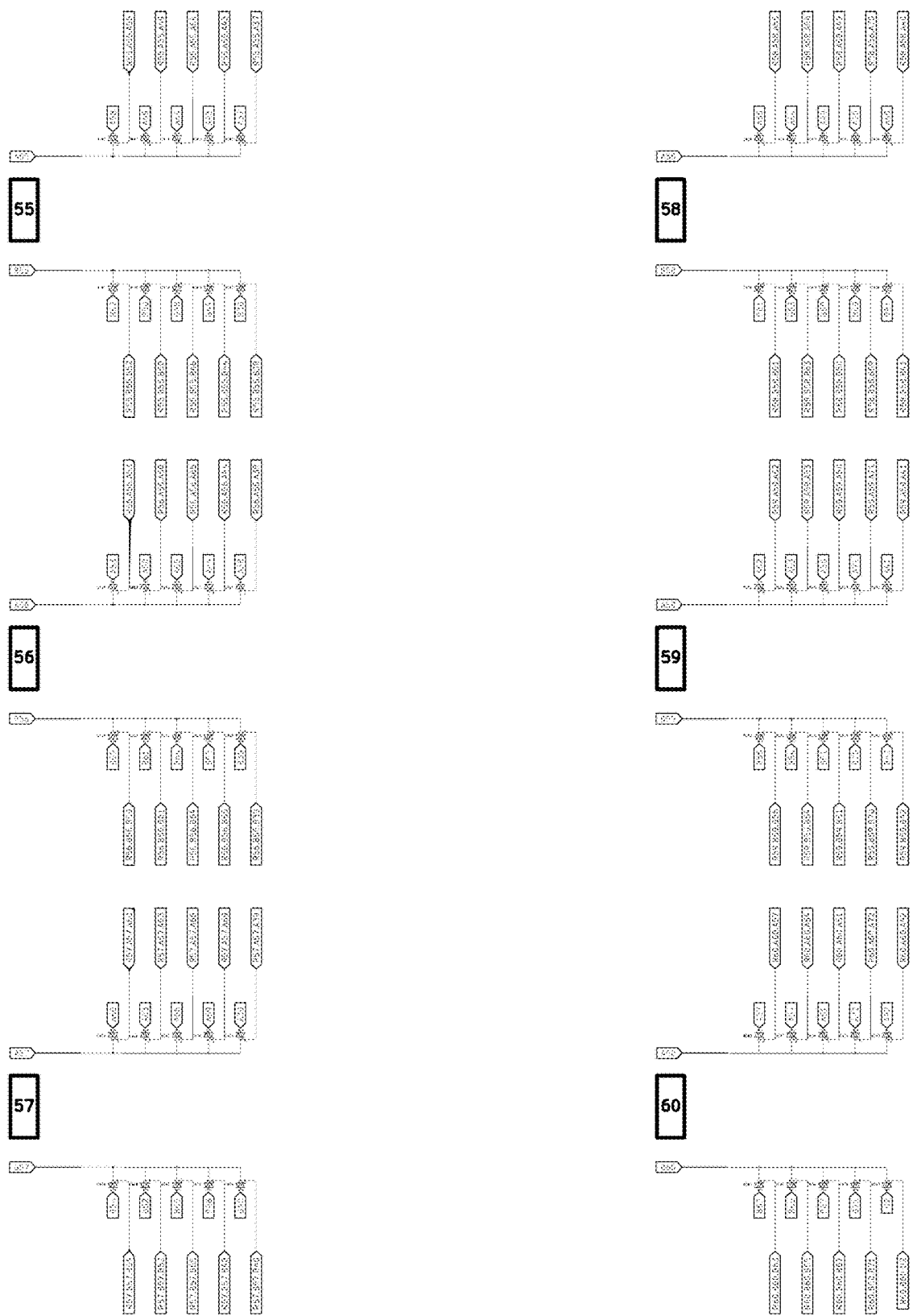
Figure 11K:
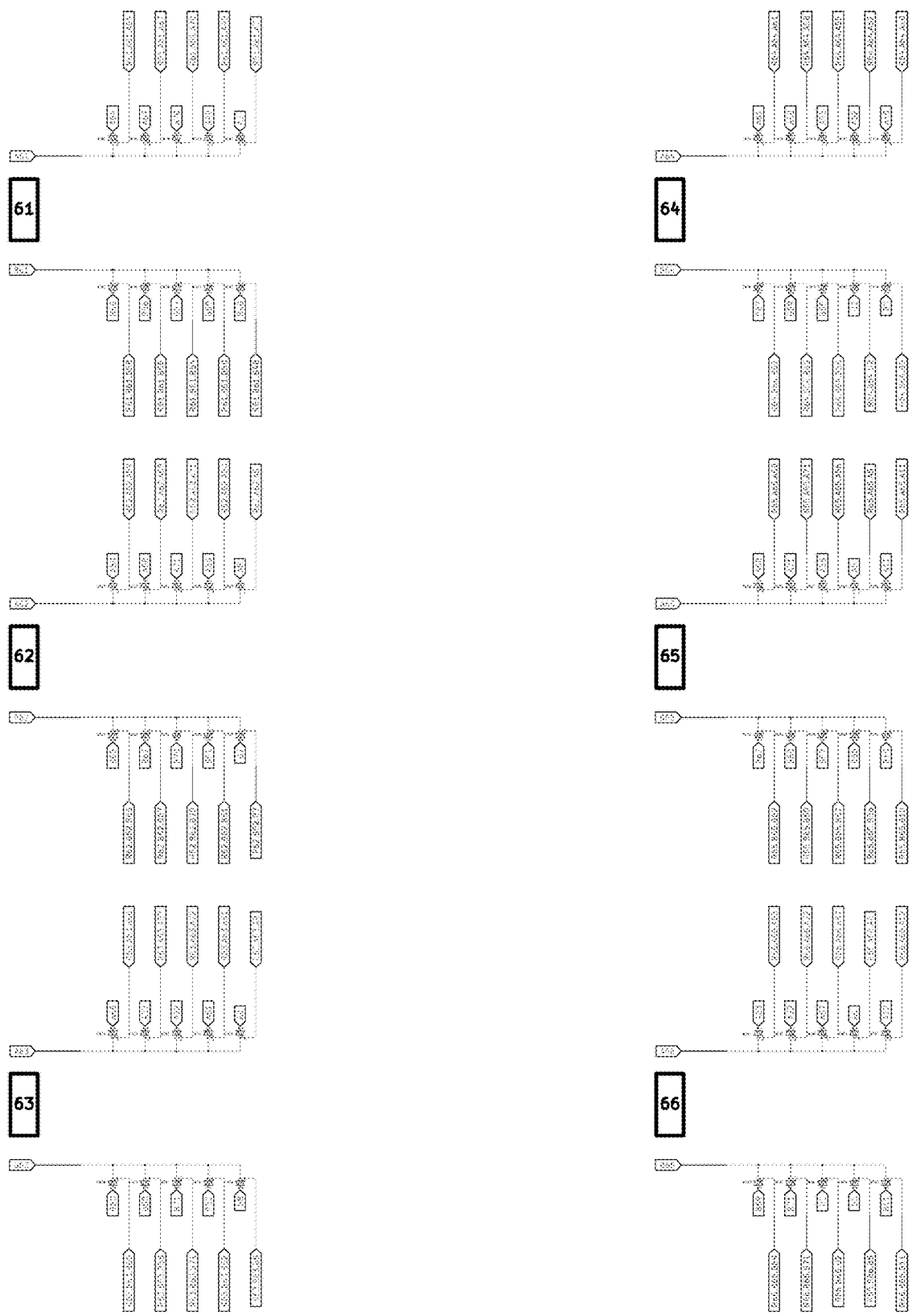
Figure 11L:
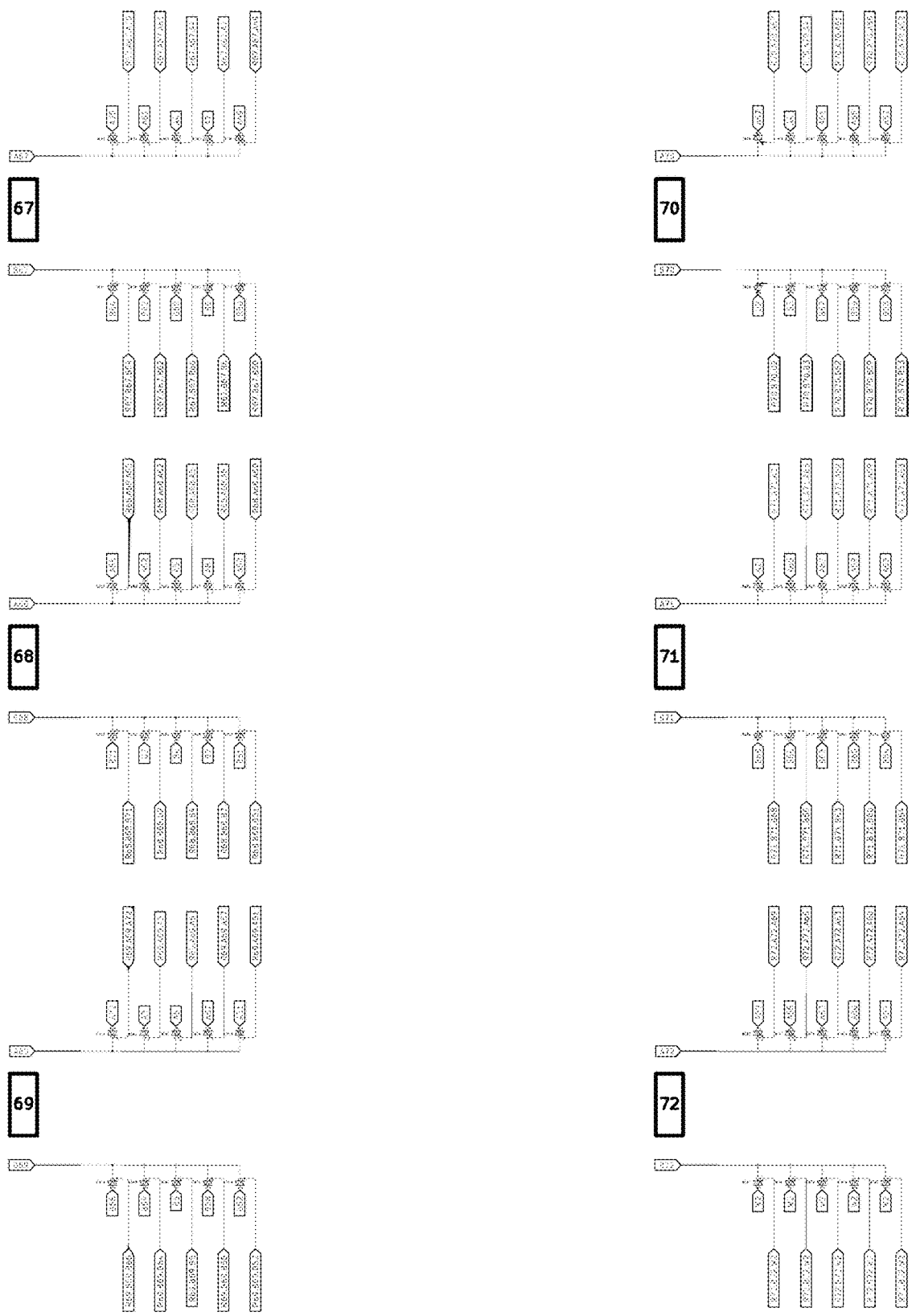

FIG. 10 illustrates a winding diagram of the electric motor in accordance with aspects of this disclosure.

FIGS. 11A-11L illustrate the switching panels slots of the electric motor in accordance with aspects of this disclosure.

Figure 12:
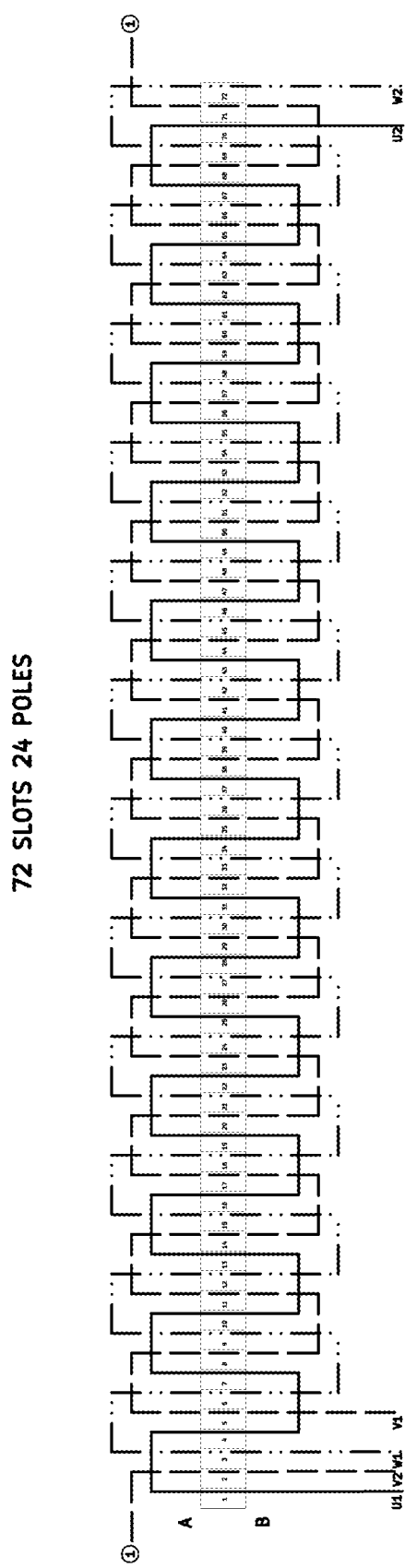
FIG. 12 illustrates a winding diagram for a configuration of the electric motor with 24 poles in accordance with aspects of this disclosure.
Figure 13A:
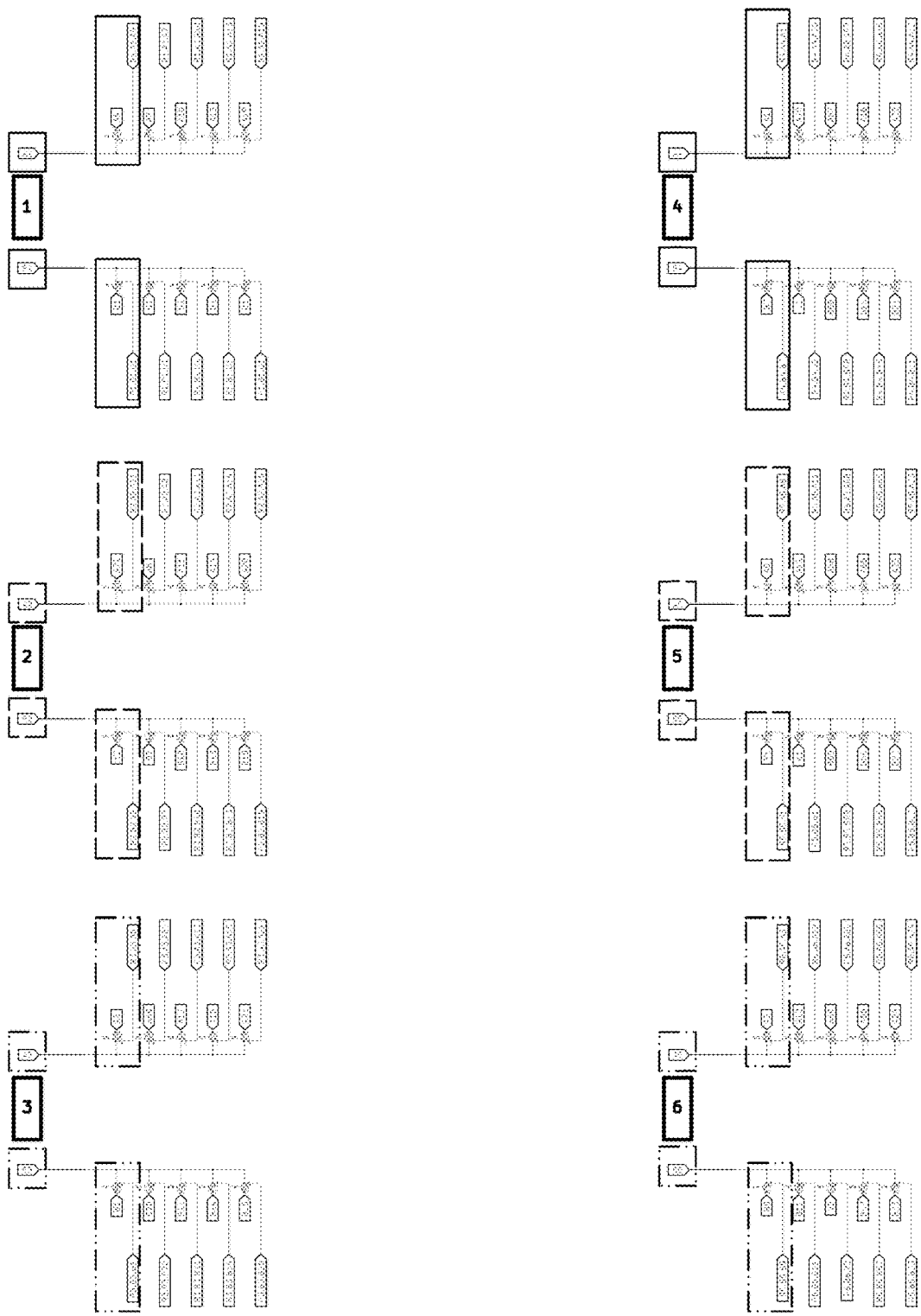
FIGS. 13A-13L illustrate the switching panel slots for a configuration of the electric motor with 24 poles in accordance with aspects of this disclosure.
Figure 13B:
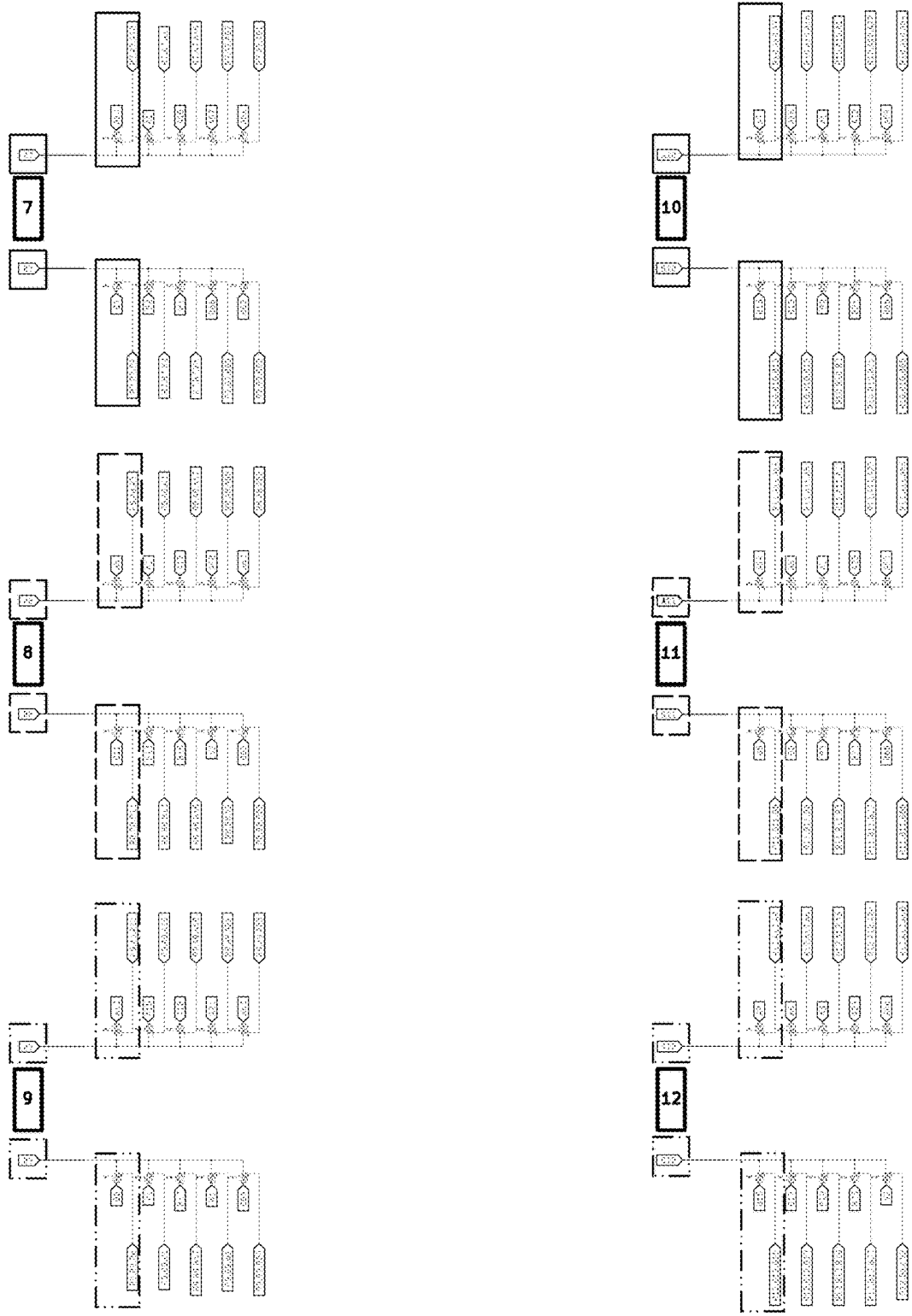
Figure 13C:
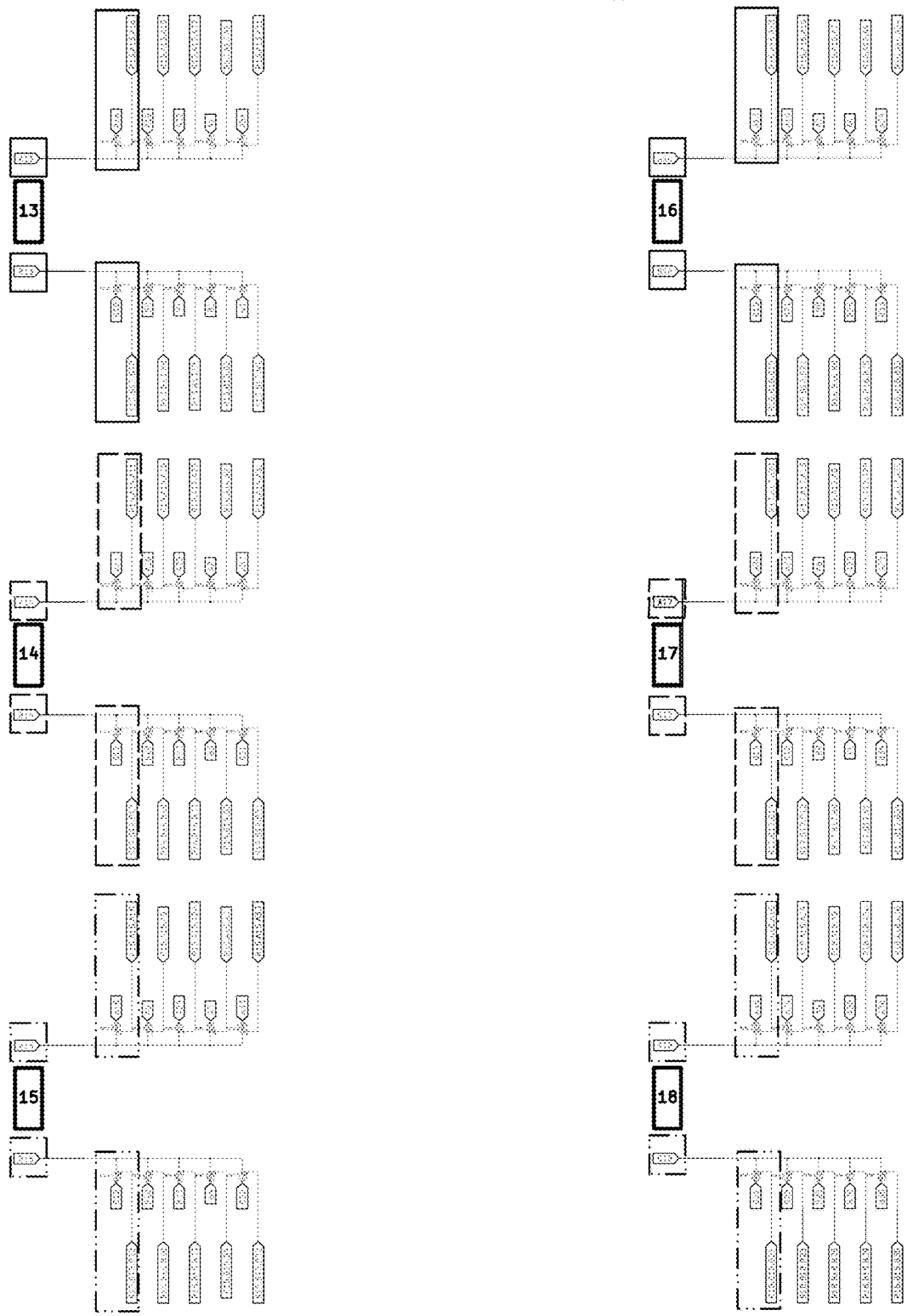
Figure 13D:
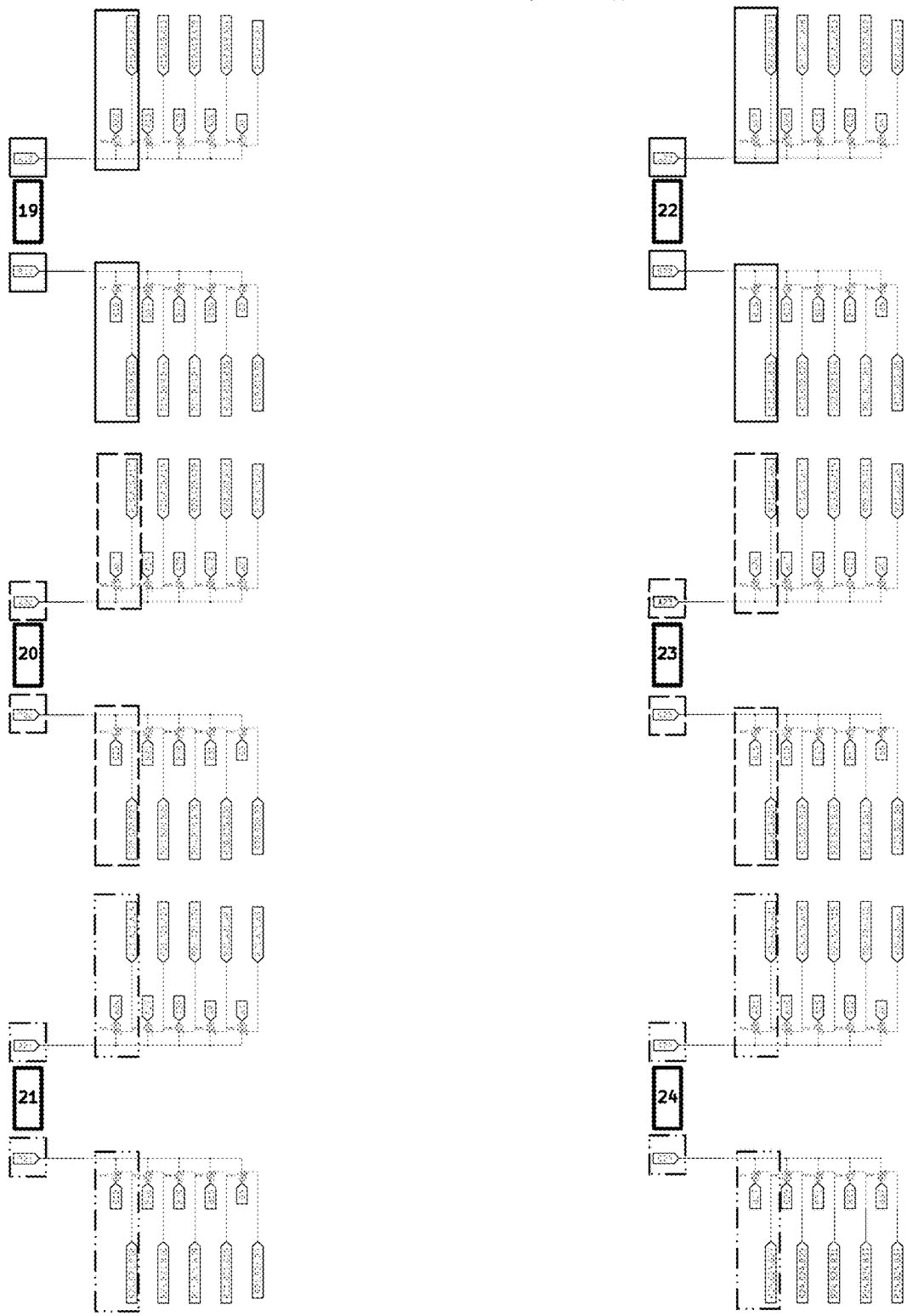
Figure 13E:
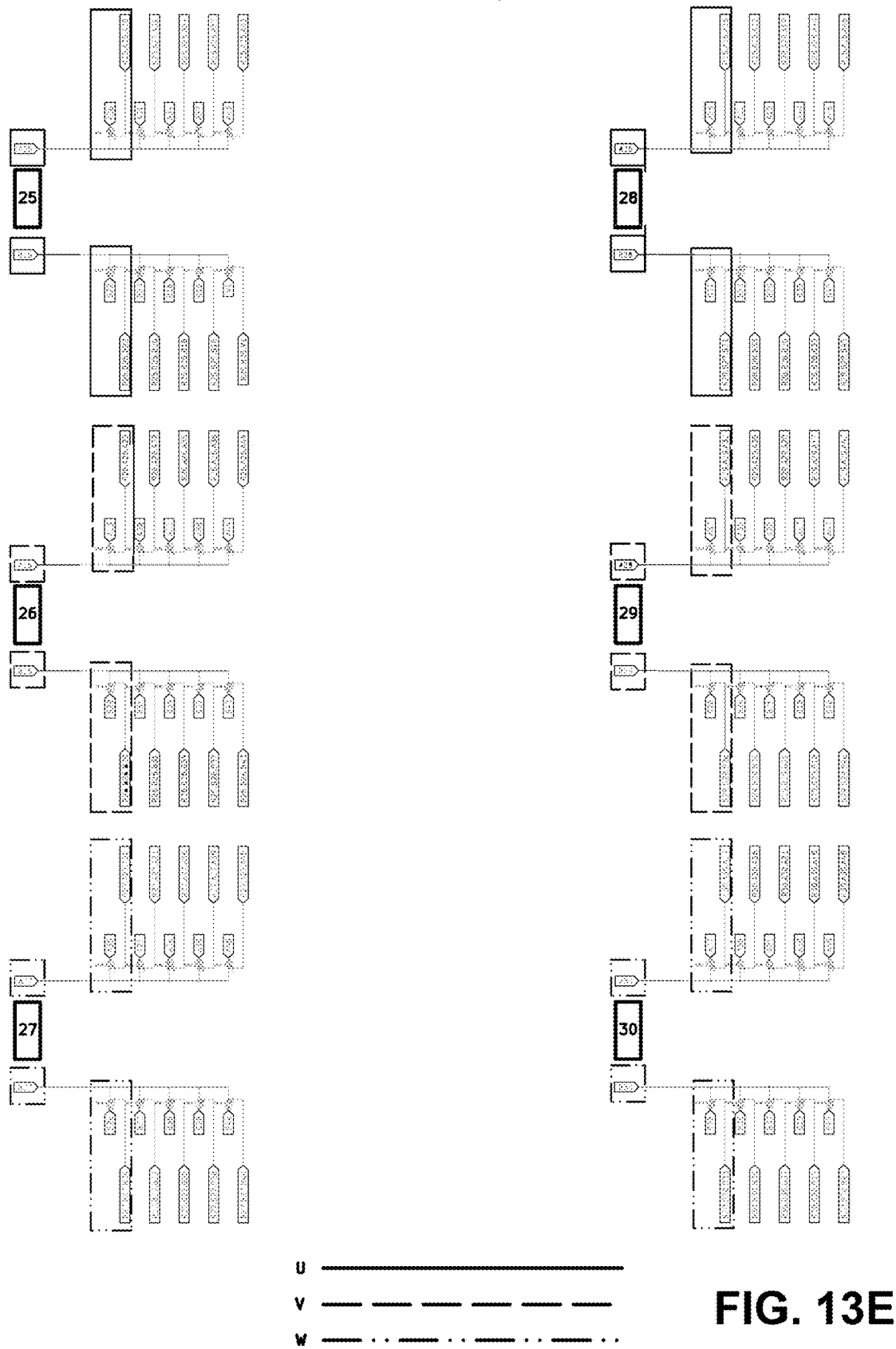
Figure 13F:
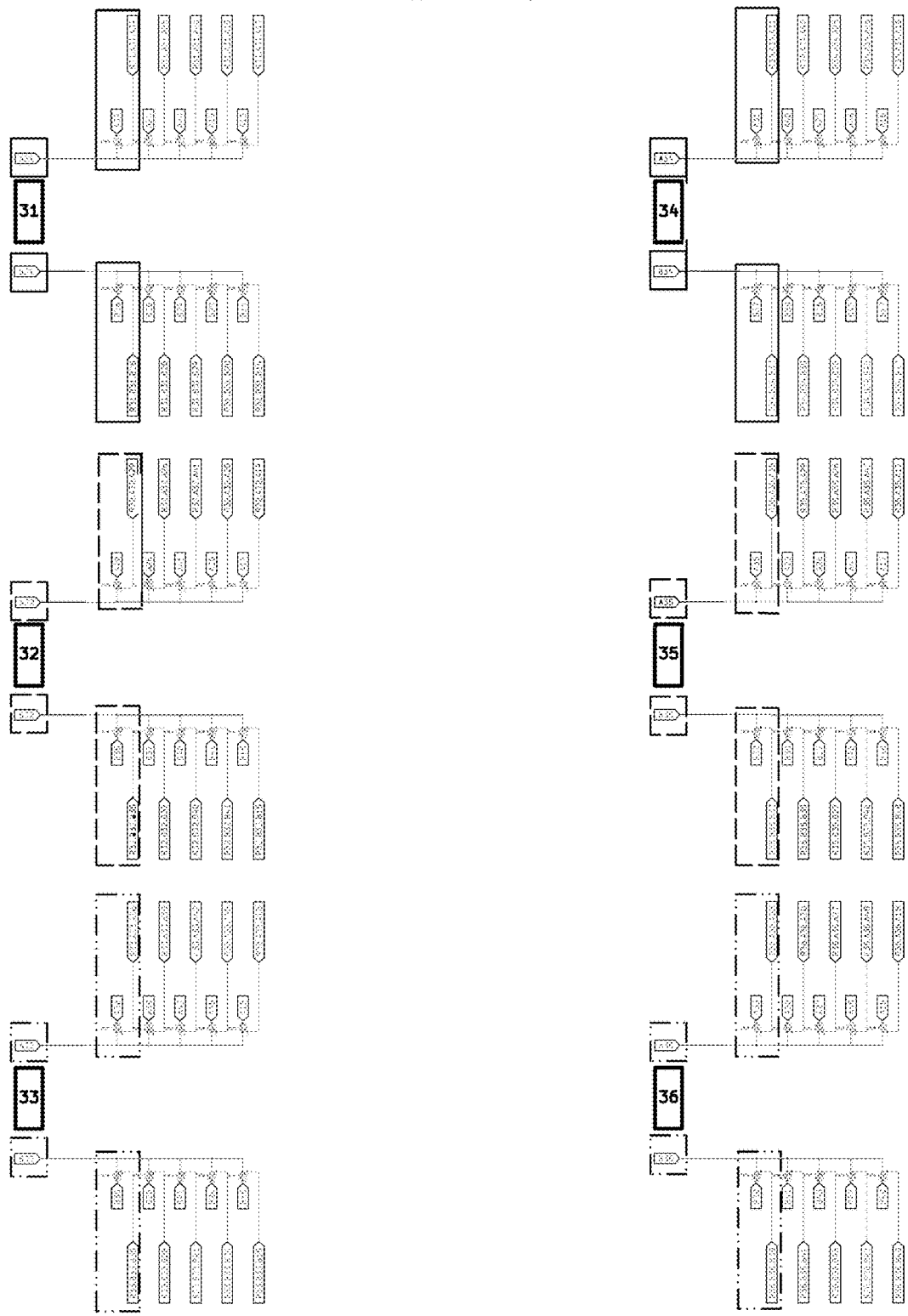
Figure 13G:
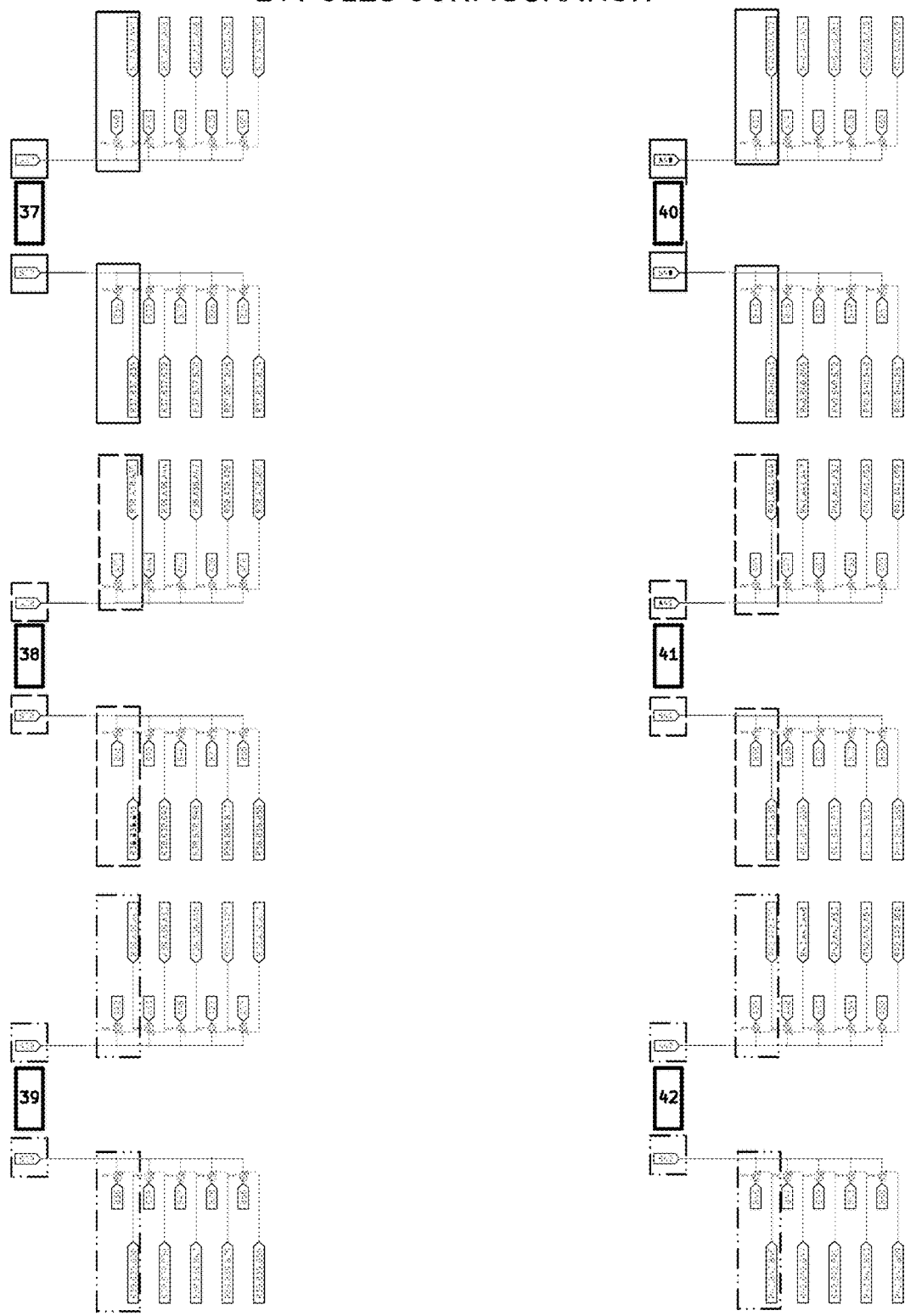
Figure 13H:
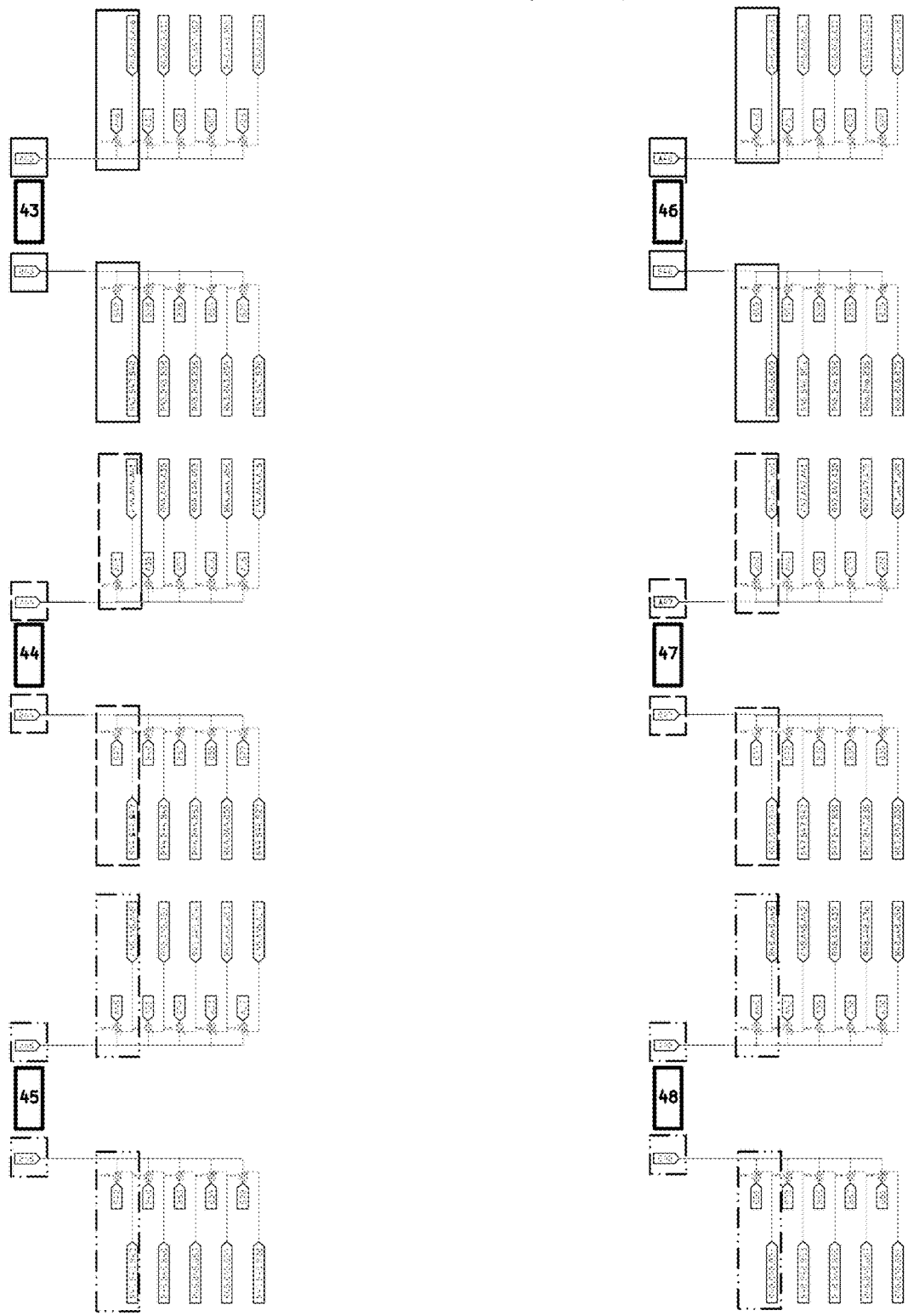
Figure 13I:
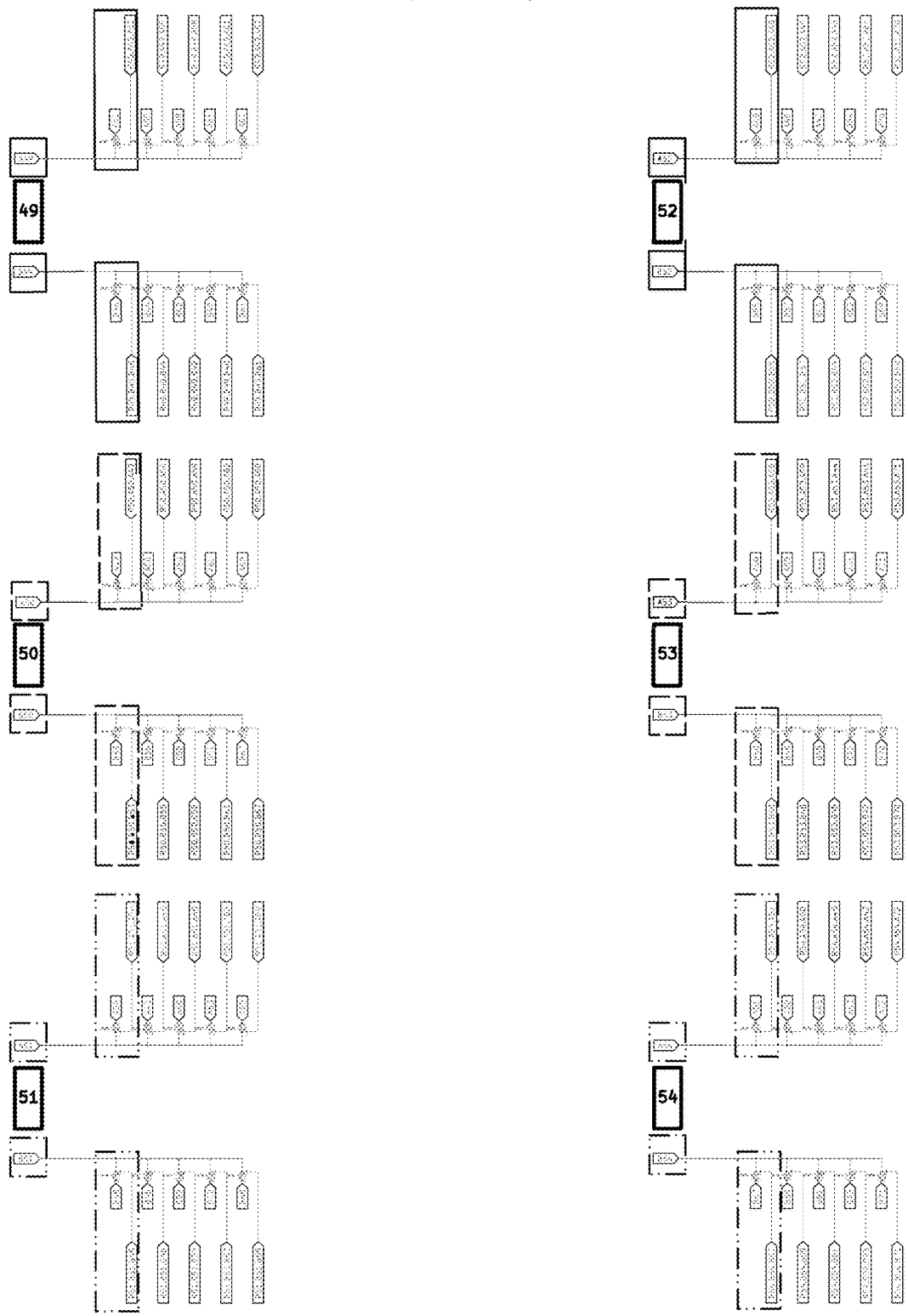
Figure 13J:
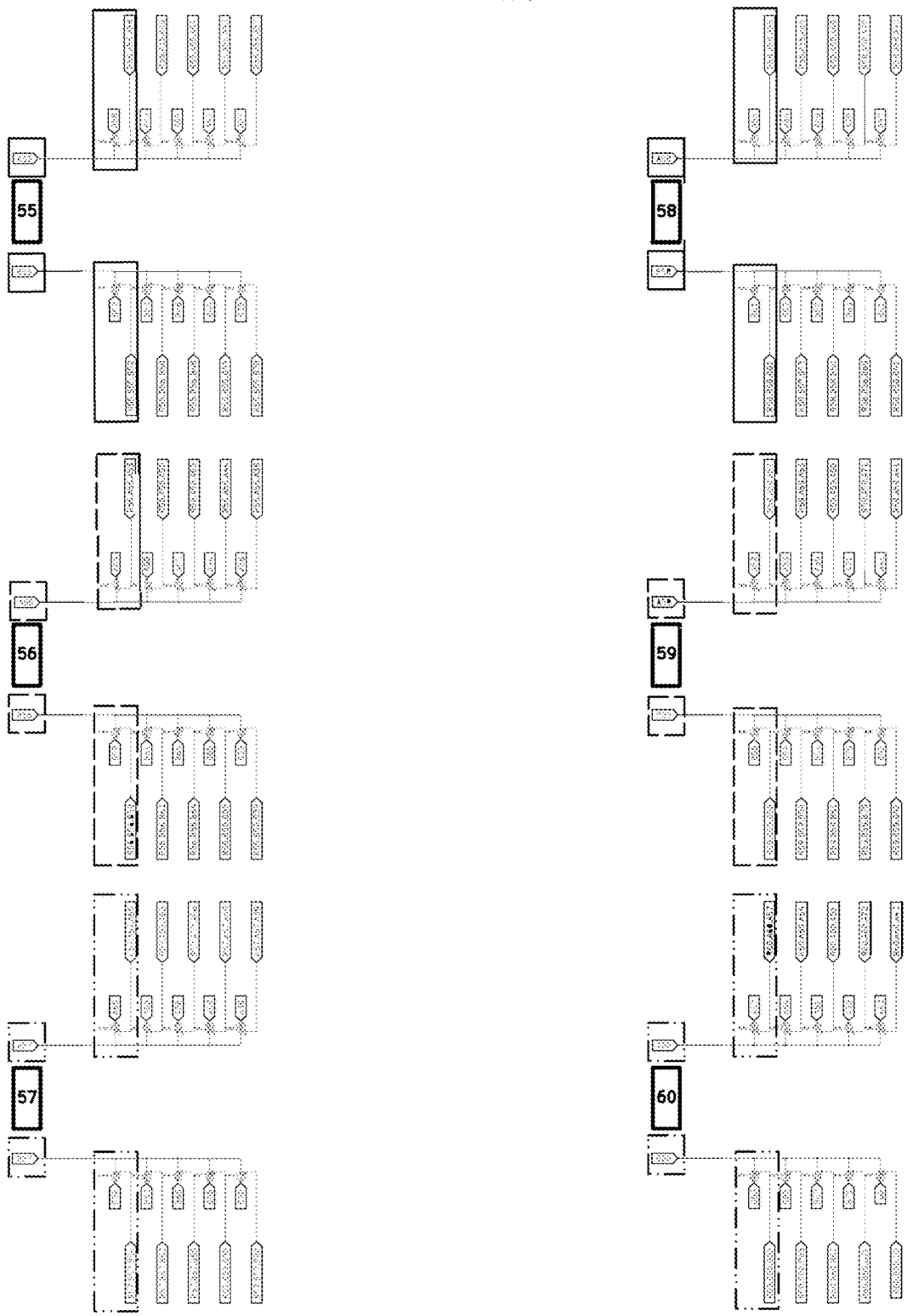
Figure 13K:
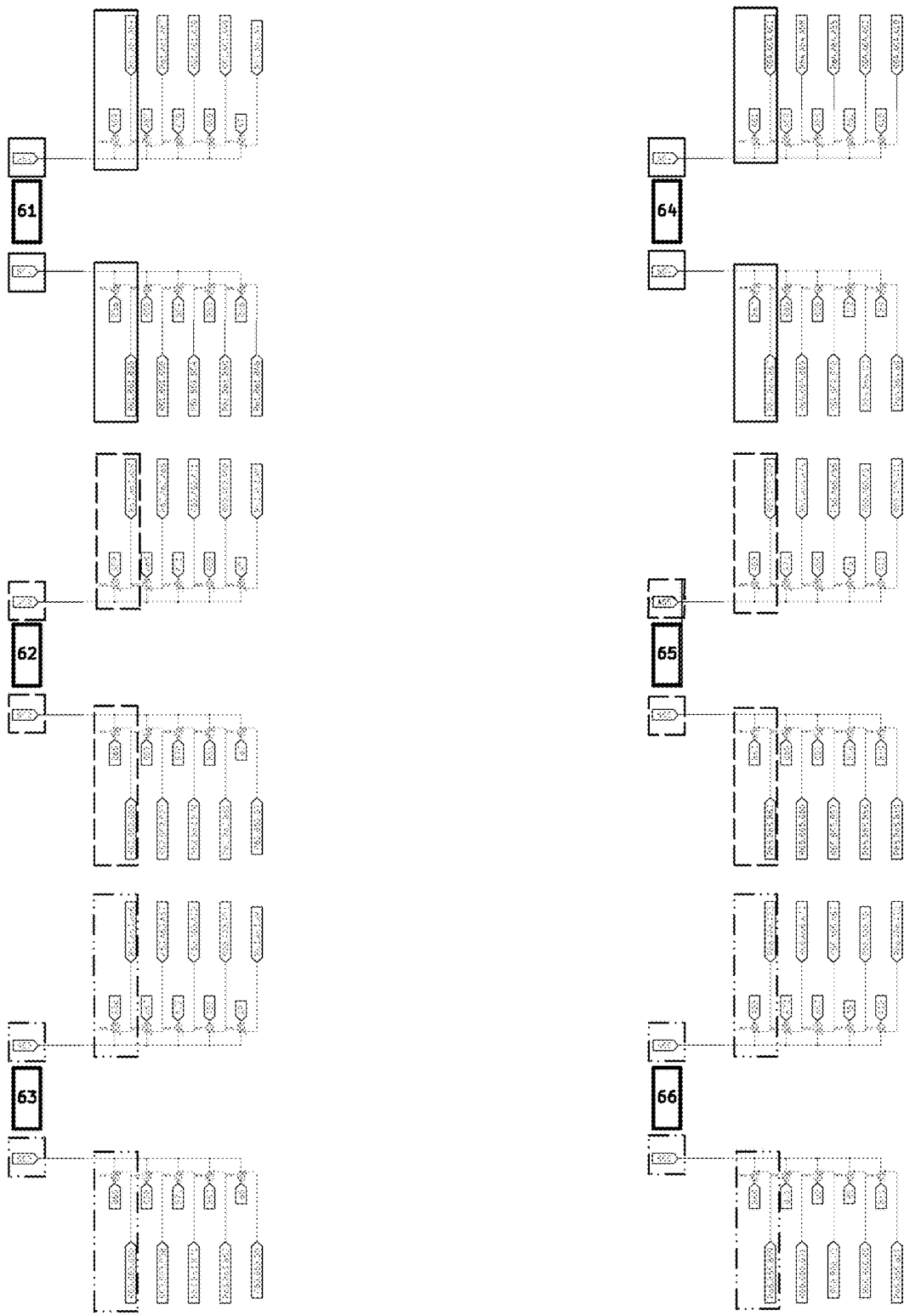
Figure 13L:
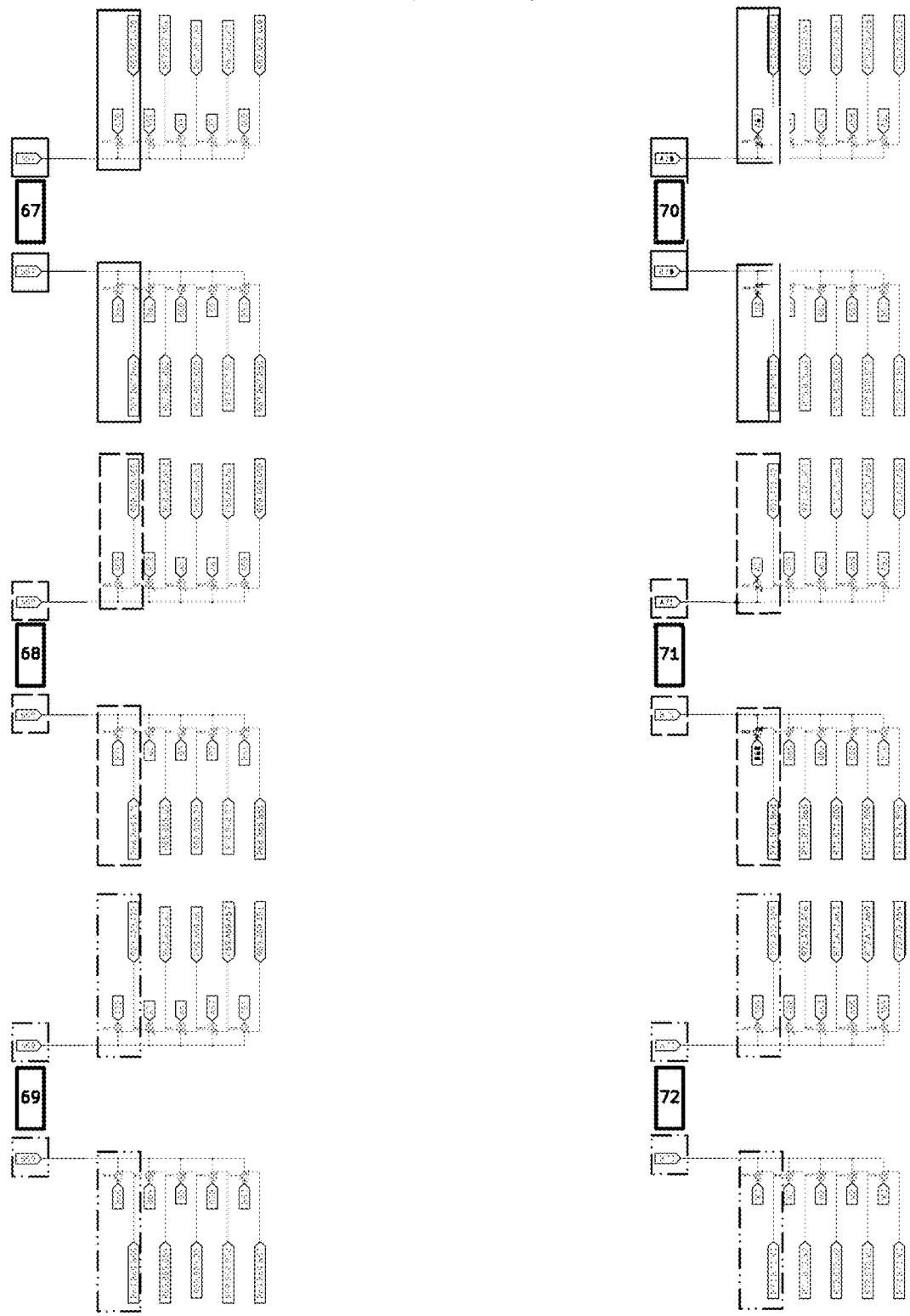

FIG. 12 illustrates a winding diagram for a configuration of the electric motor with 24 poles in accordance with aspects of this disclosure.

FIGS. 13A-13L illustrate the switching panel slots for a configuration of the electric motor with 24 poles in accordance with aspects of this disclosure.

Figure 14:
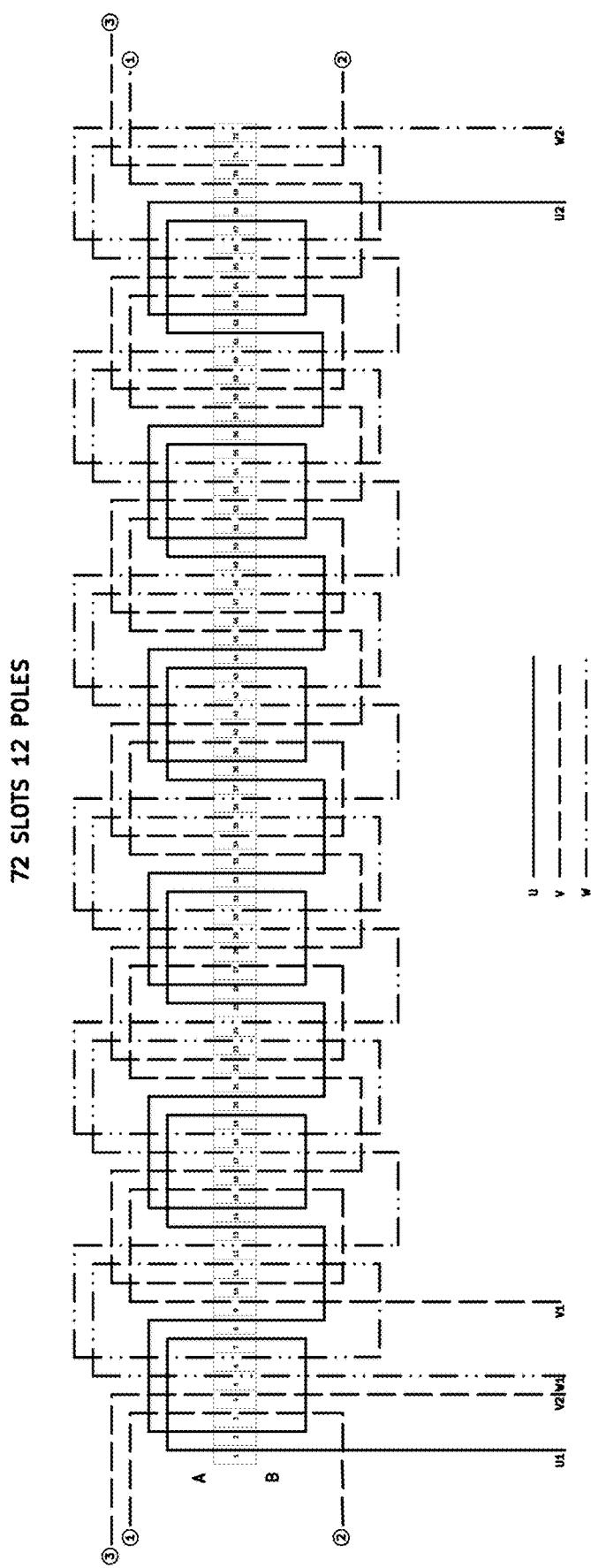
FIG. 14 illustrates a winding diagram for a configuration of the electric motor with 12 poles in accordance with aspects of this disclosure.
Figure 15A:
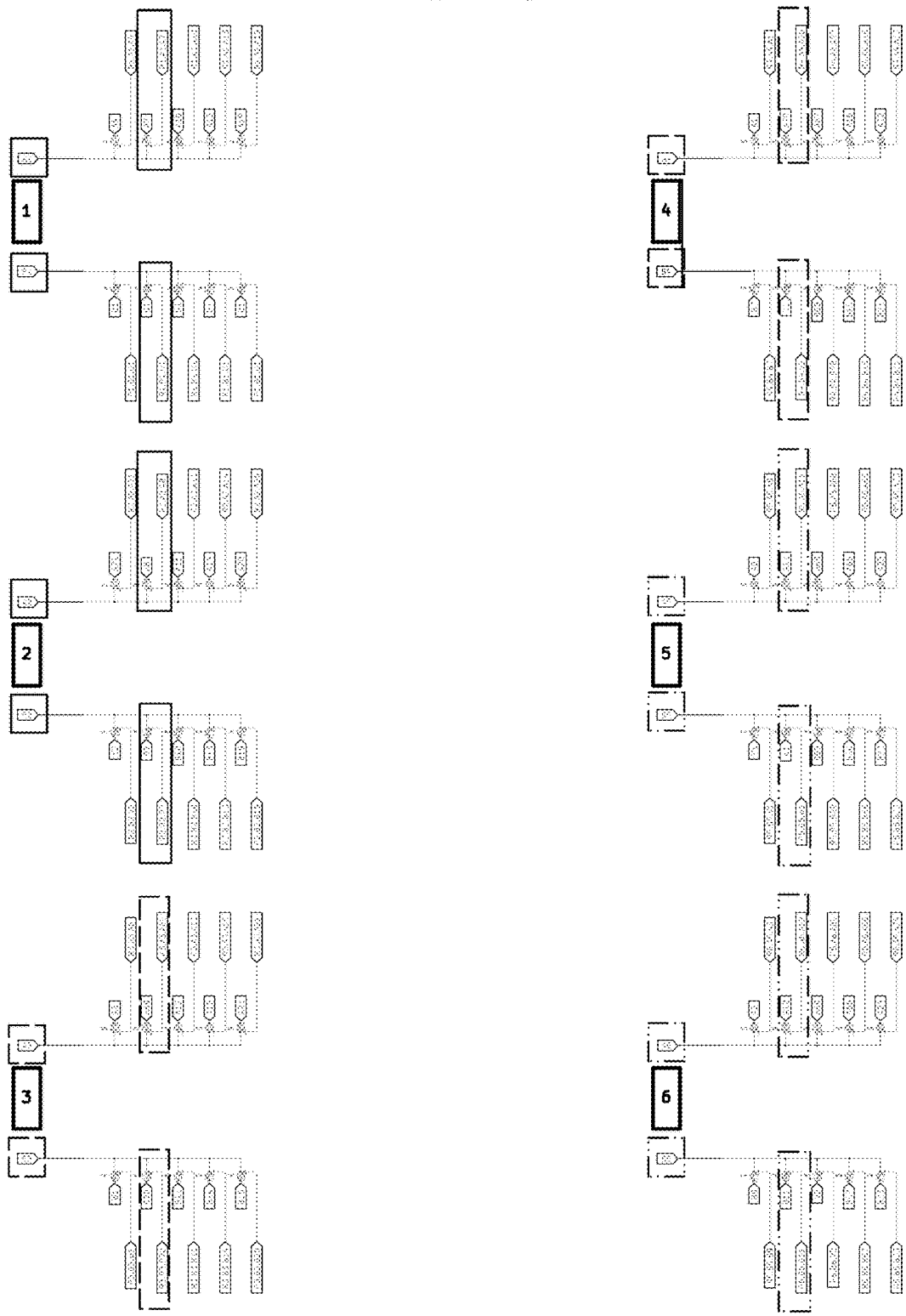
FIGS. 15A-15L illustrate the switching panel slots for a configuration of the electric motor with 12 poles in accordance with aspects of this disclosure.
Figure 15B:
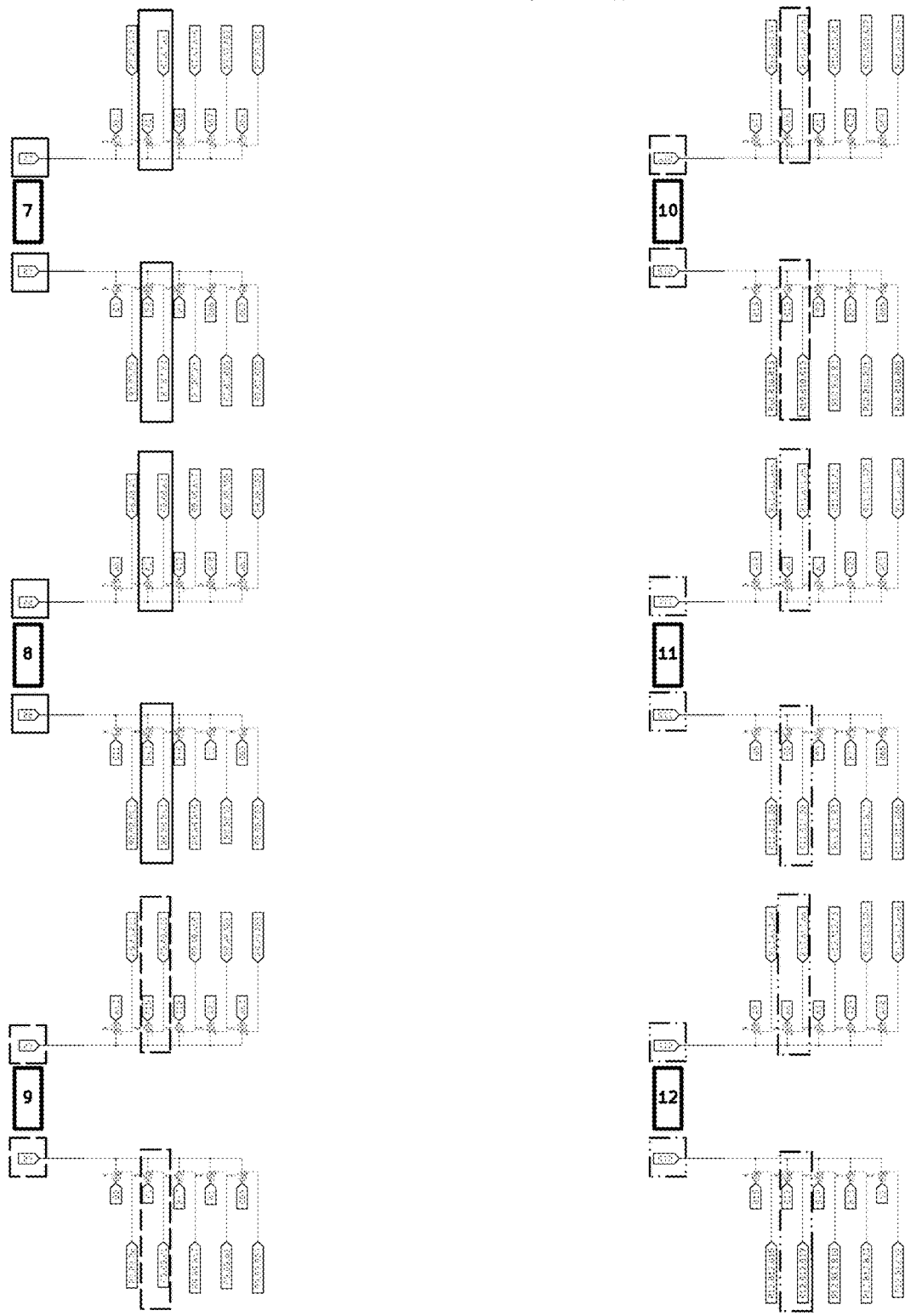
Figure 15C:
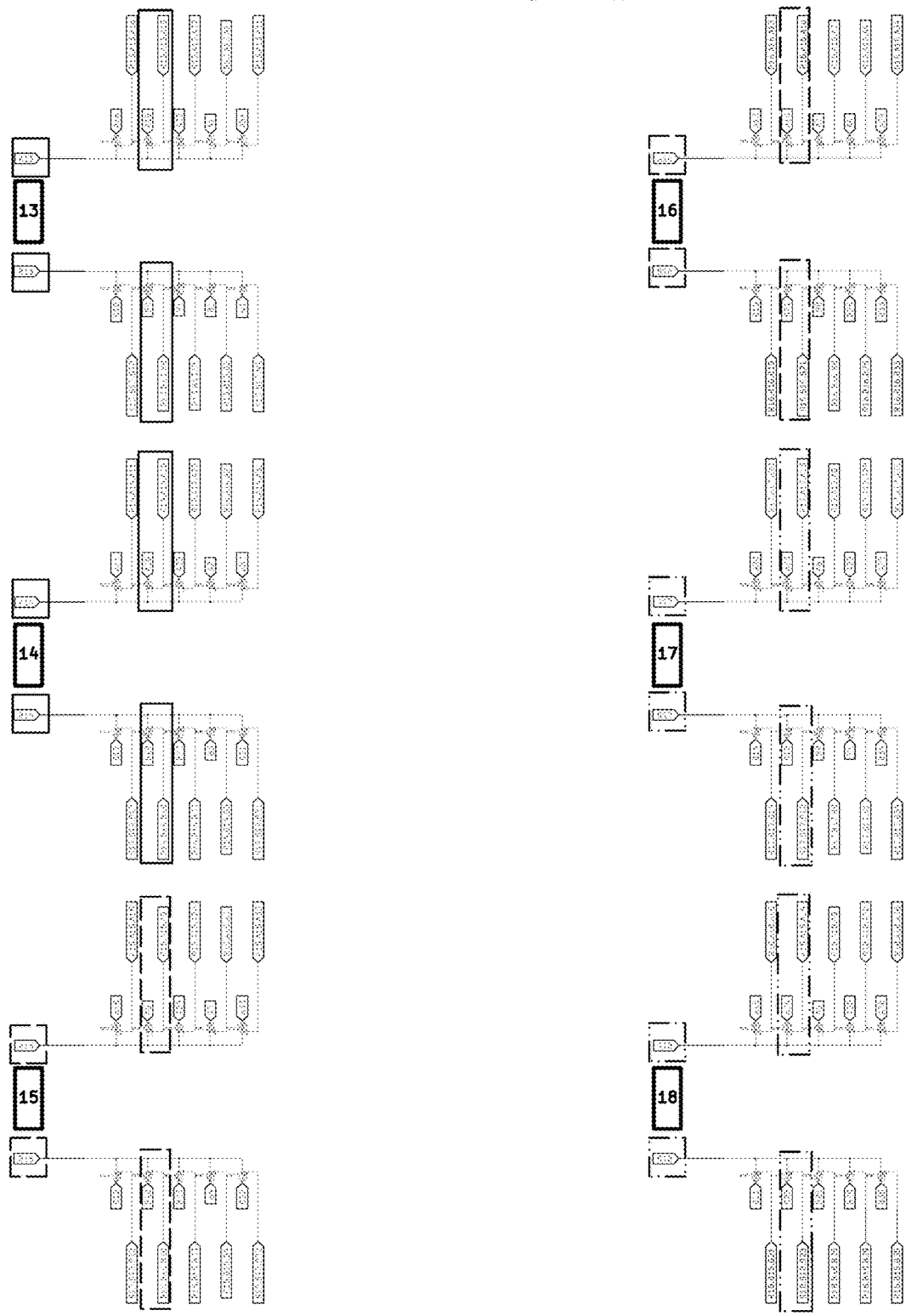
Figure 15D:
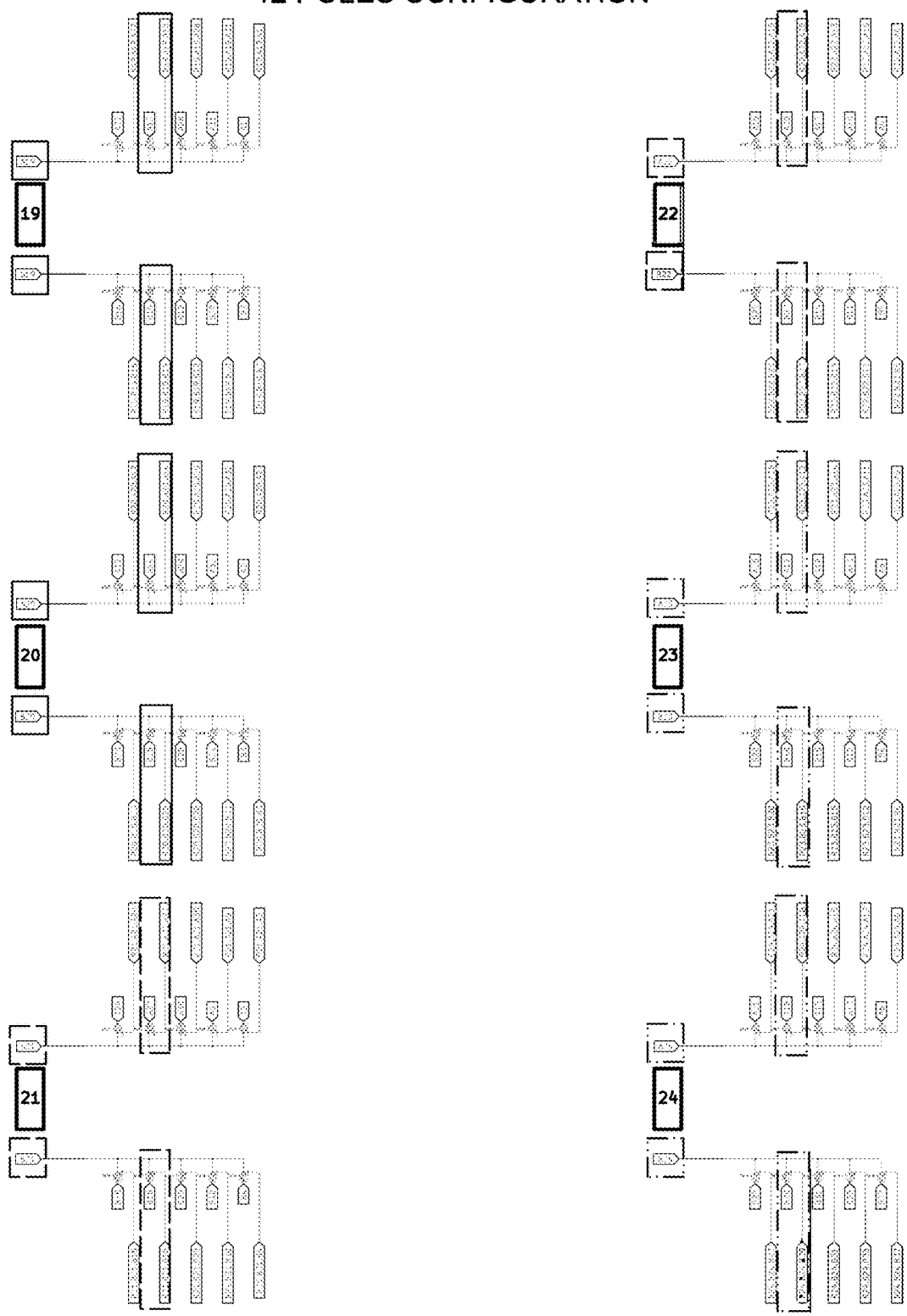
Figure 15E:
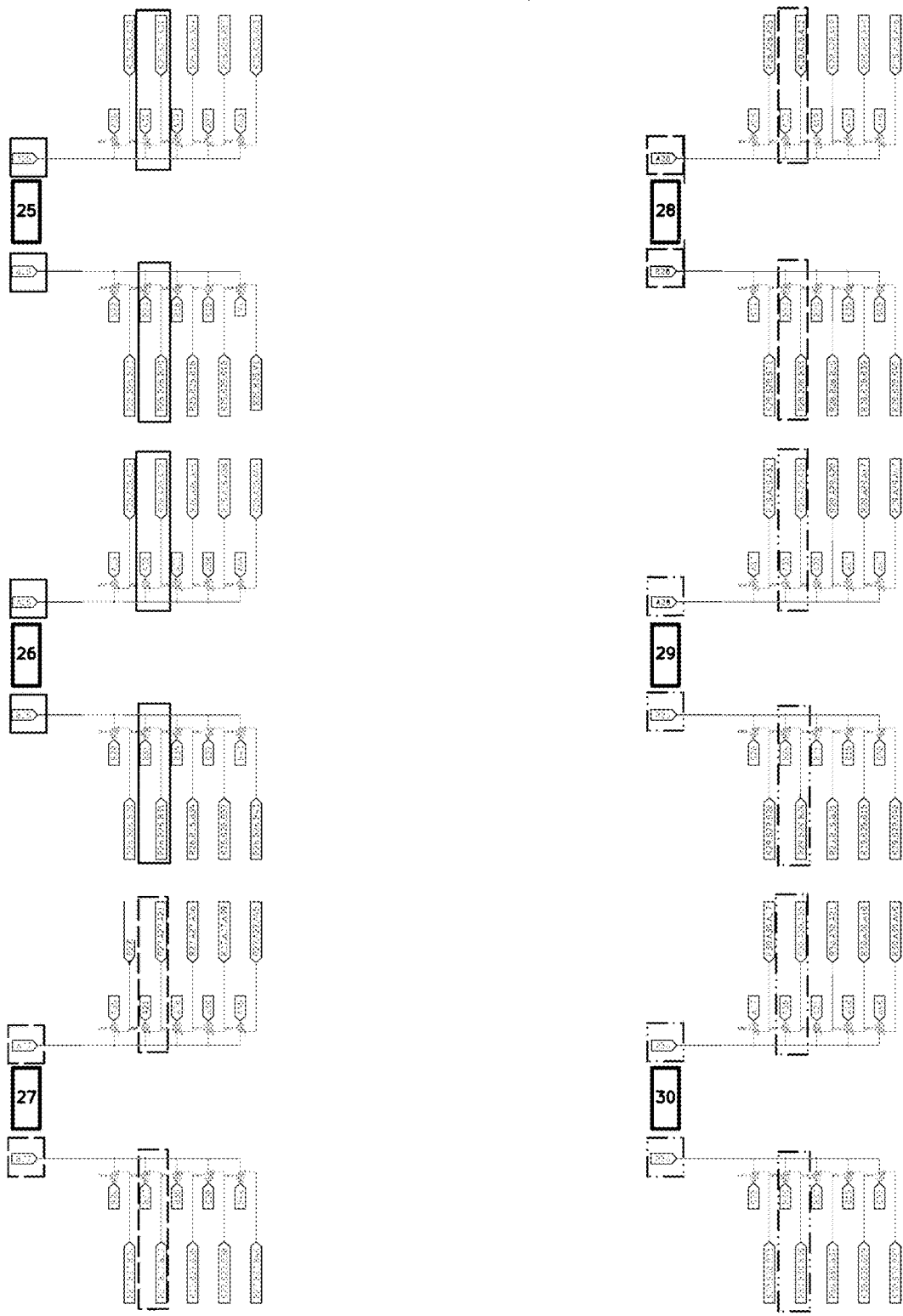
Figure 15F:
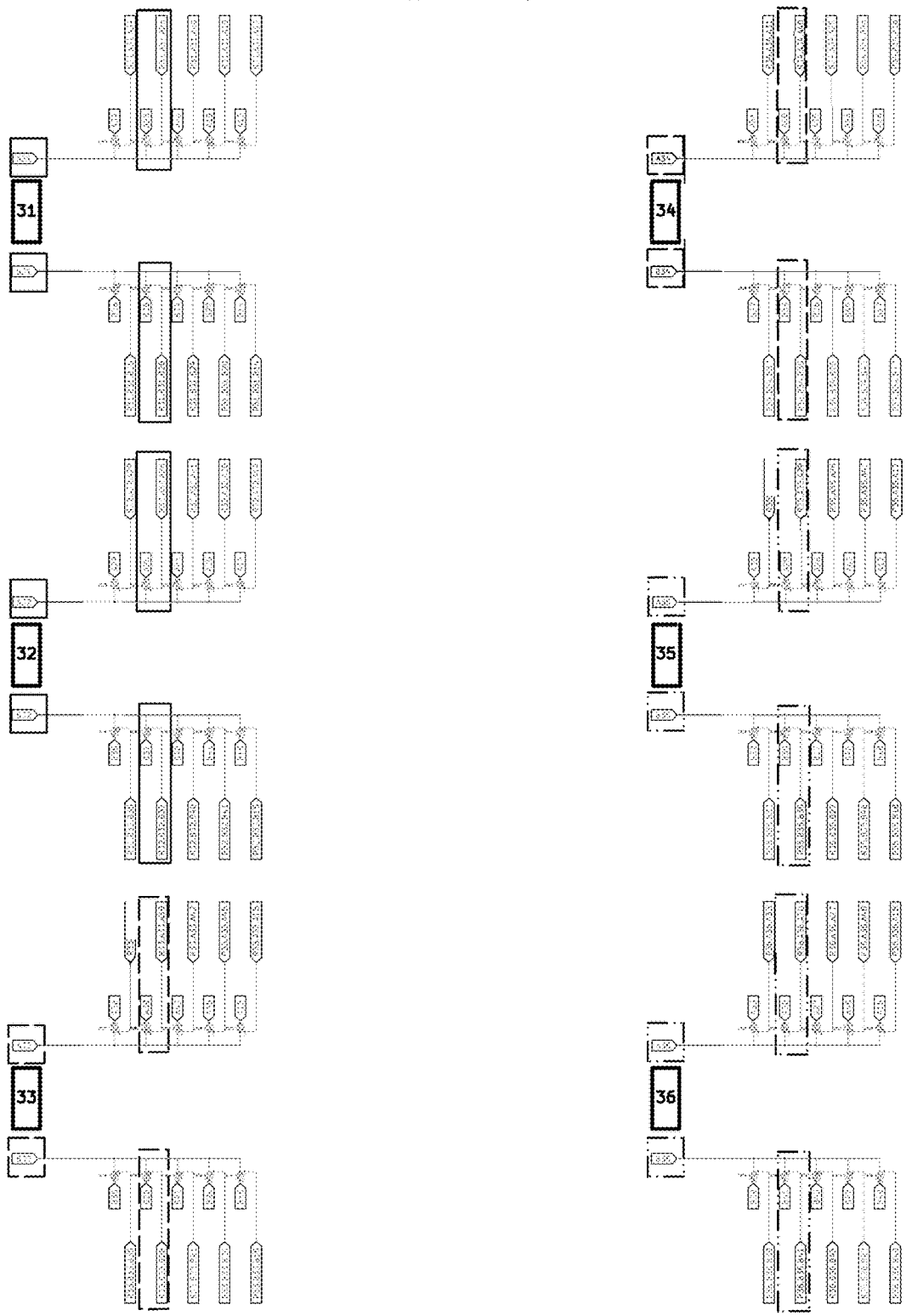
Figure 15G:
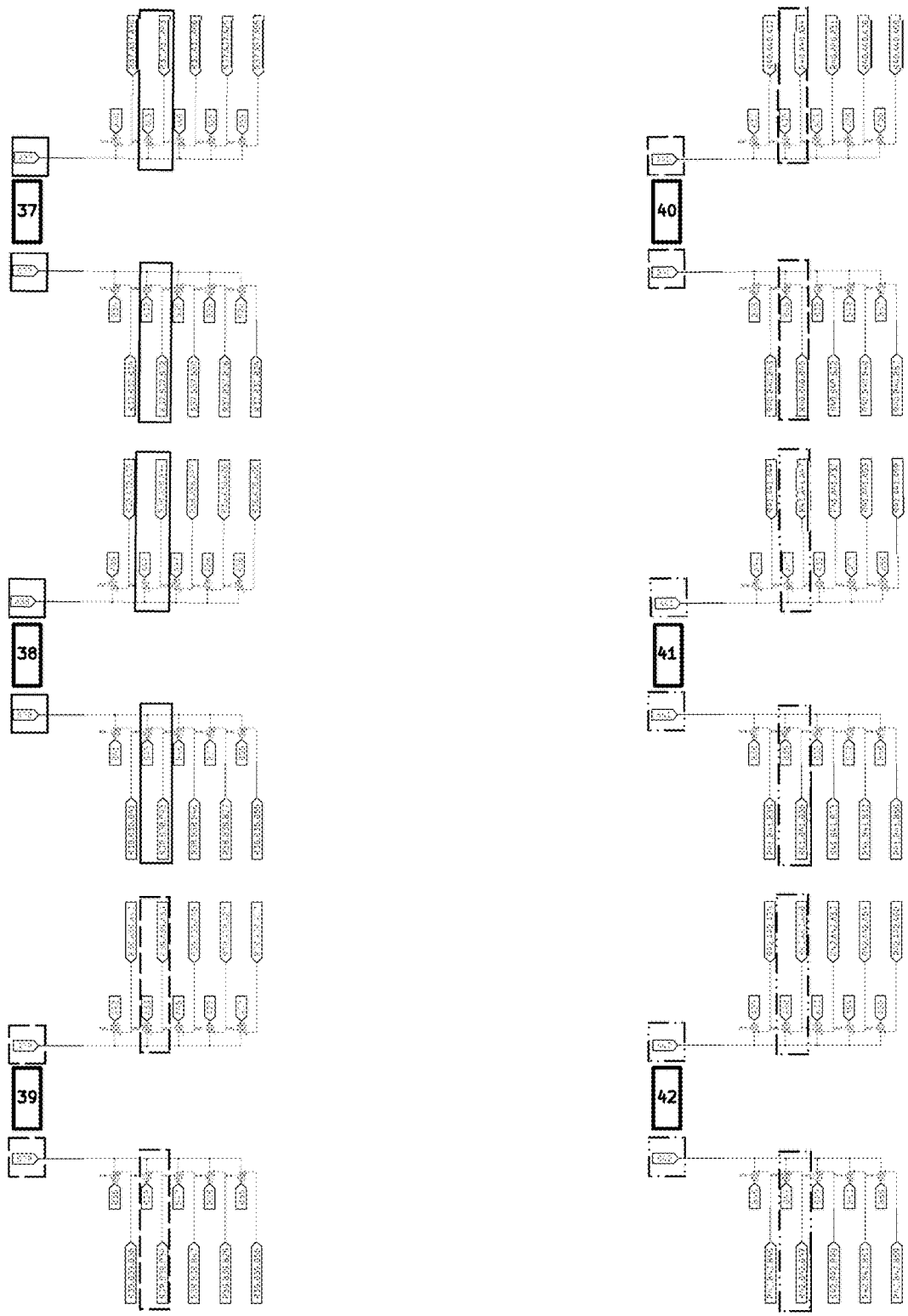
Figure 15H:
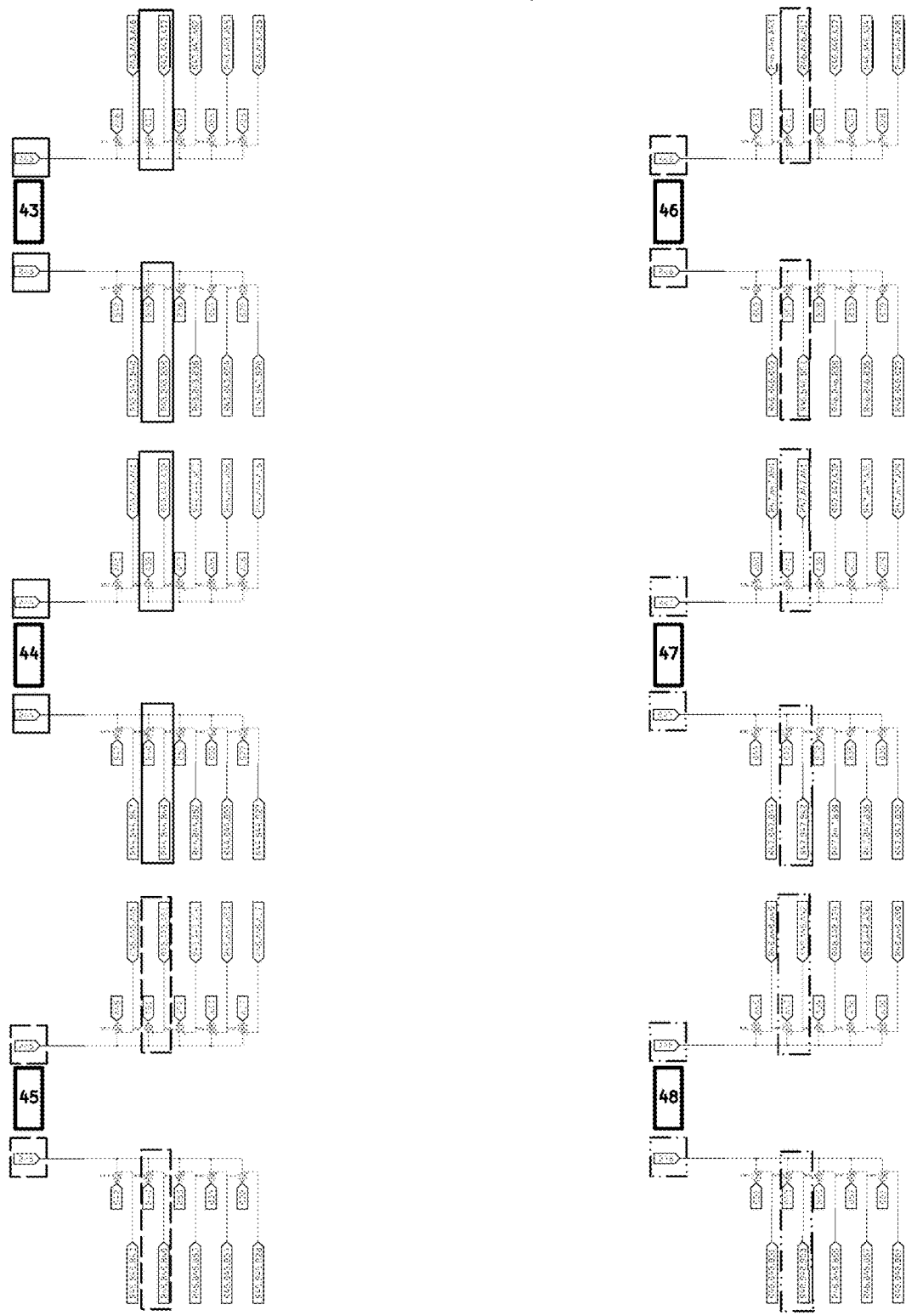
Figure 15I:
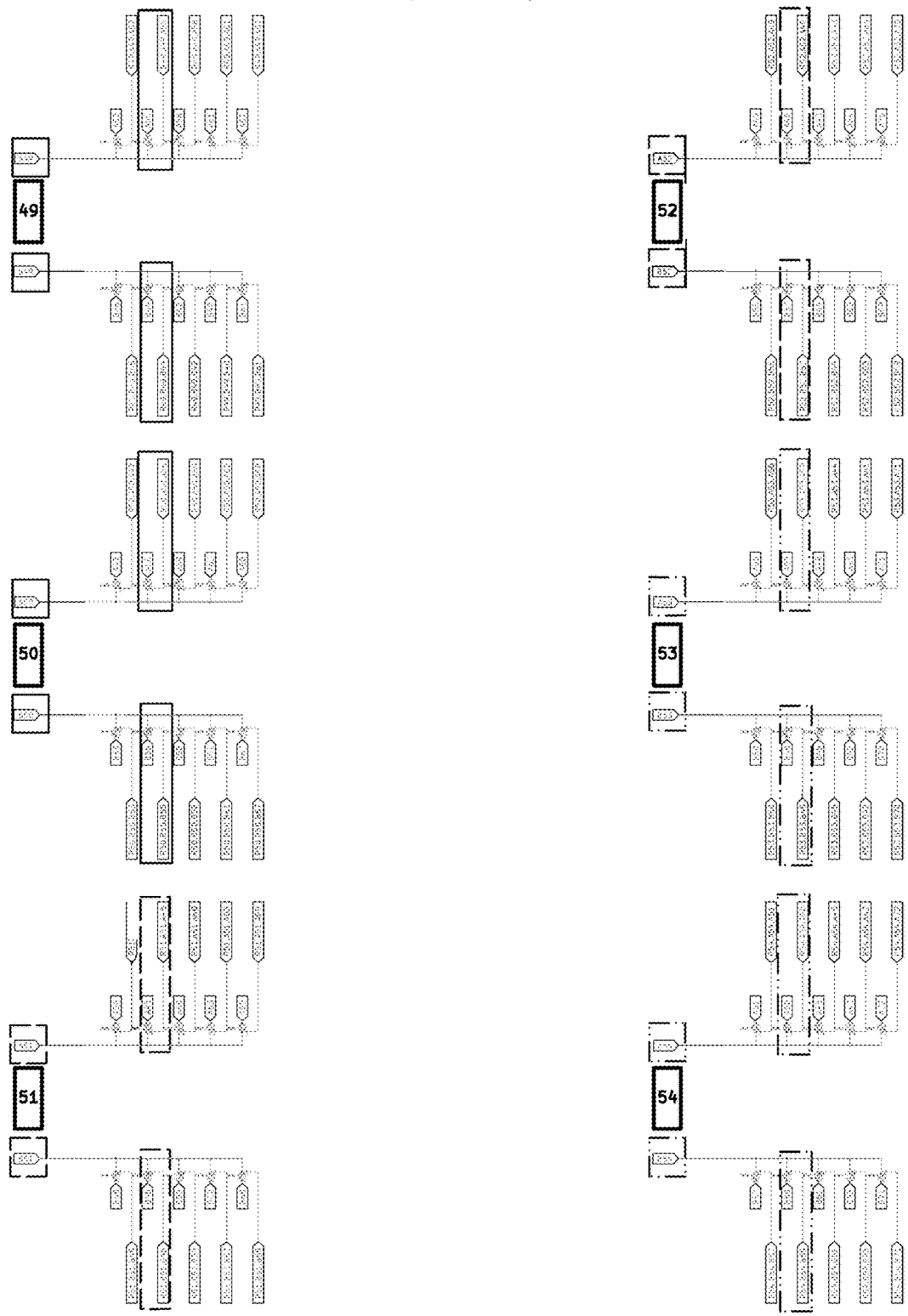
Figure 15J:
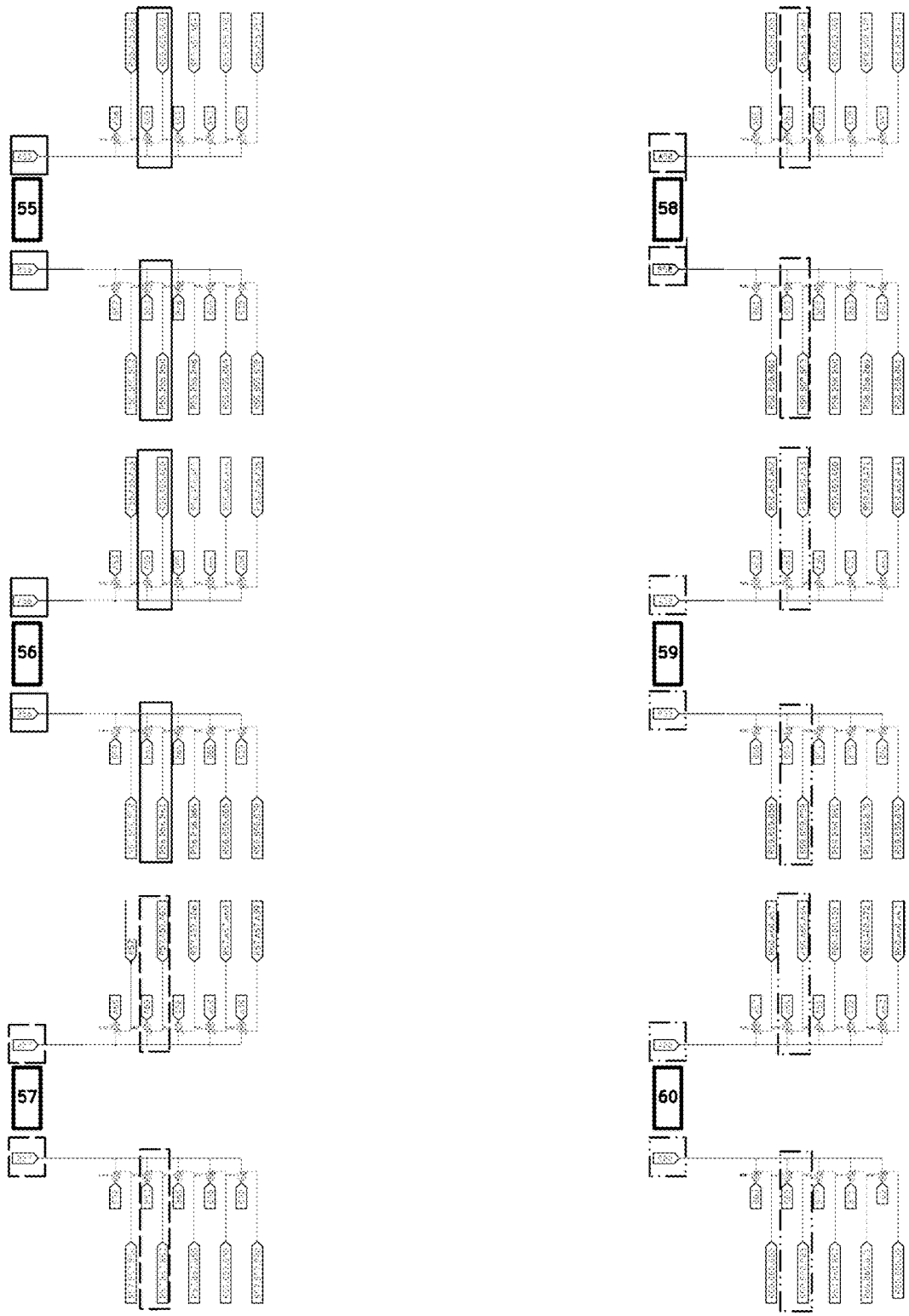
Figure 15K:
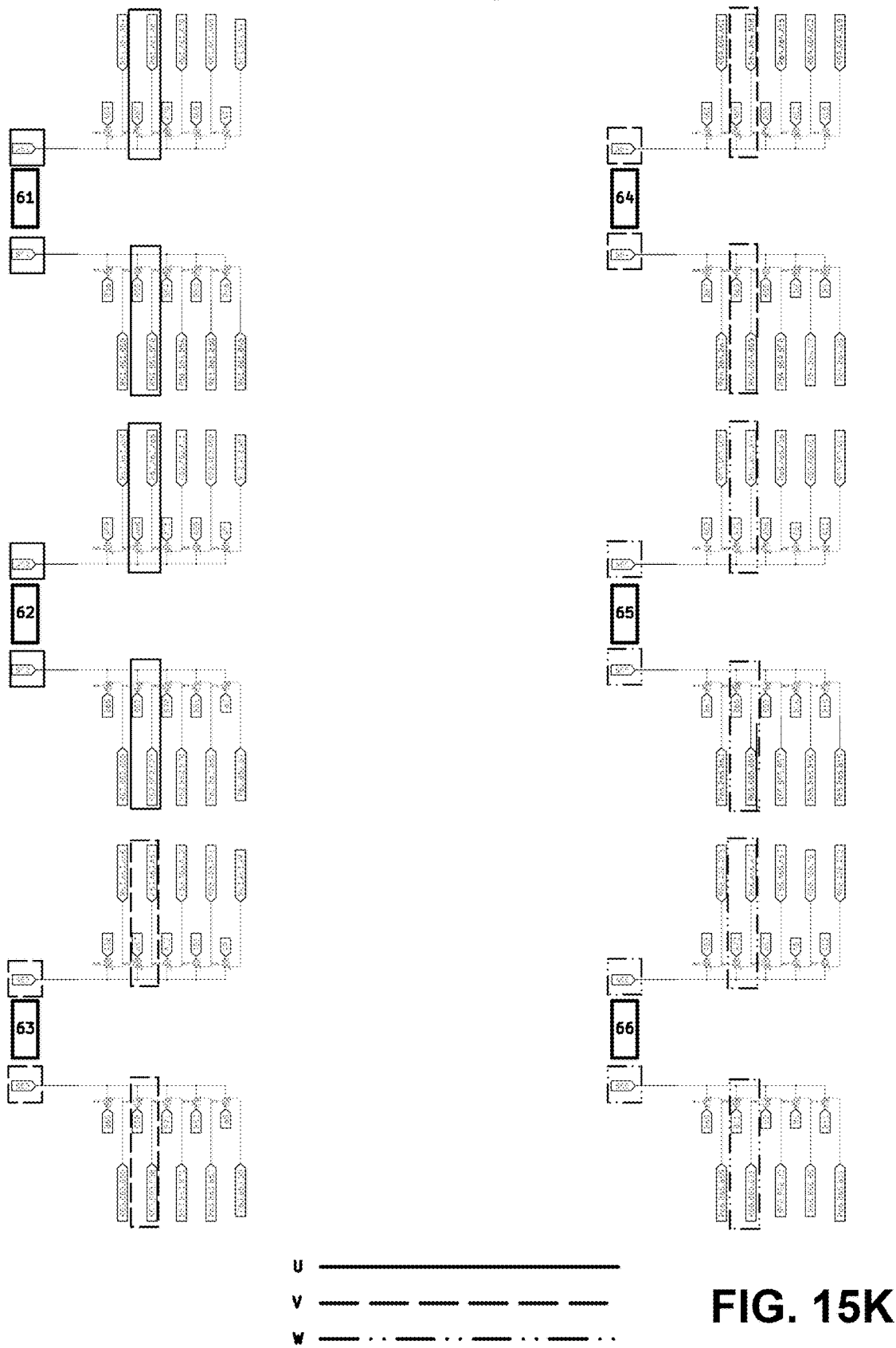
Figure 15L:
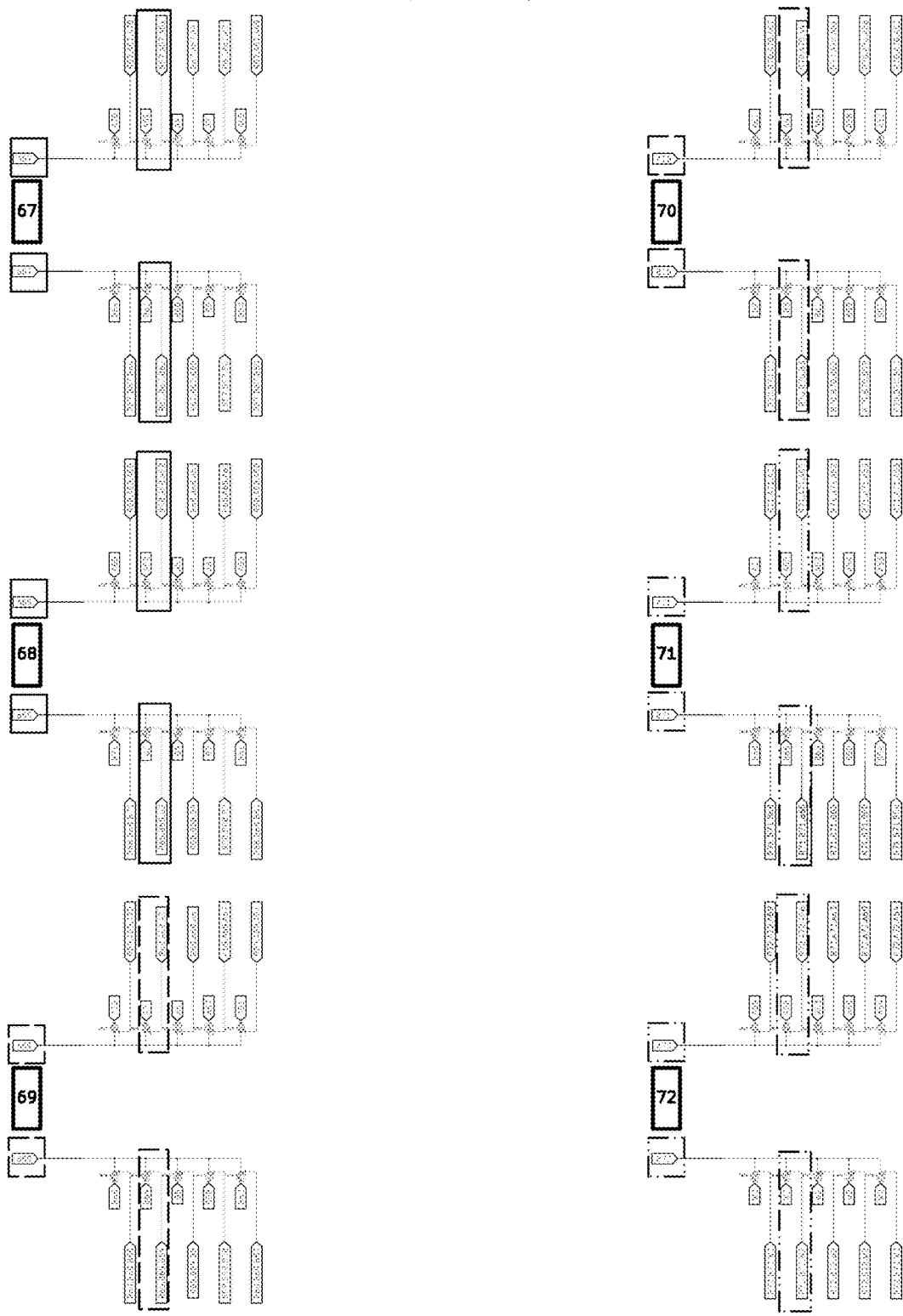

FIG. 14 illustrates a winding diagram for a configuration of the electric motor with 12 poles in accordance with aspects of this disclosure.

FIGS. 15A-15L illustrate the switching panel slots for a configuration of the electric motor with 12 poles in accordance with aspects of this disclosure.

Figure 16:
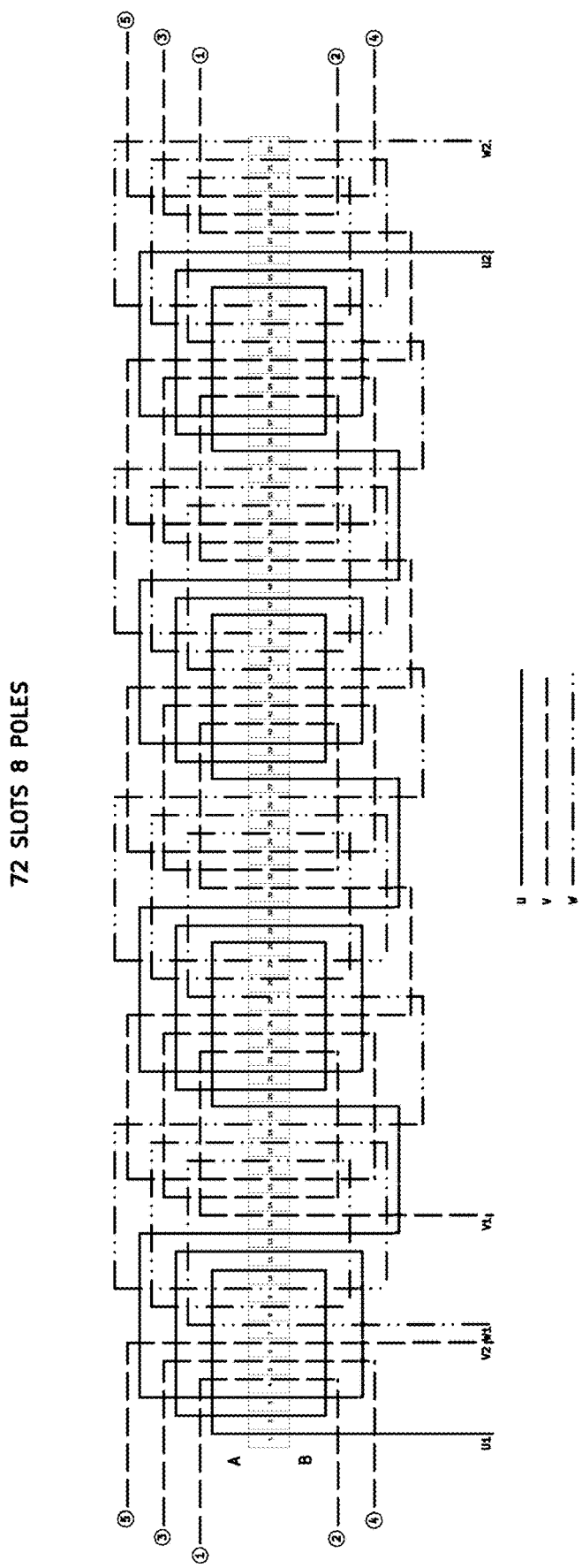
FIG. 16 illustrates a winding diagram for a configuration of the electric motor with 8 poles in accordance with aspects of this disclosure.
Figure 17A:
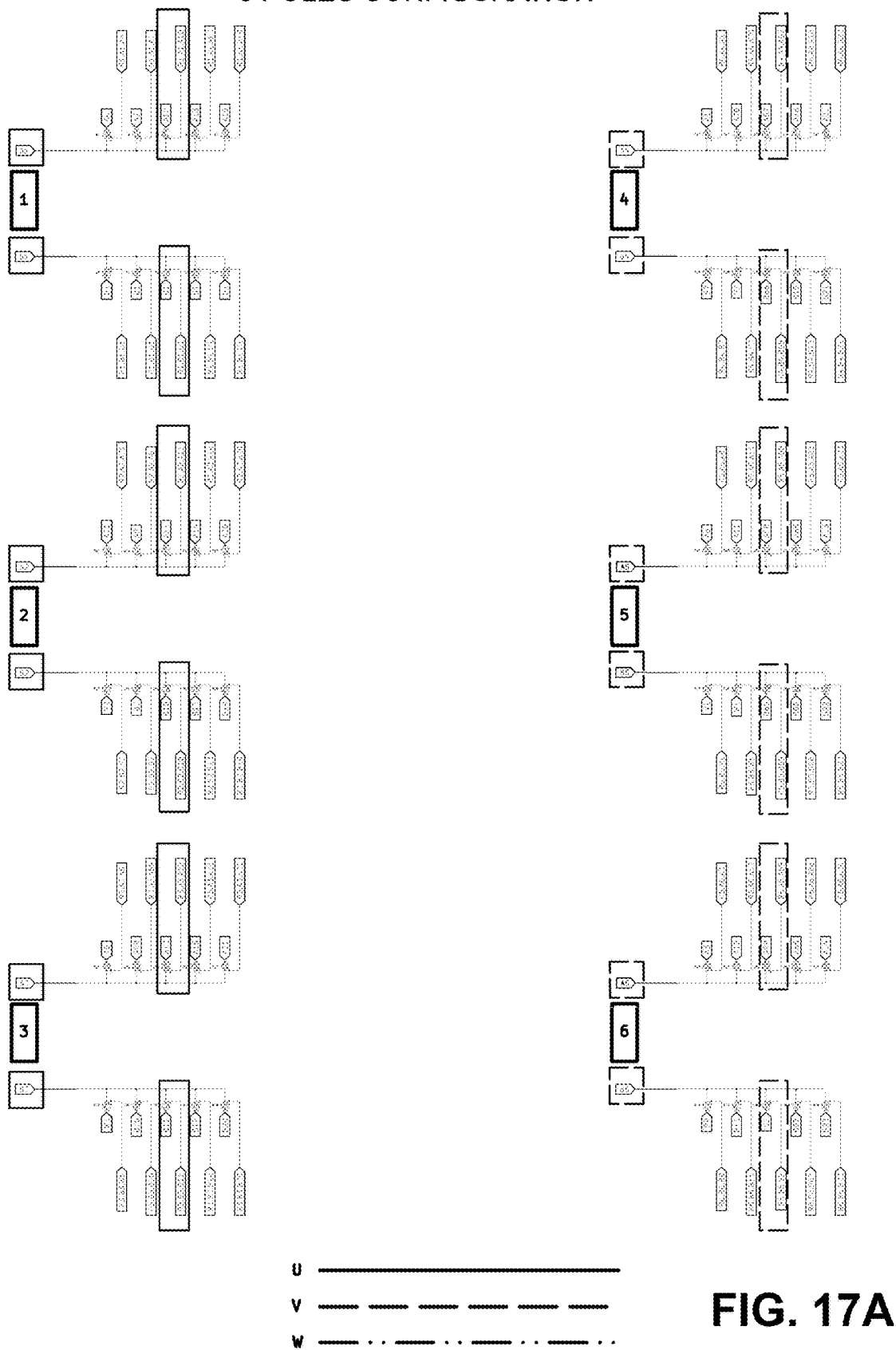
FIGS. 17A-17L illustrate the switching panel slots for a configuration of the electric motor with 8 poles in accordance with aspects of this disclosure.
Figure 17B:
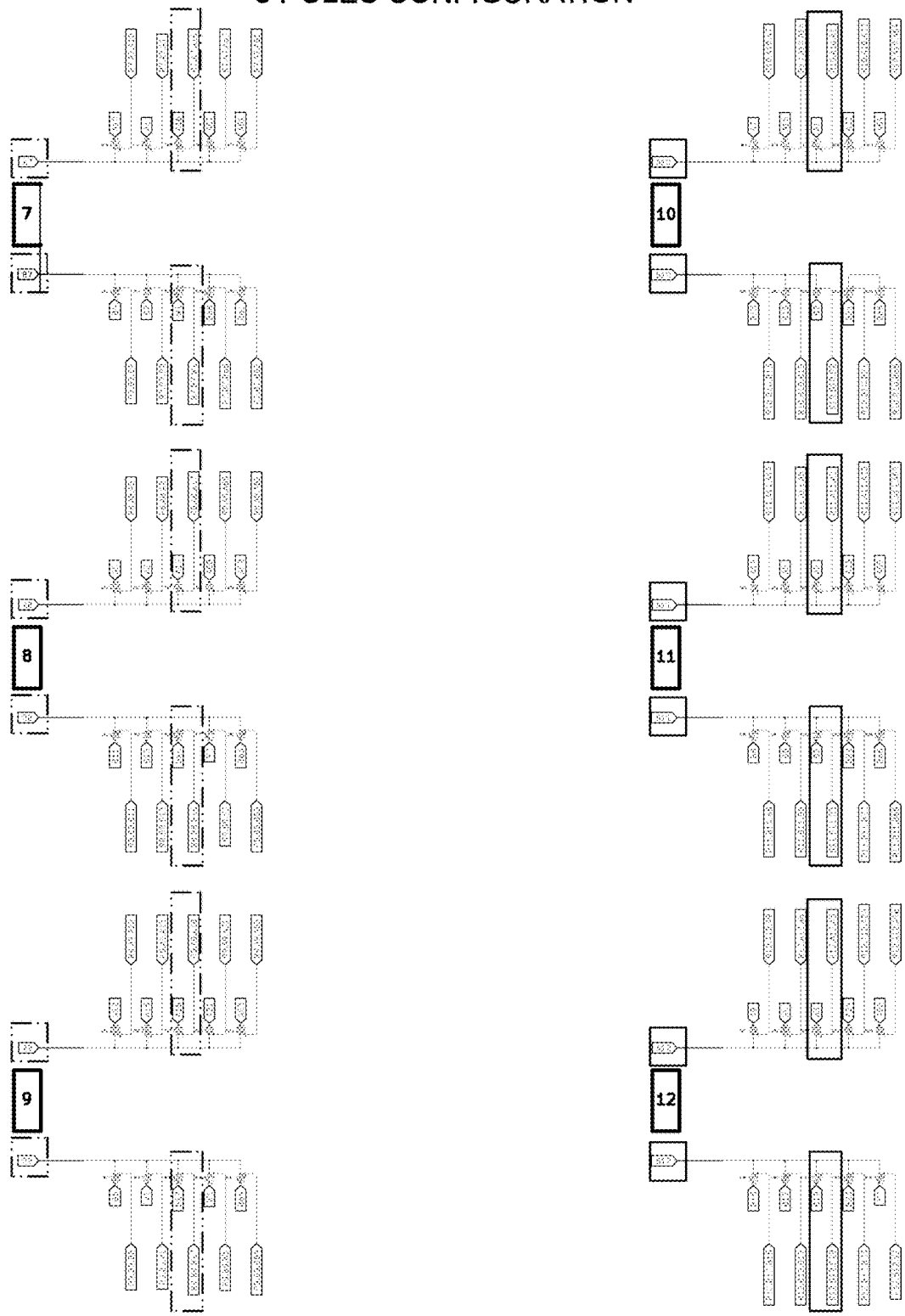
Figure 17C:
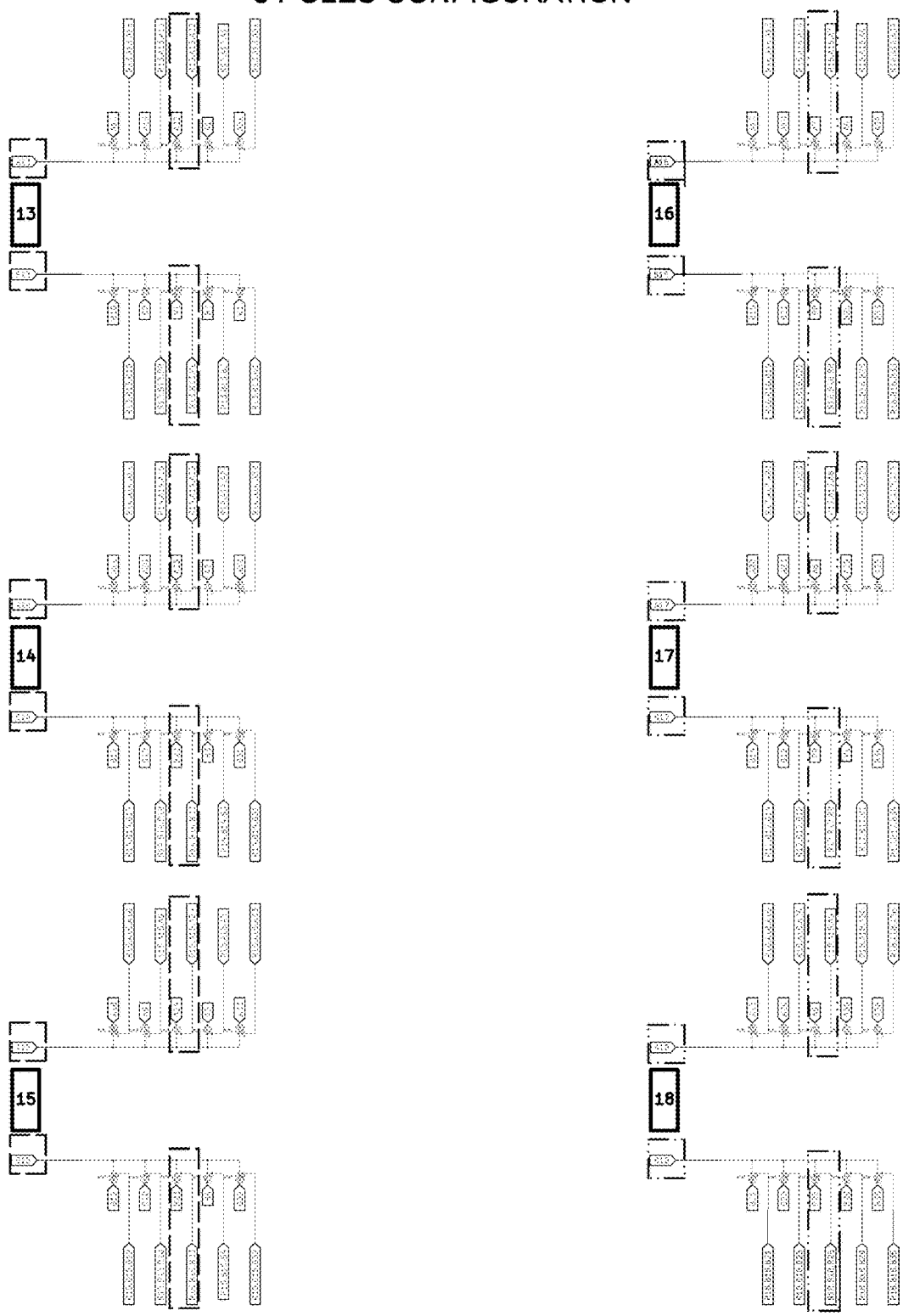
Figure 17D:
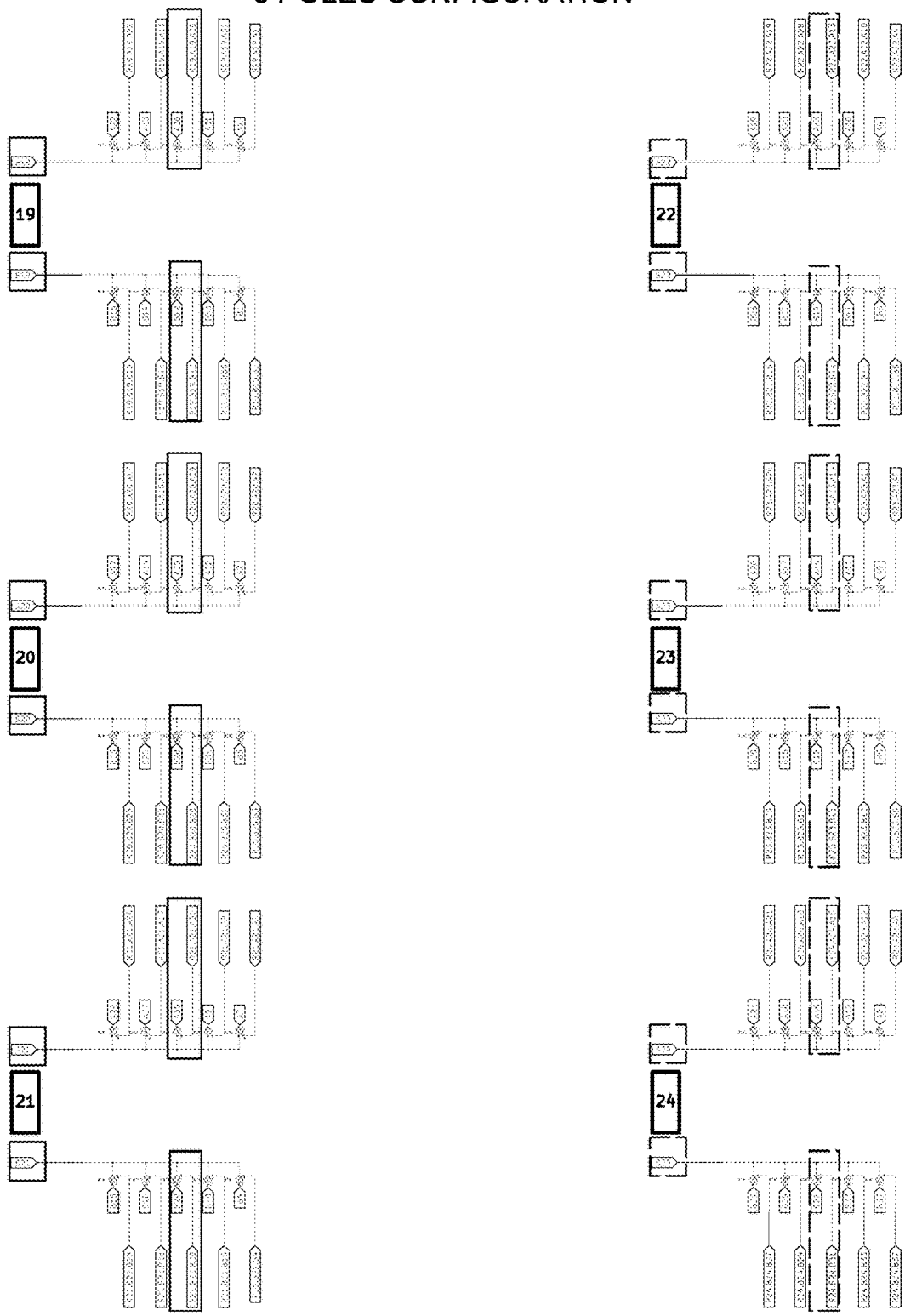
Figure 17E:
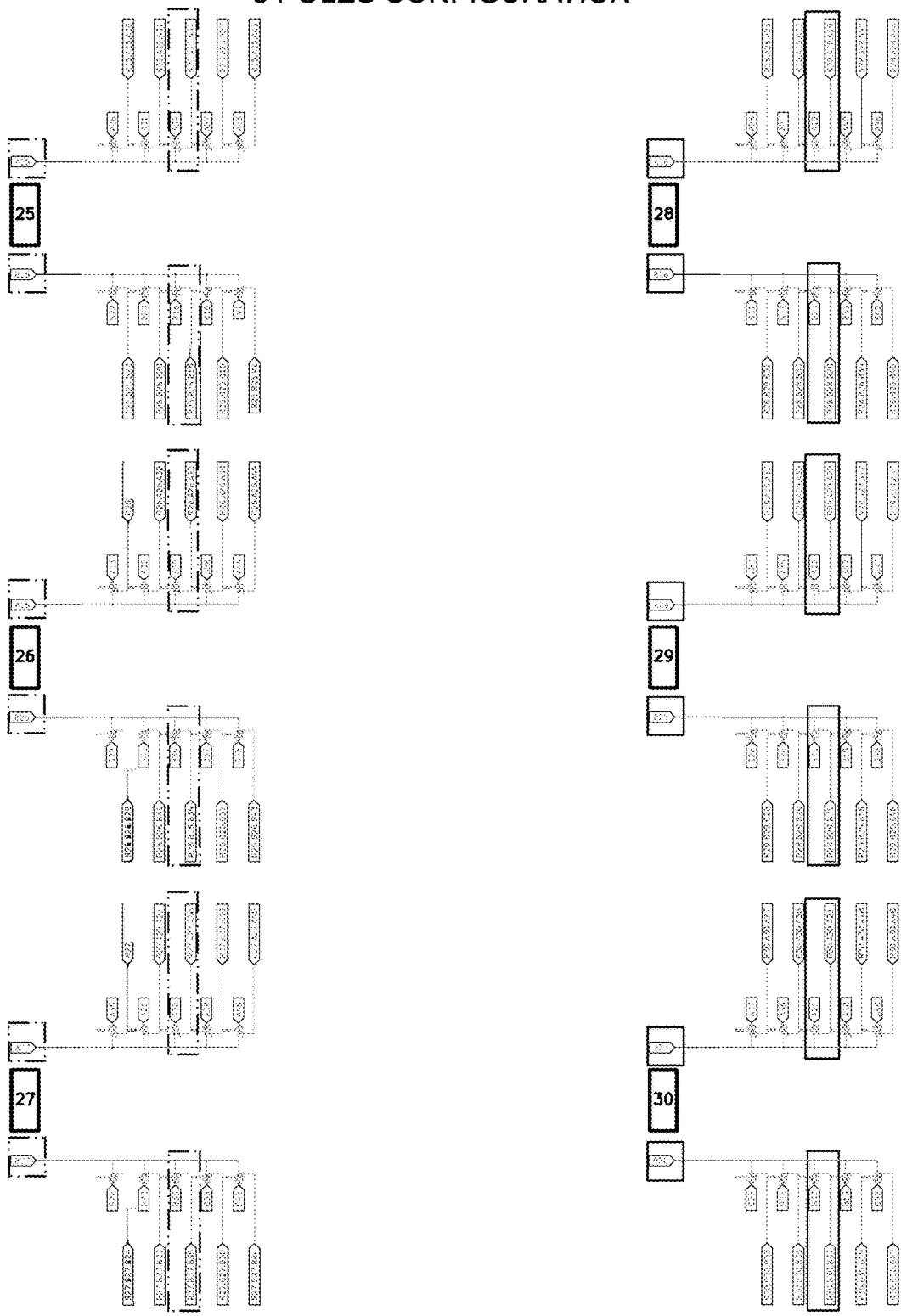
Figure 17F:
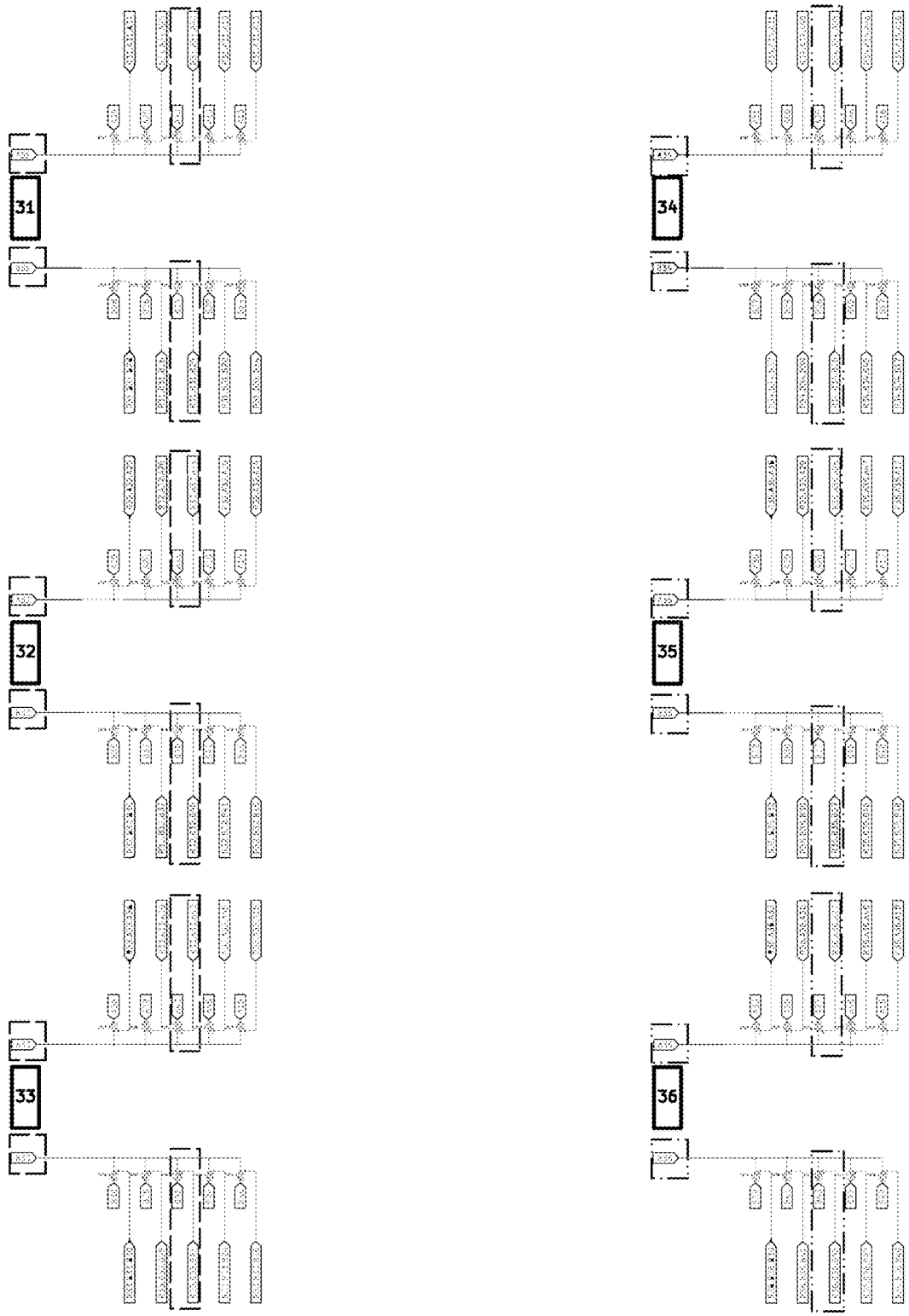
Figure 17G:
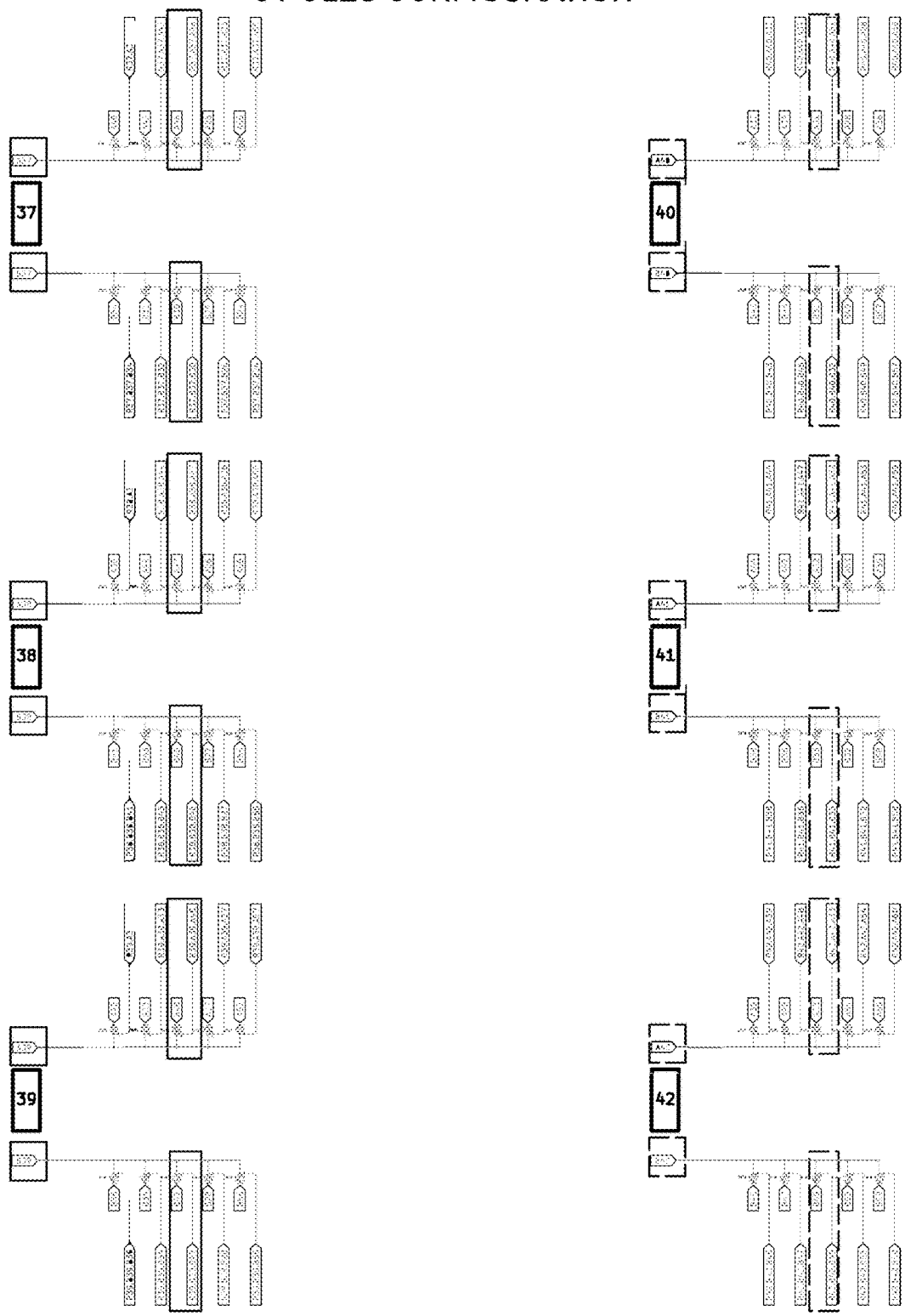
Figure 17H:
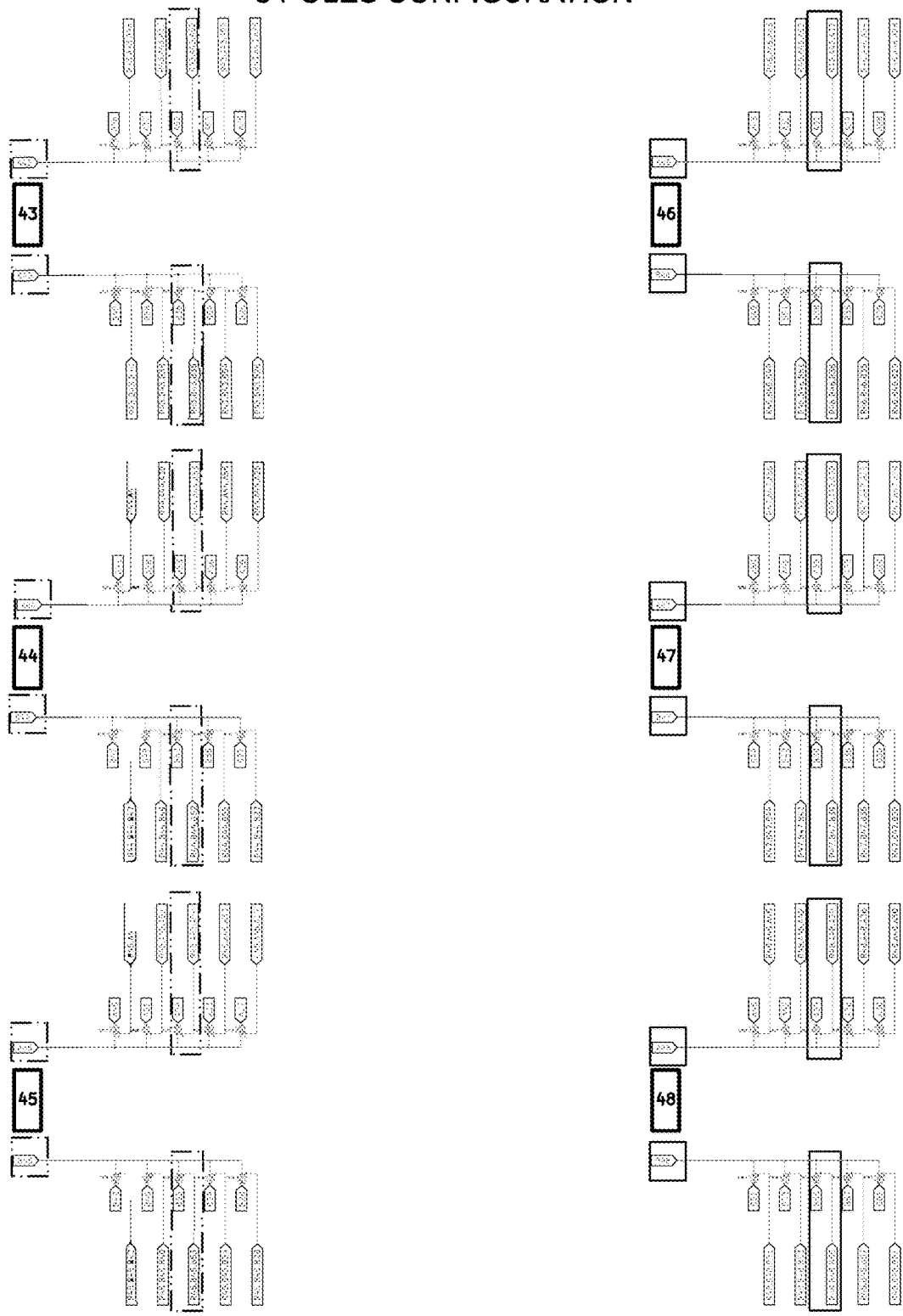
Figure 17I:
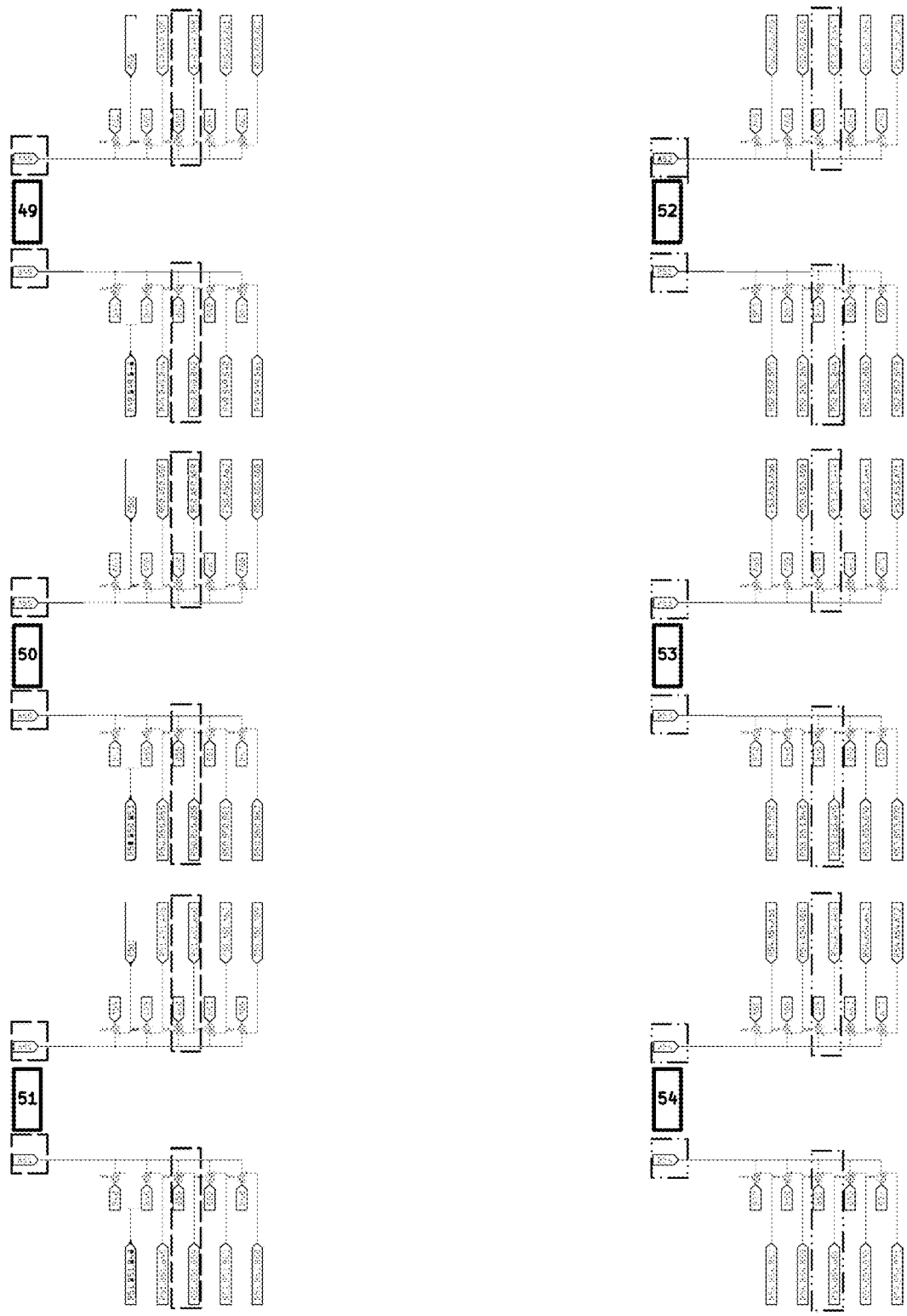
Figure 17J:
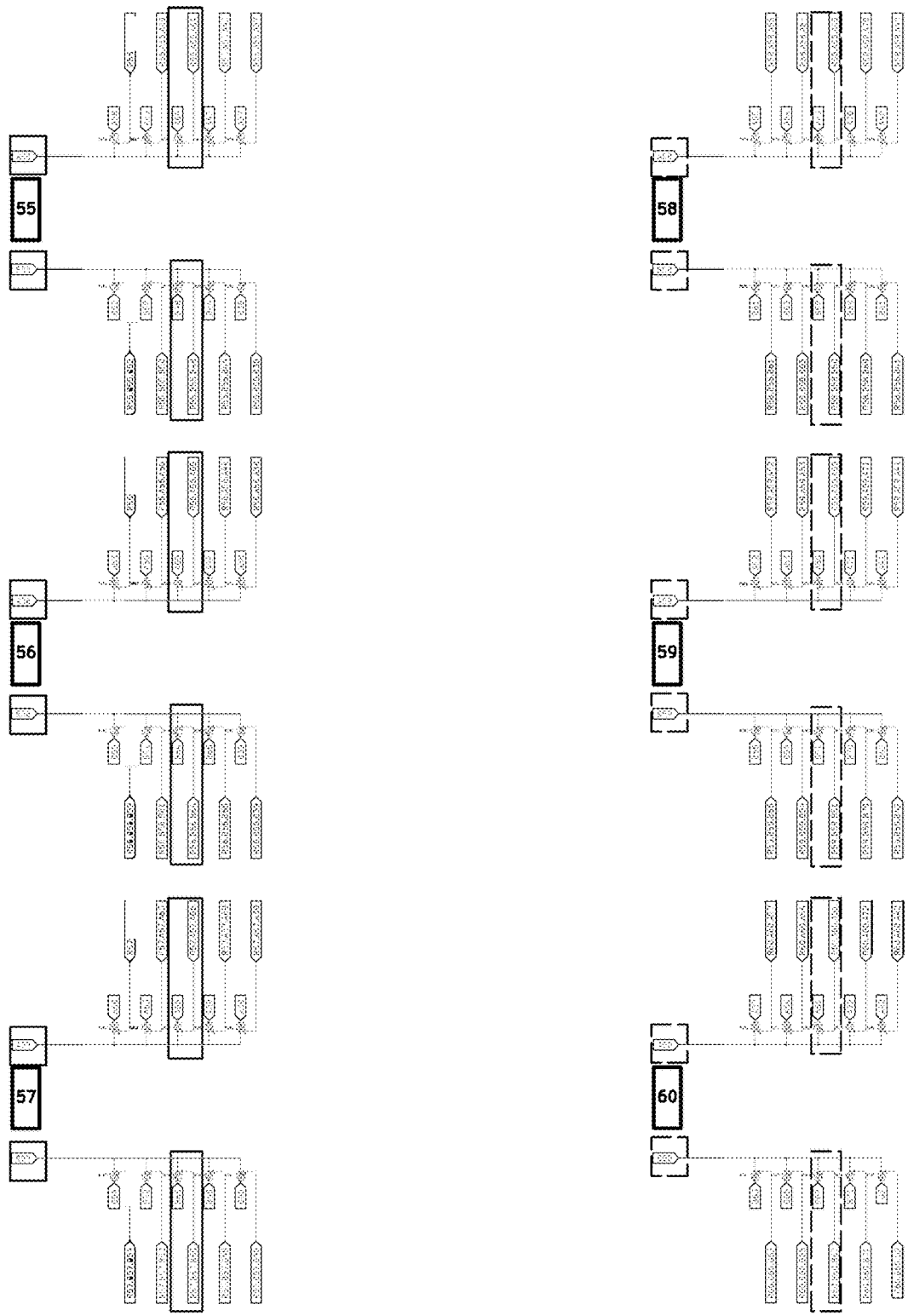
Figure 17K:
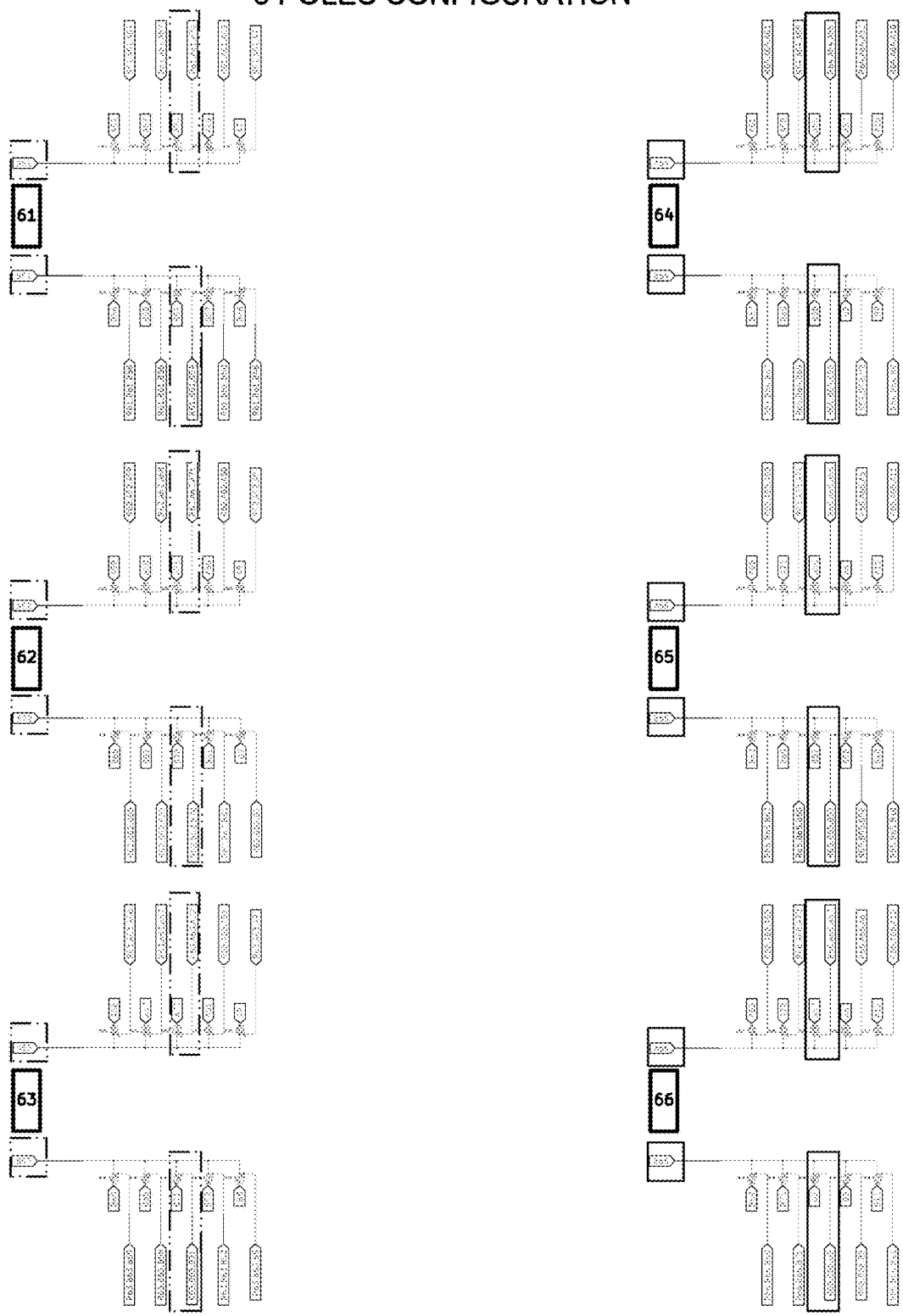
Figure 17L:
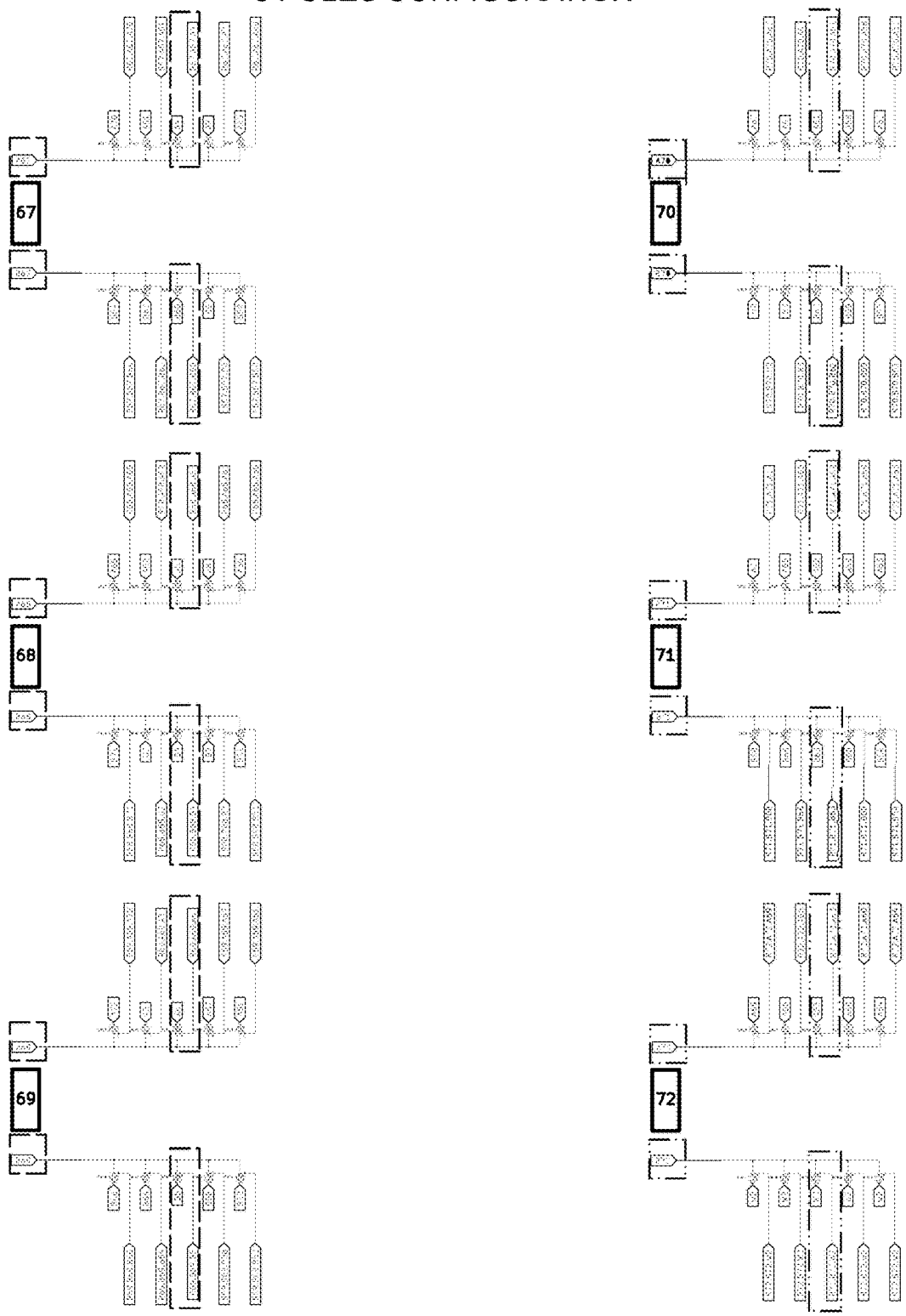

FIG. 16 illustrates a winding diagram for a configuration of the electric motor with 8 poles in accordance with aspects of this disclosure.

FIGS. 17A-17L illustrate the switching panel slots for a configuration of the electric motor with 8 poles in accordance with aspects of this disclosure.

Figure 18:
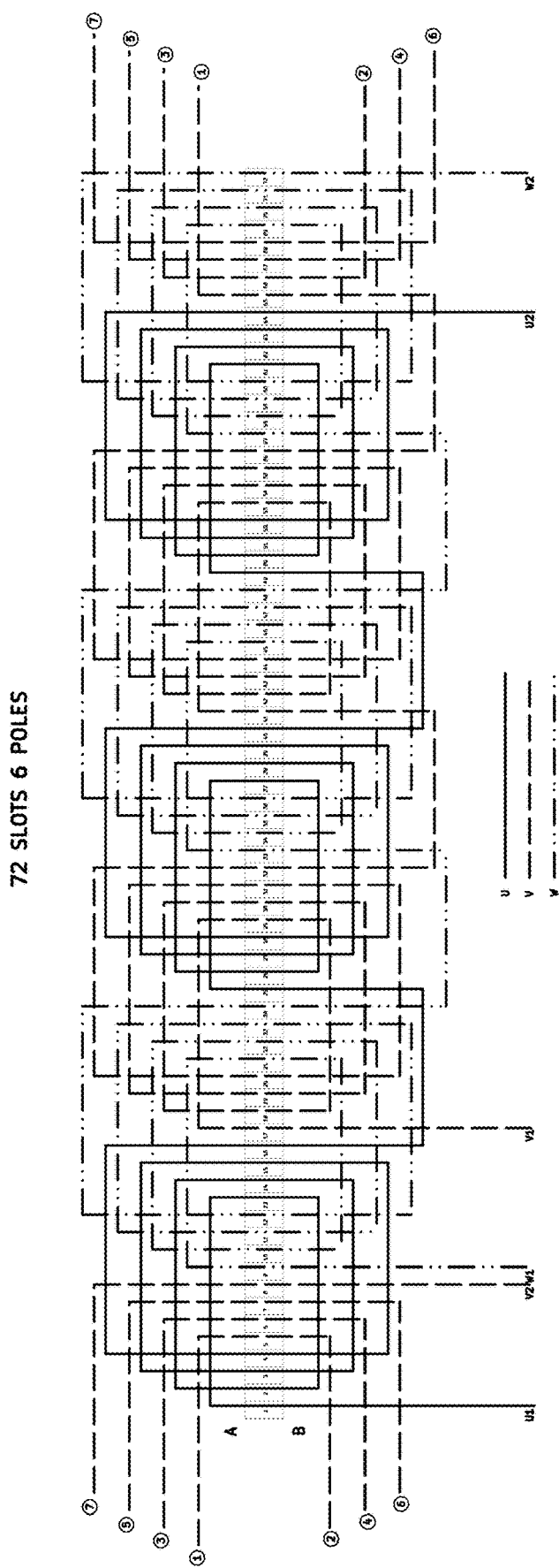
FIG. 18 illustrates a winding diagram for a configuration of the electric motor with 6 poles in accordance with aspects of this disclosure.
Figure 19A:
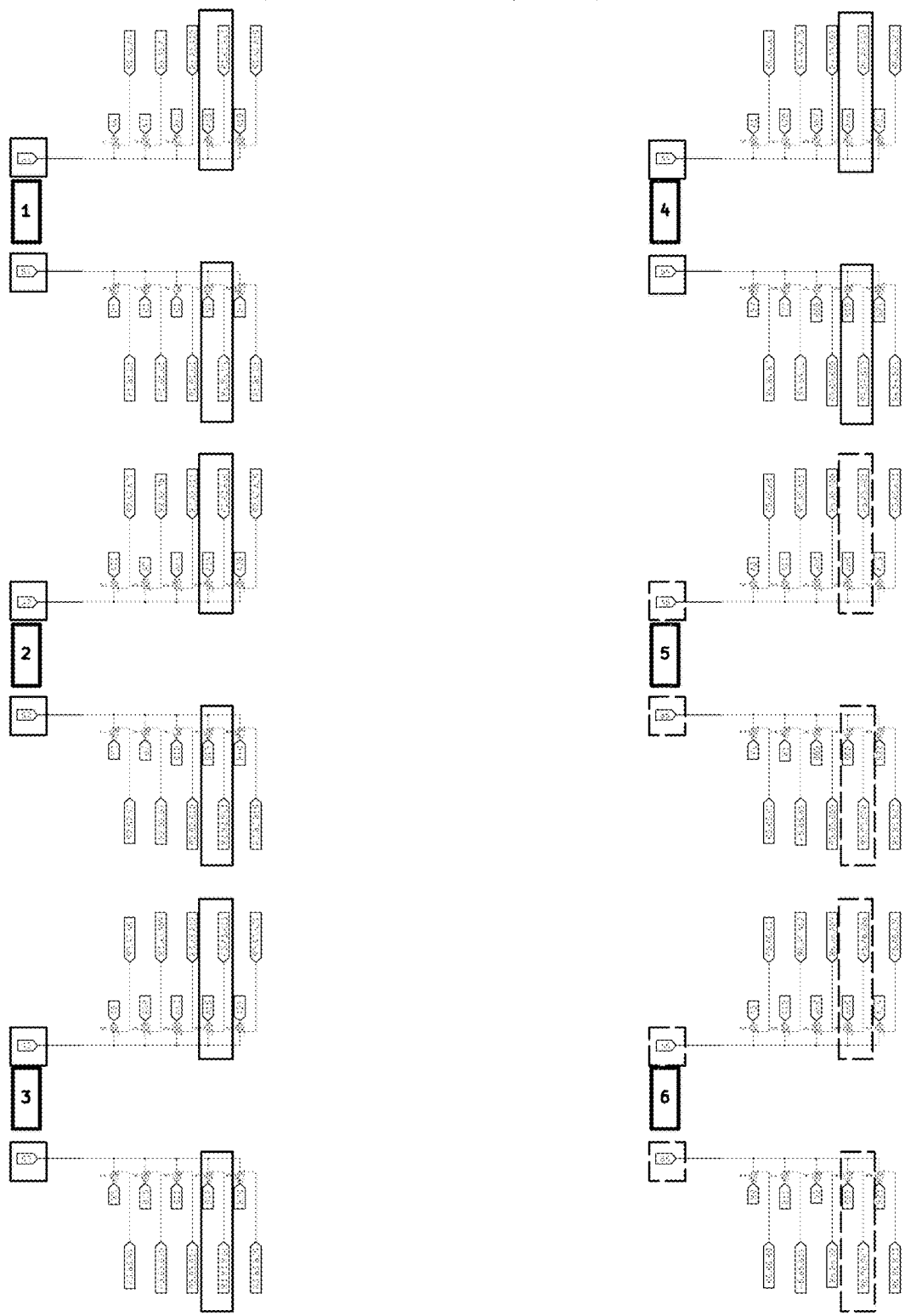
FIGS. 19A-19L illustrate the switching panel slots for a configuration of the electric motor with 6 poles in accordance with aspects of this disclosure.
Figure 19B:
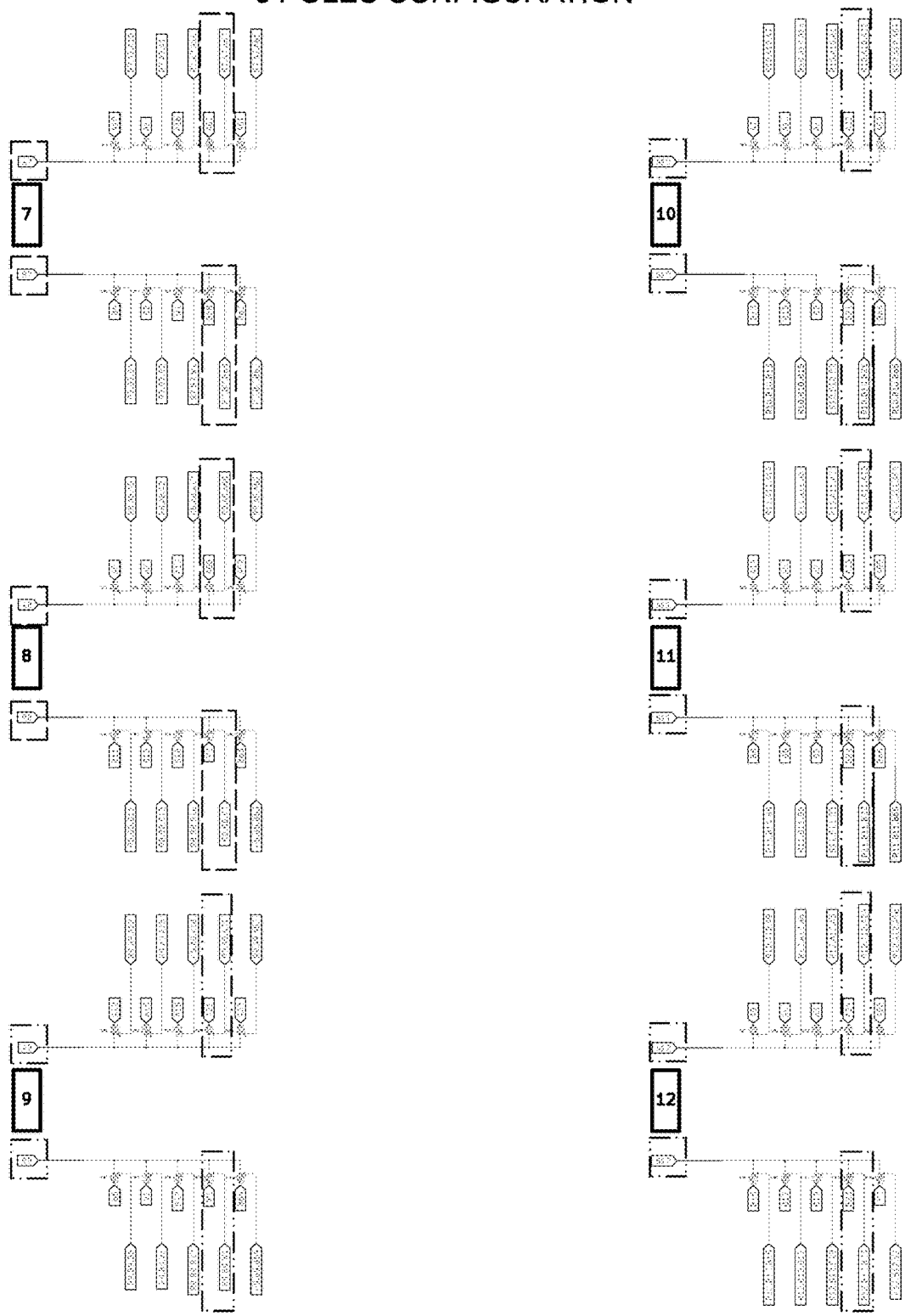
Figure 19C:
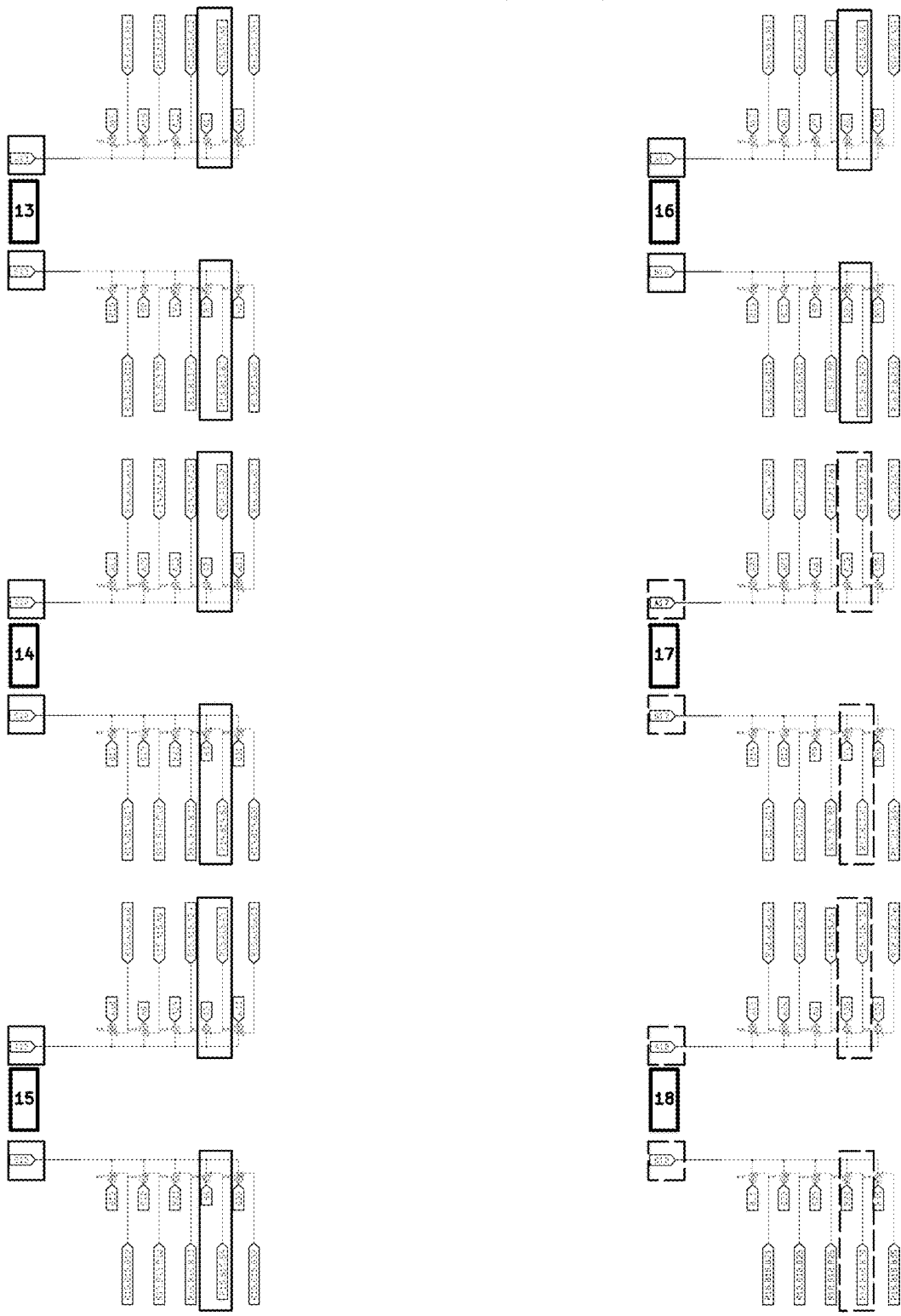
Figure 19D:
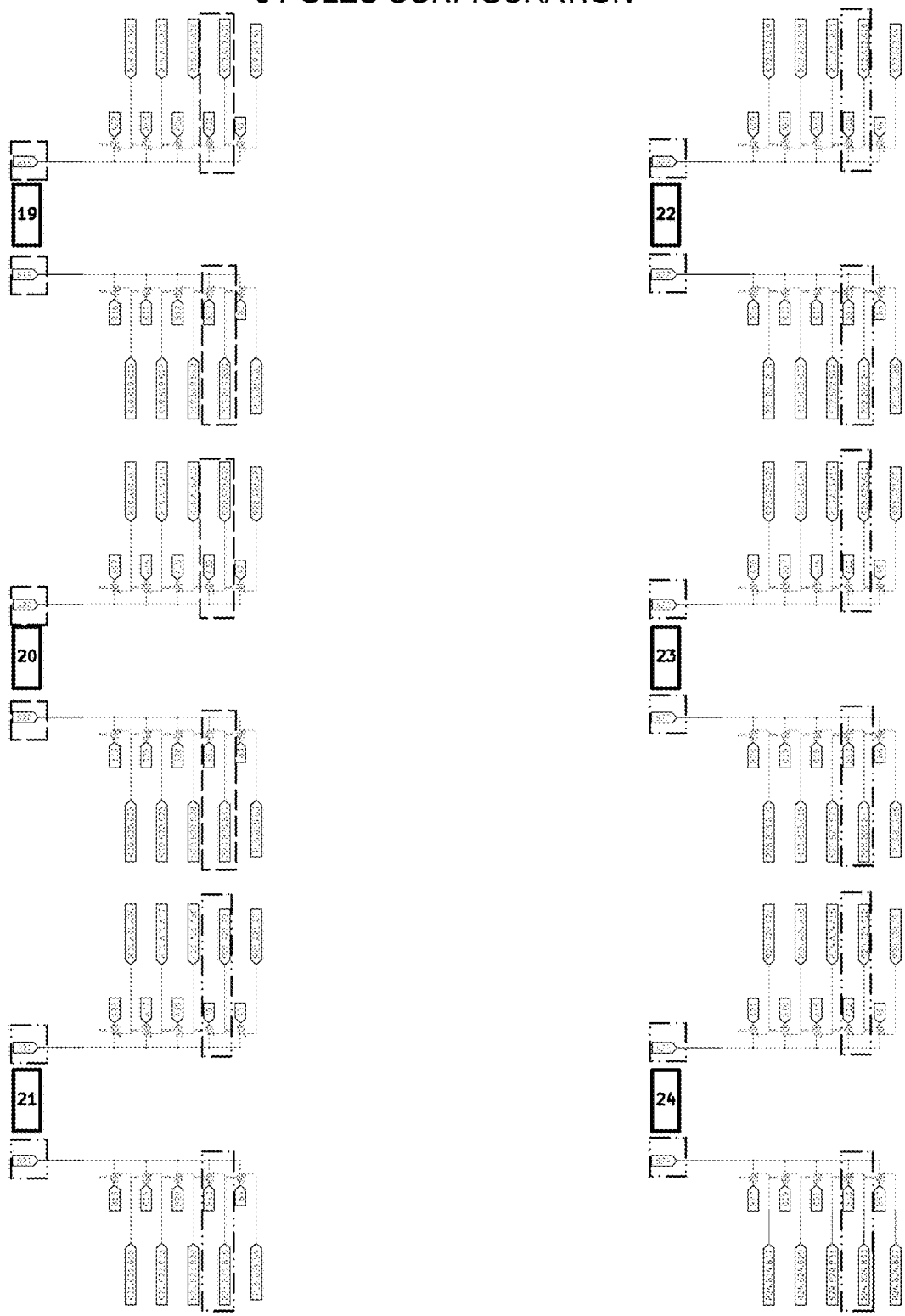
Figure 19E:
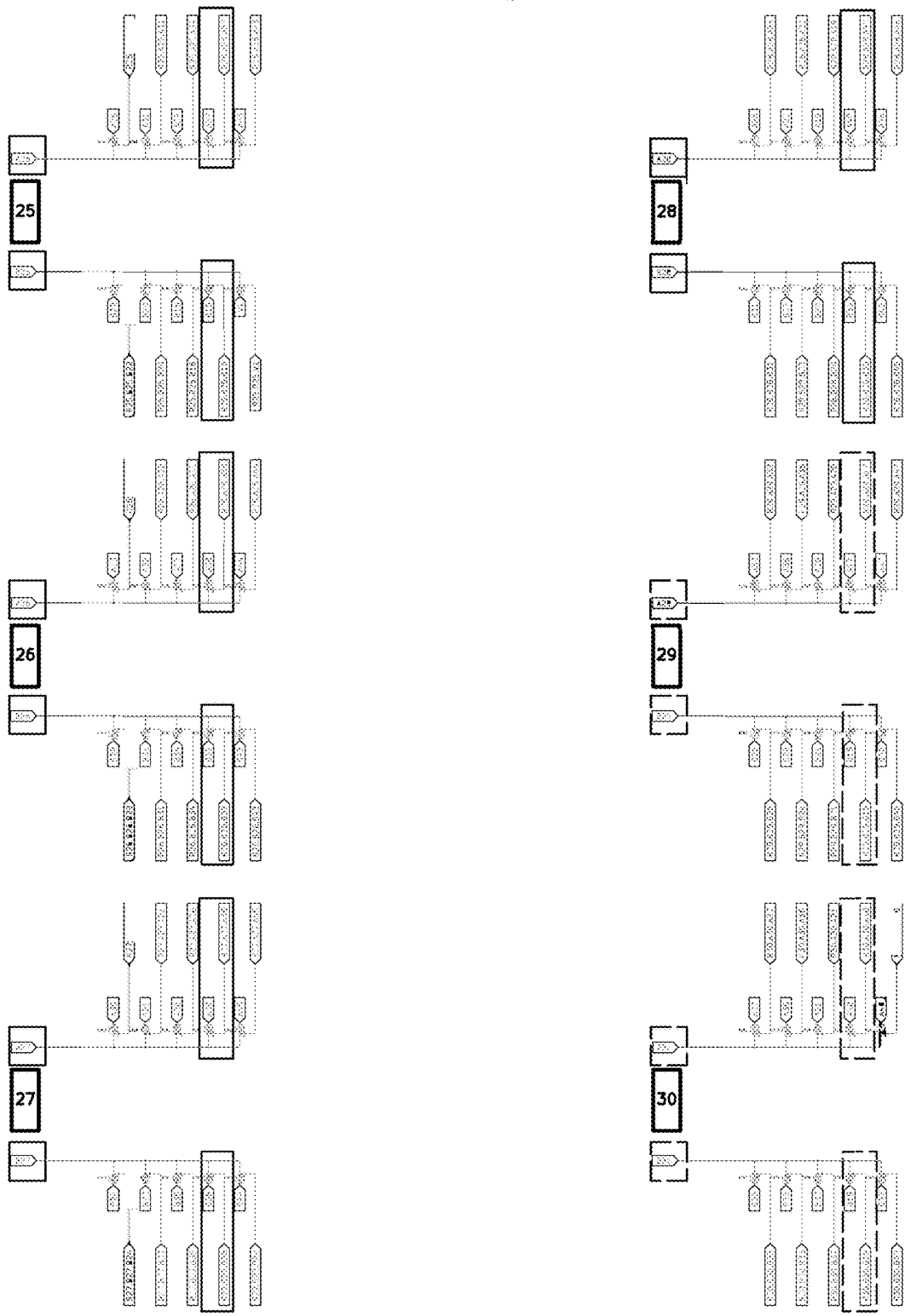
Figure 19F:
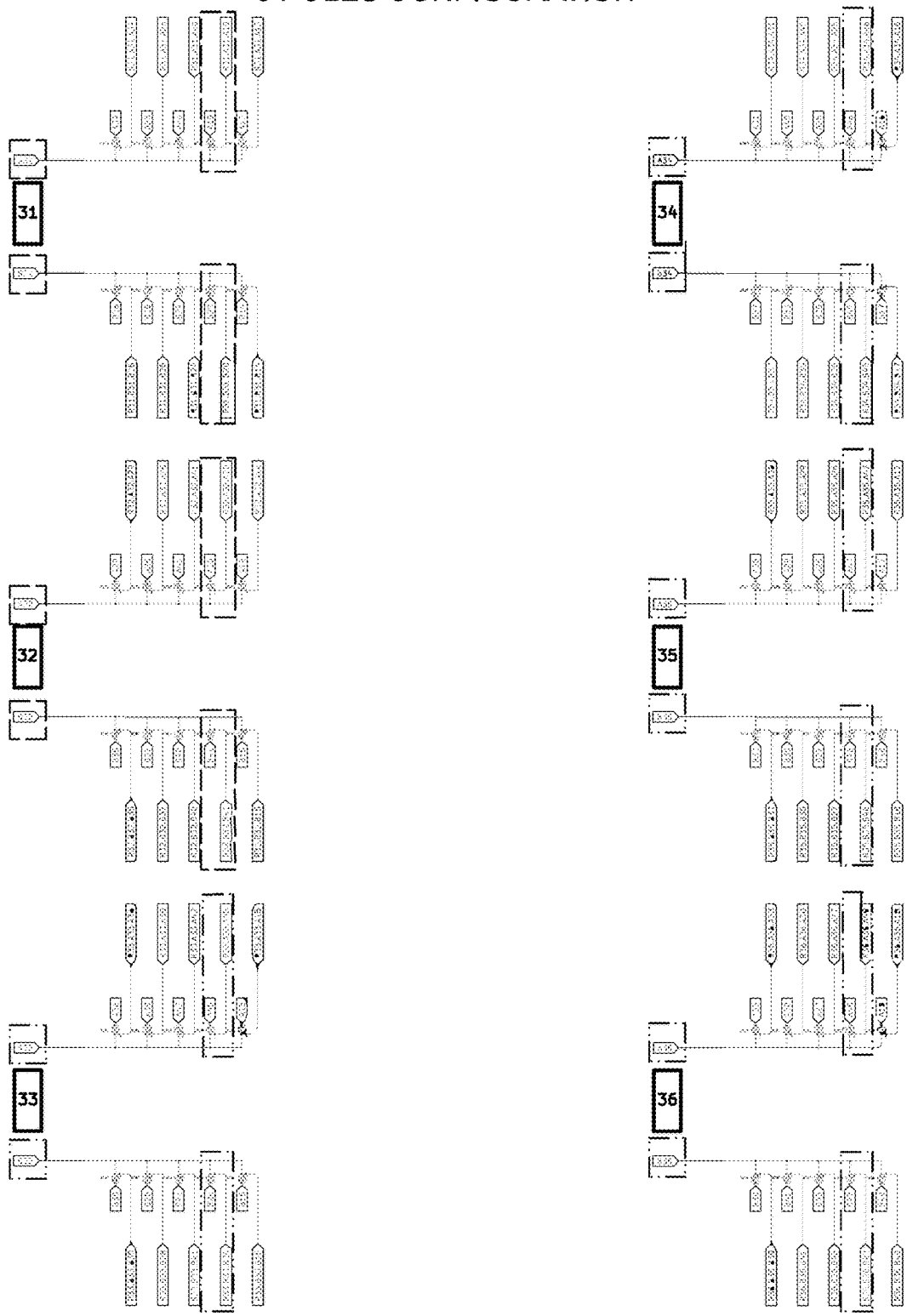
Figure 19G:
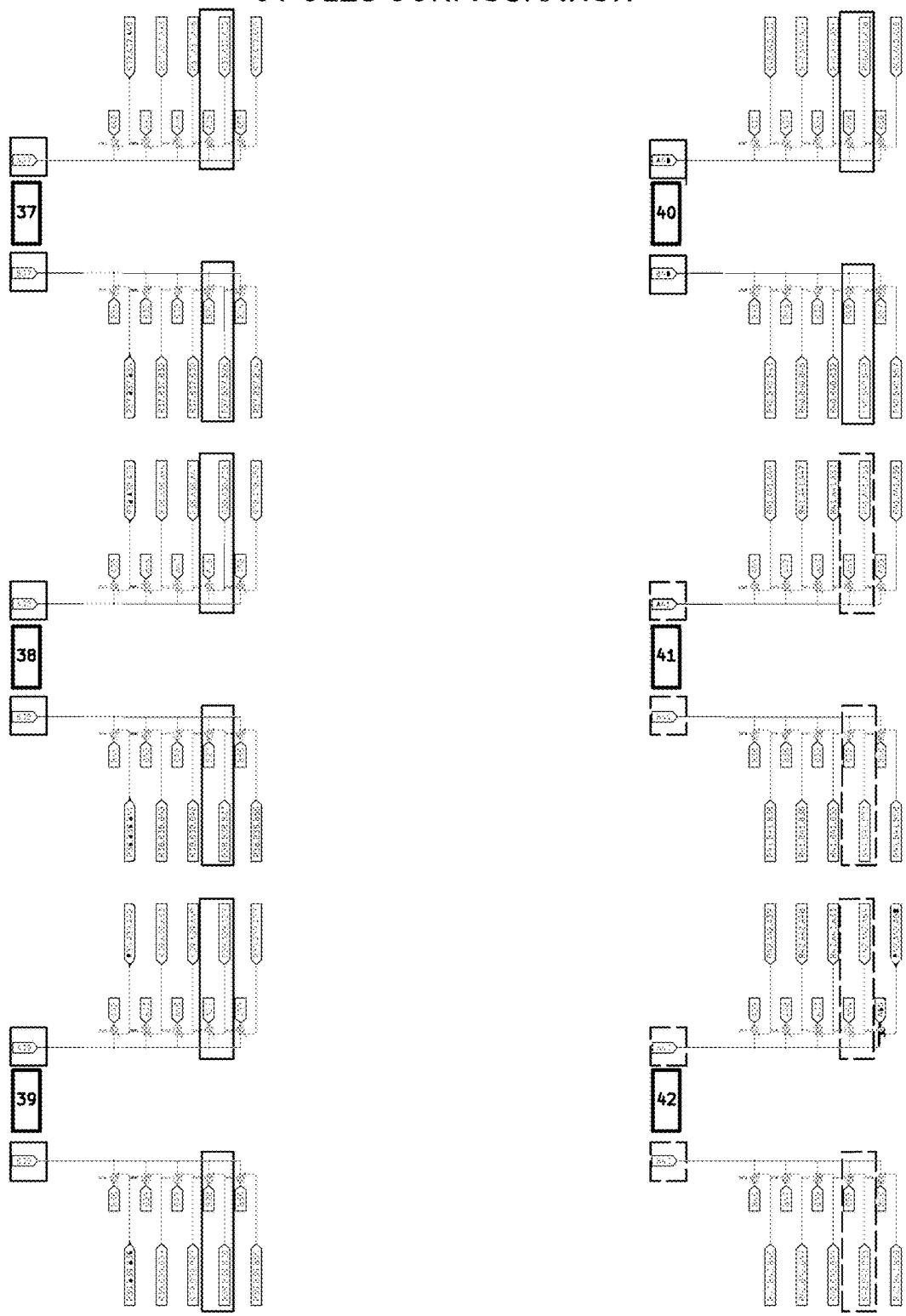
Figure 19H:
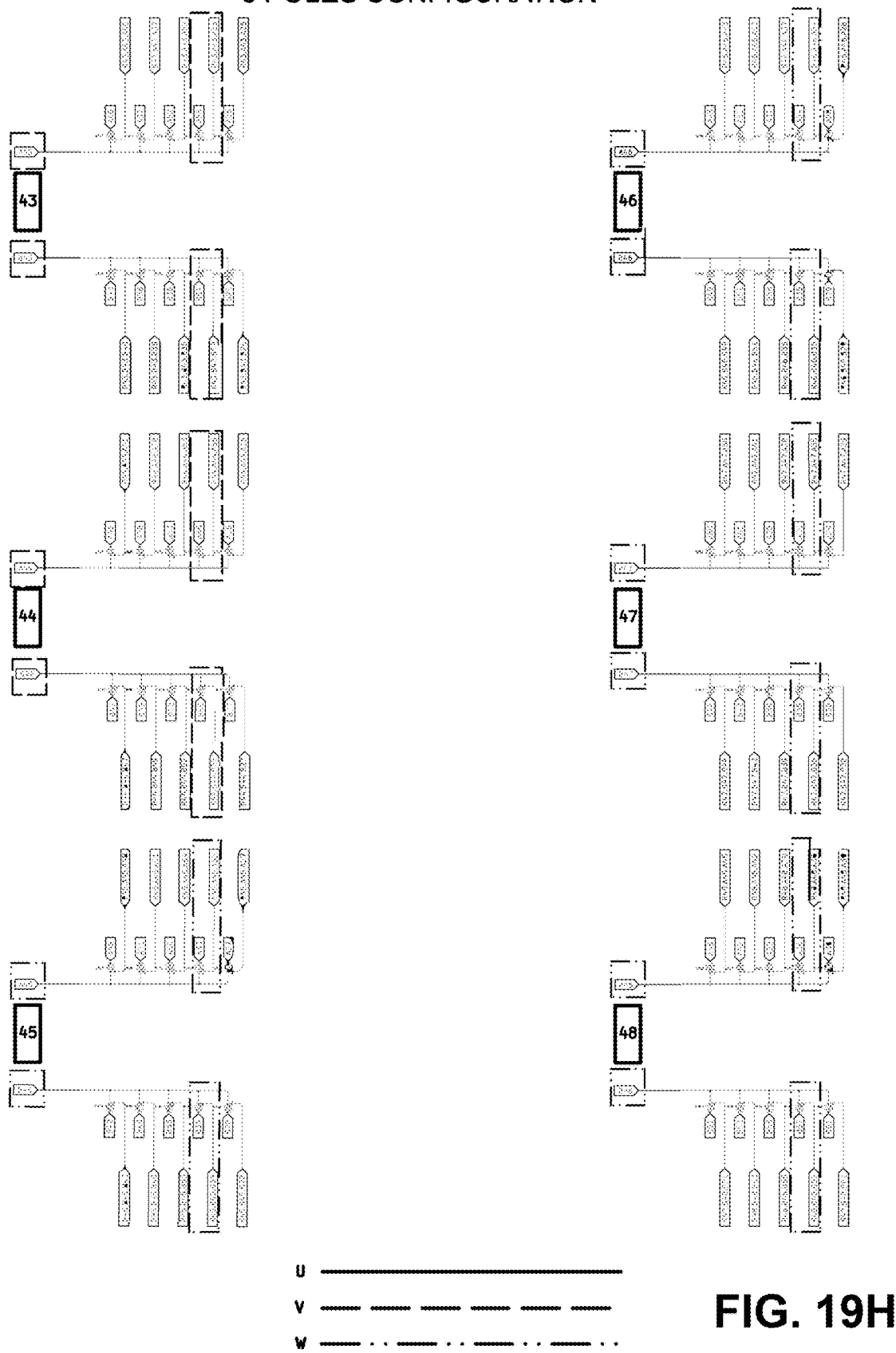
Figure 19I:
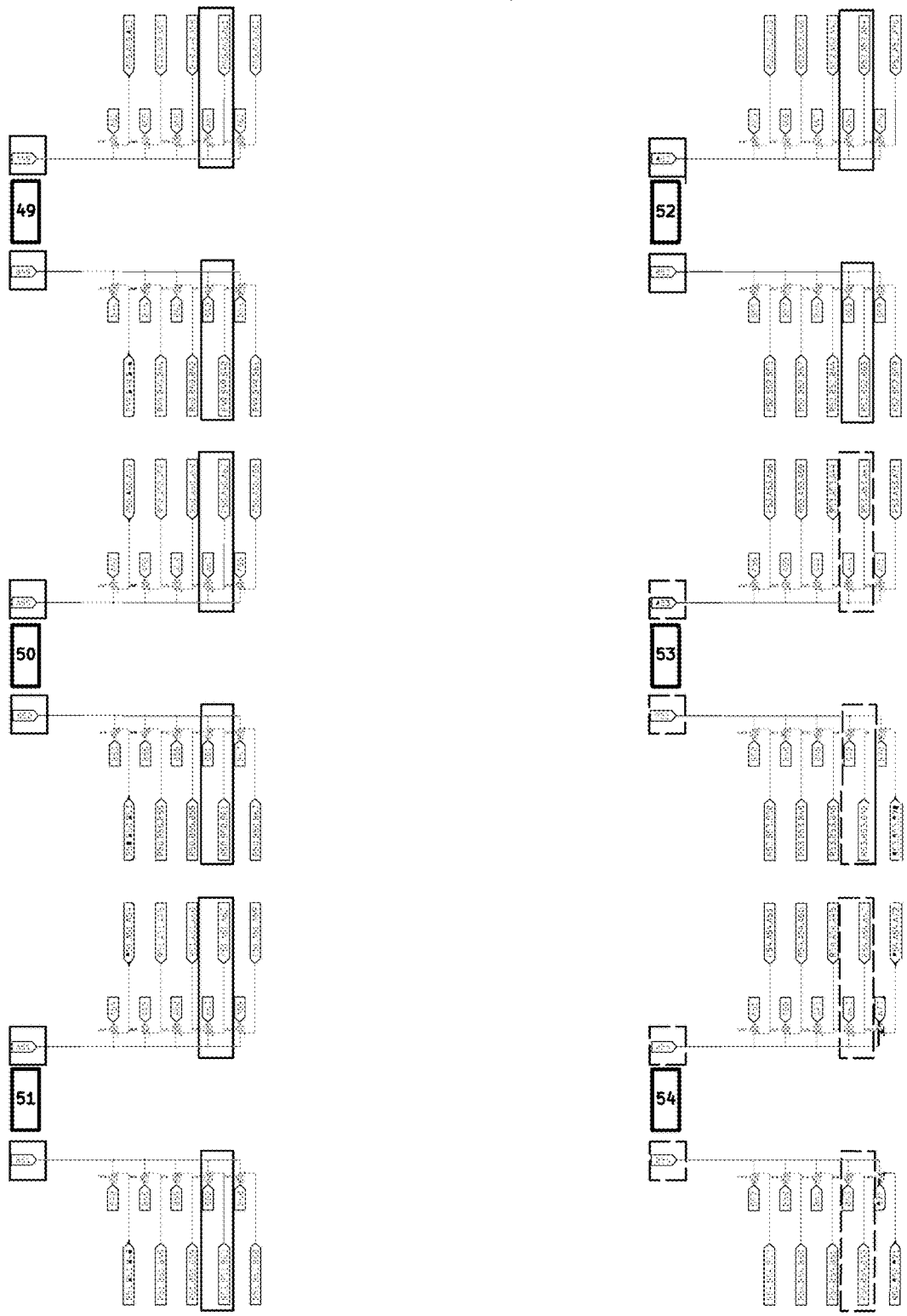
Figure 19J:
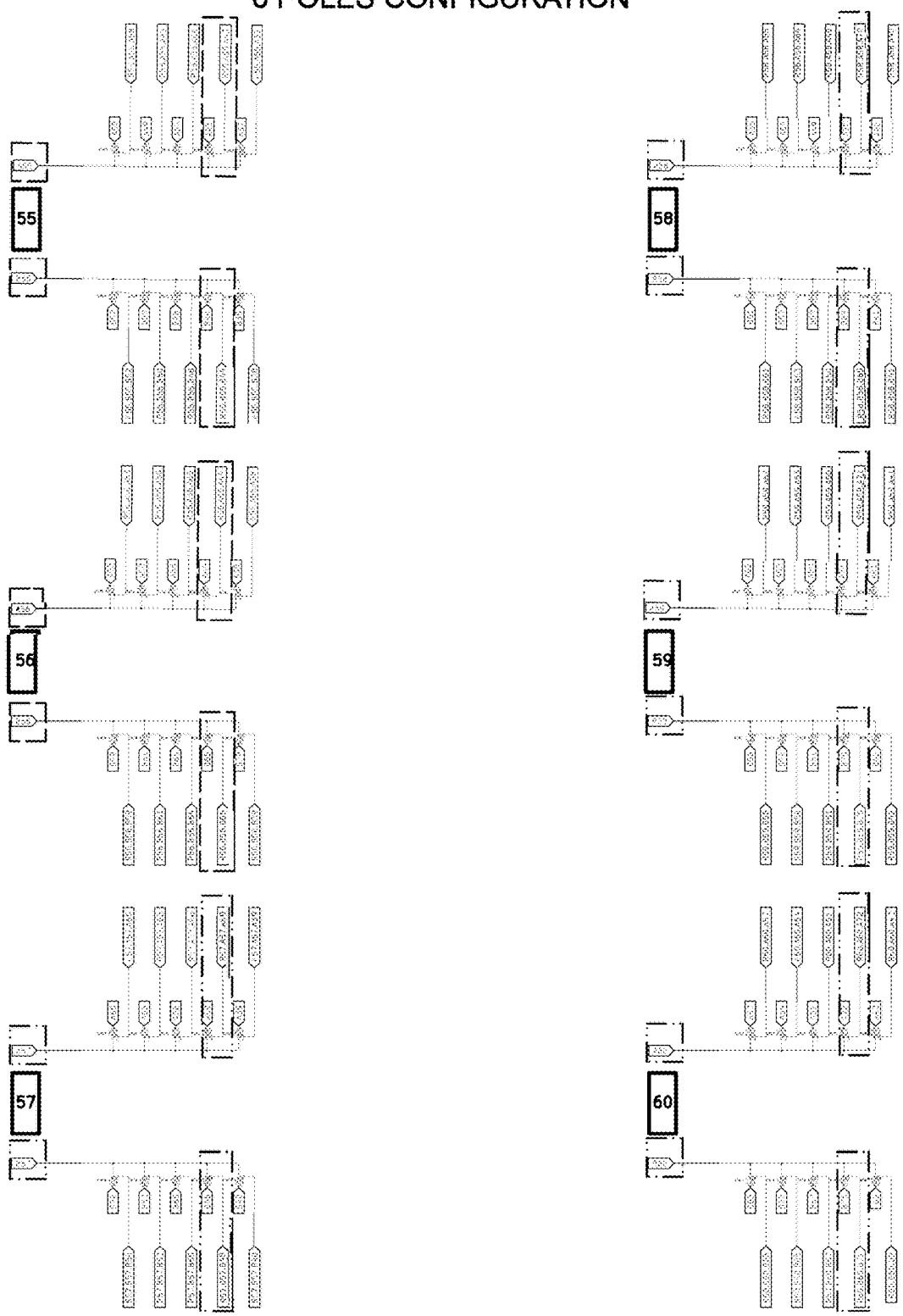
Figure 19K:
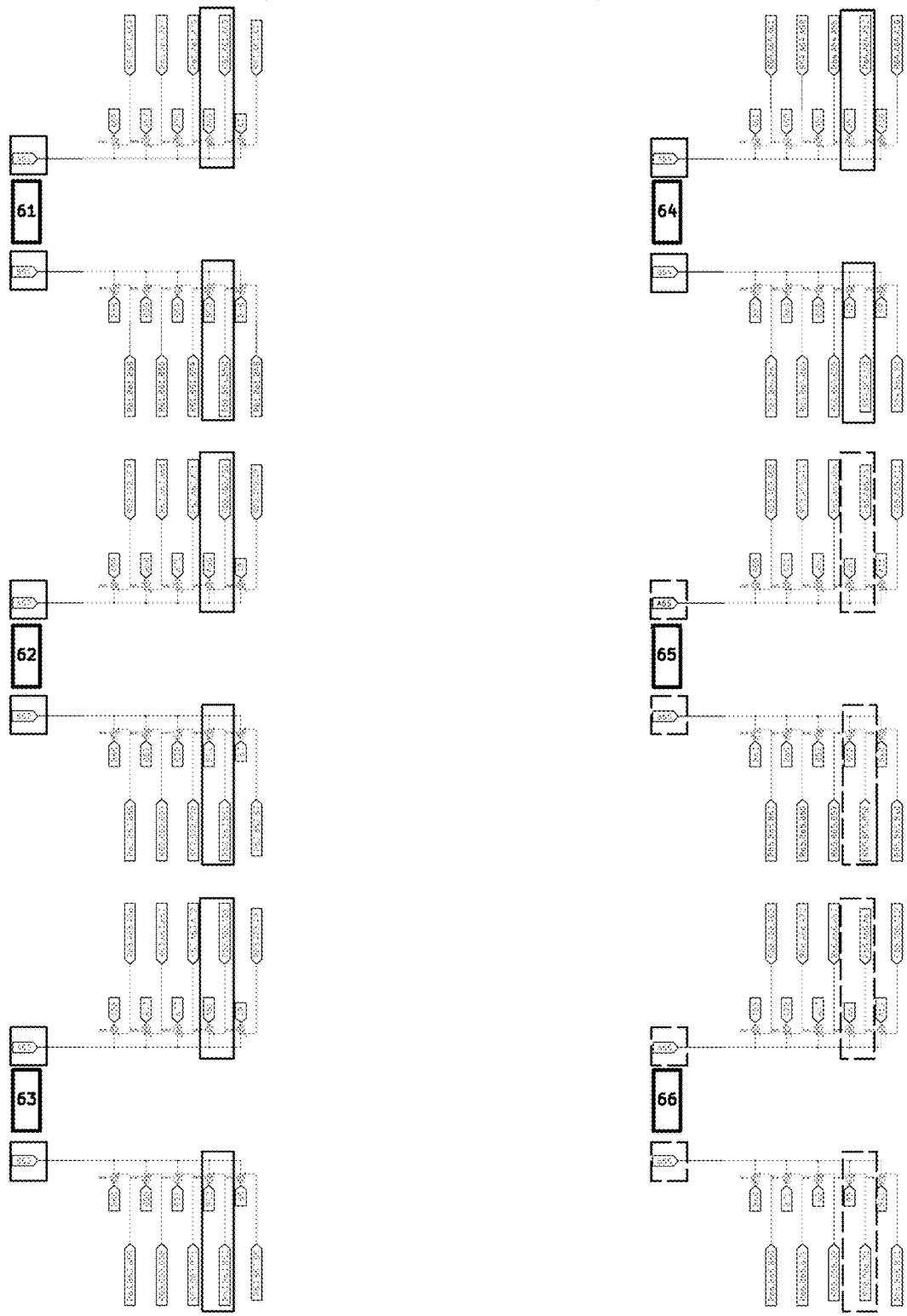
Figure 19L:
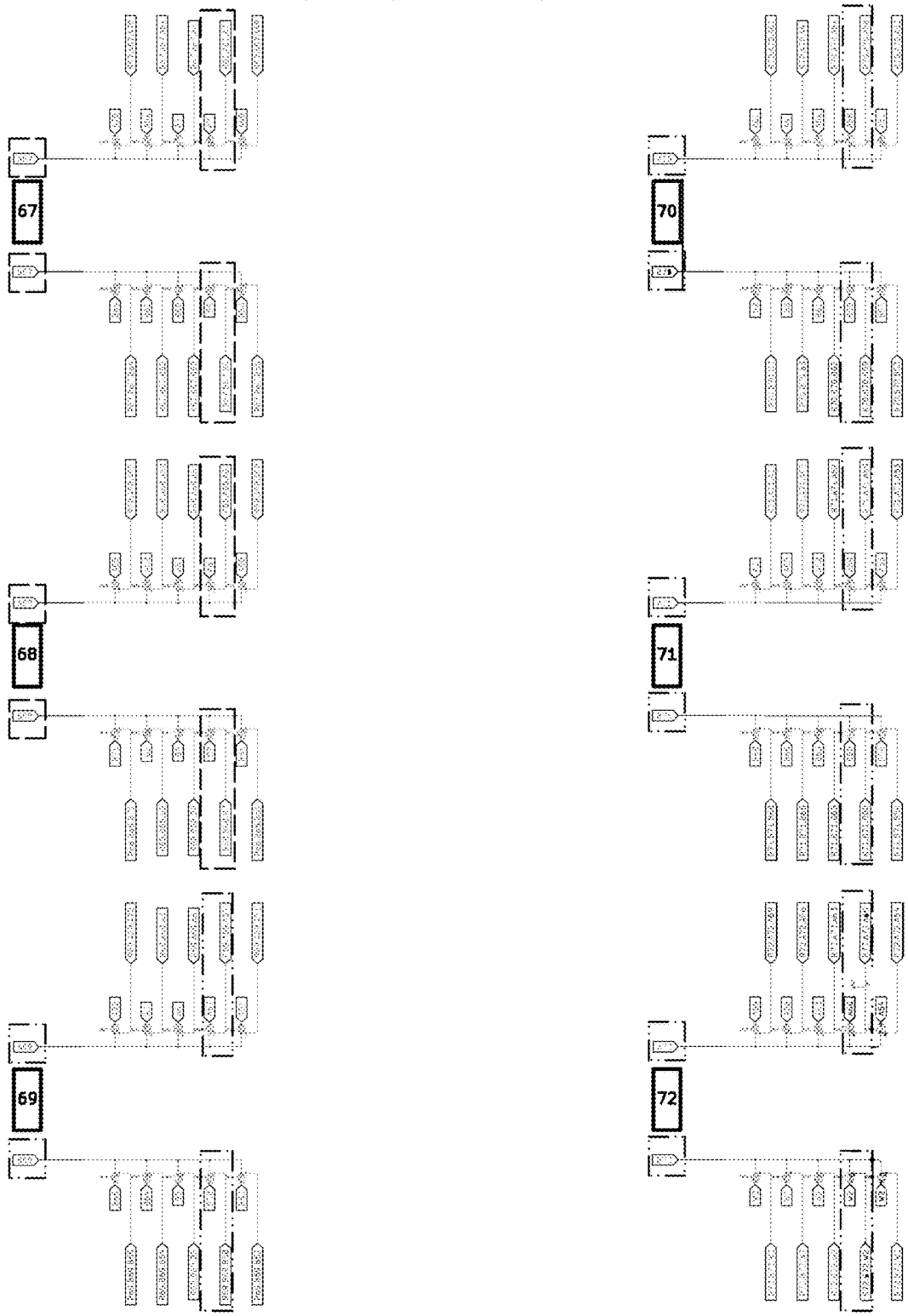

FIG. 18 illustrates a winding diagram for a configuration of the electric motor with 6 poles in accordance with aspects of this disclosure.

FIGS. 19A-19L illustrate the switching panel slots for a configuration of the electric motor with 6 poles in accordance with aspects of this disclosure.

Figure 20:
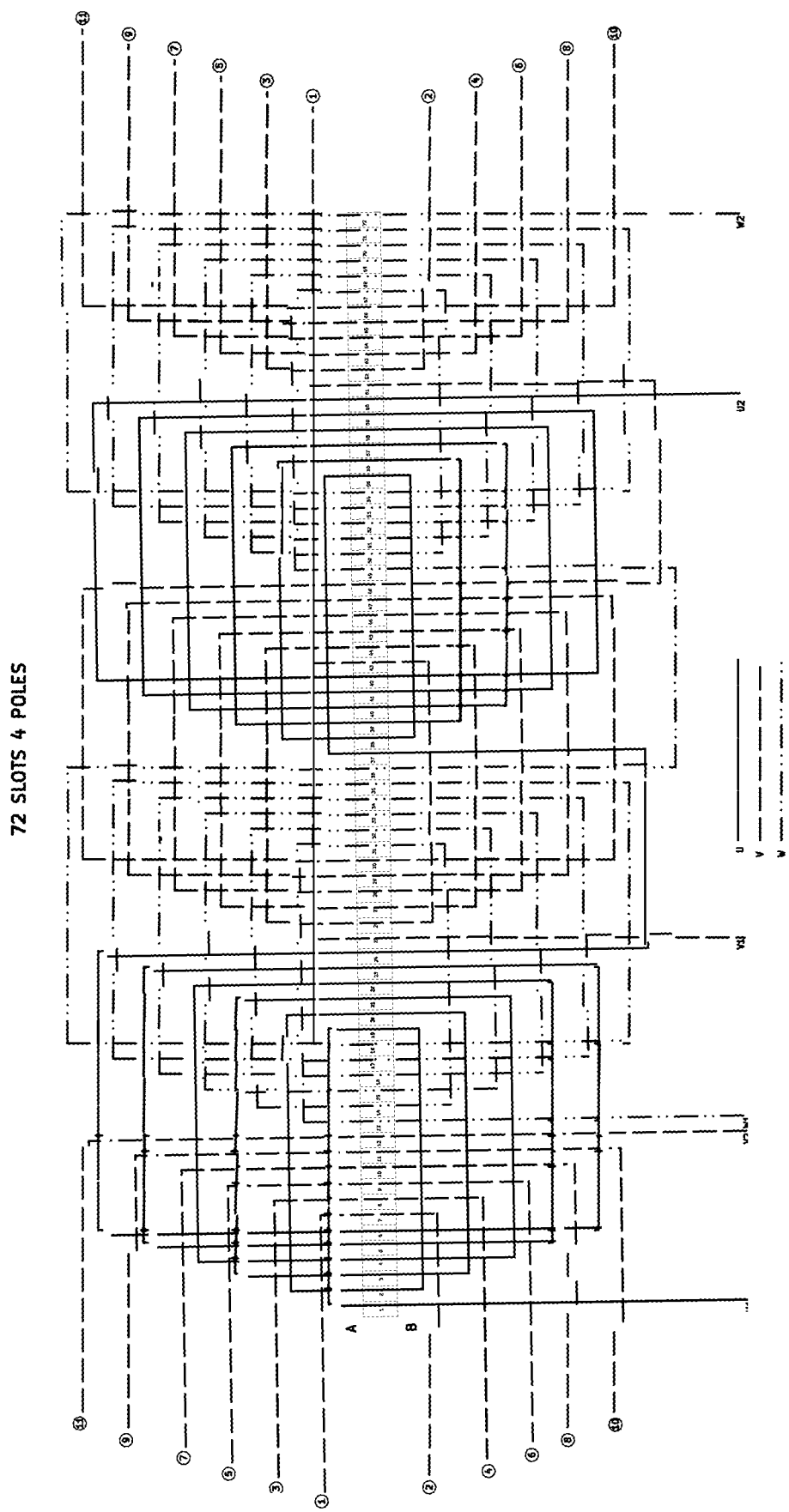
FIG. 20 illustrates a winding diagram for a configuration of the electric motor with 4 poles in accordance with aspects of this disclosure.
Figure 21A:
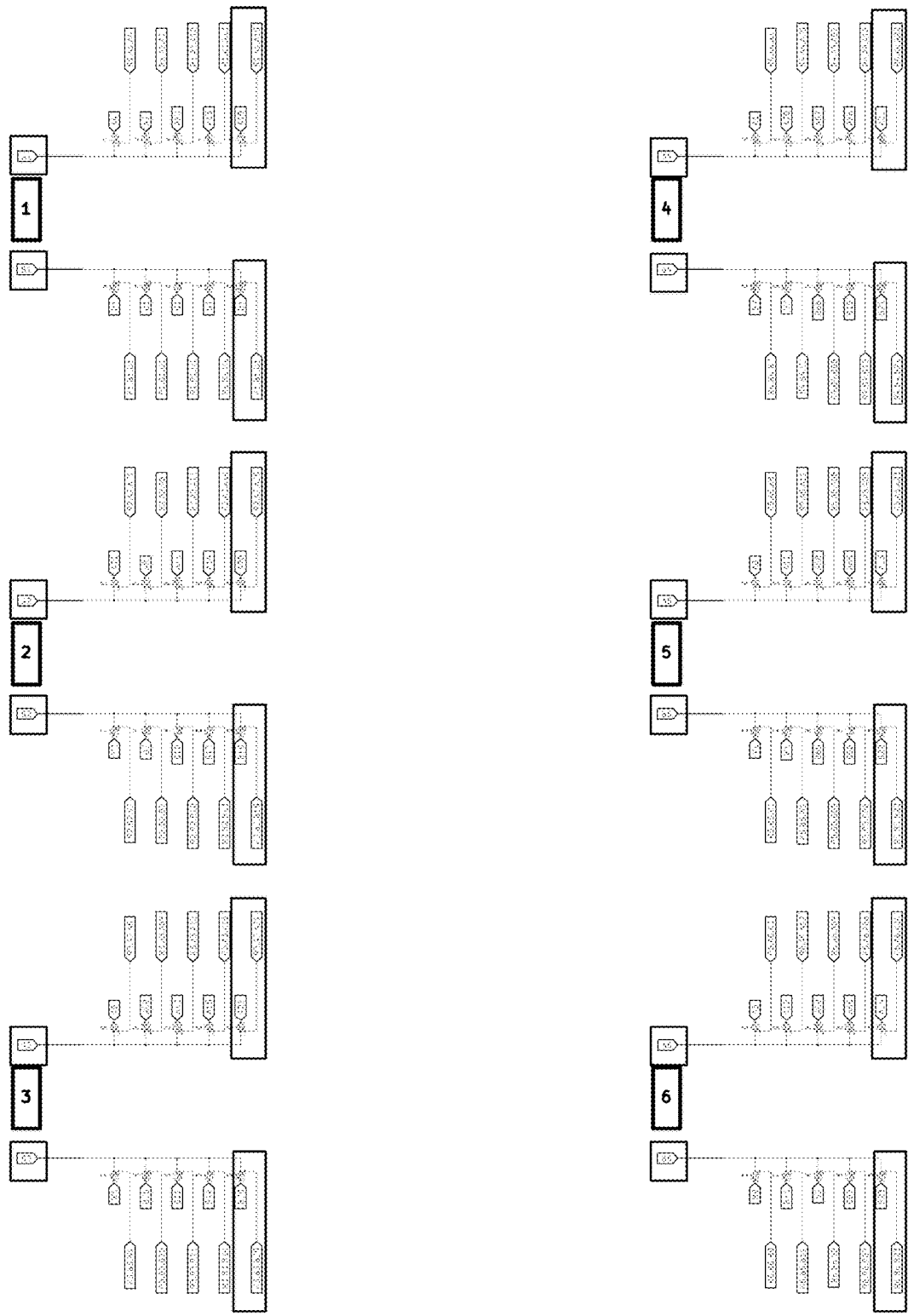
FIGS. 21A-21L illustrate the switching panel slots for a configuration of the electric motor with 4 poles in accordance with aspects of this disclosure.
Figure 21B:
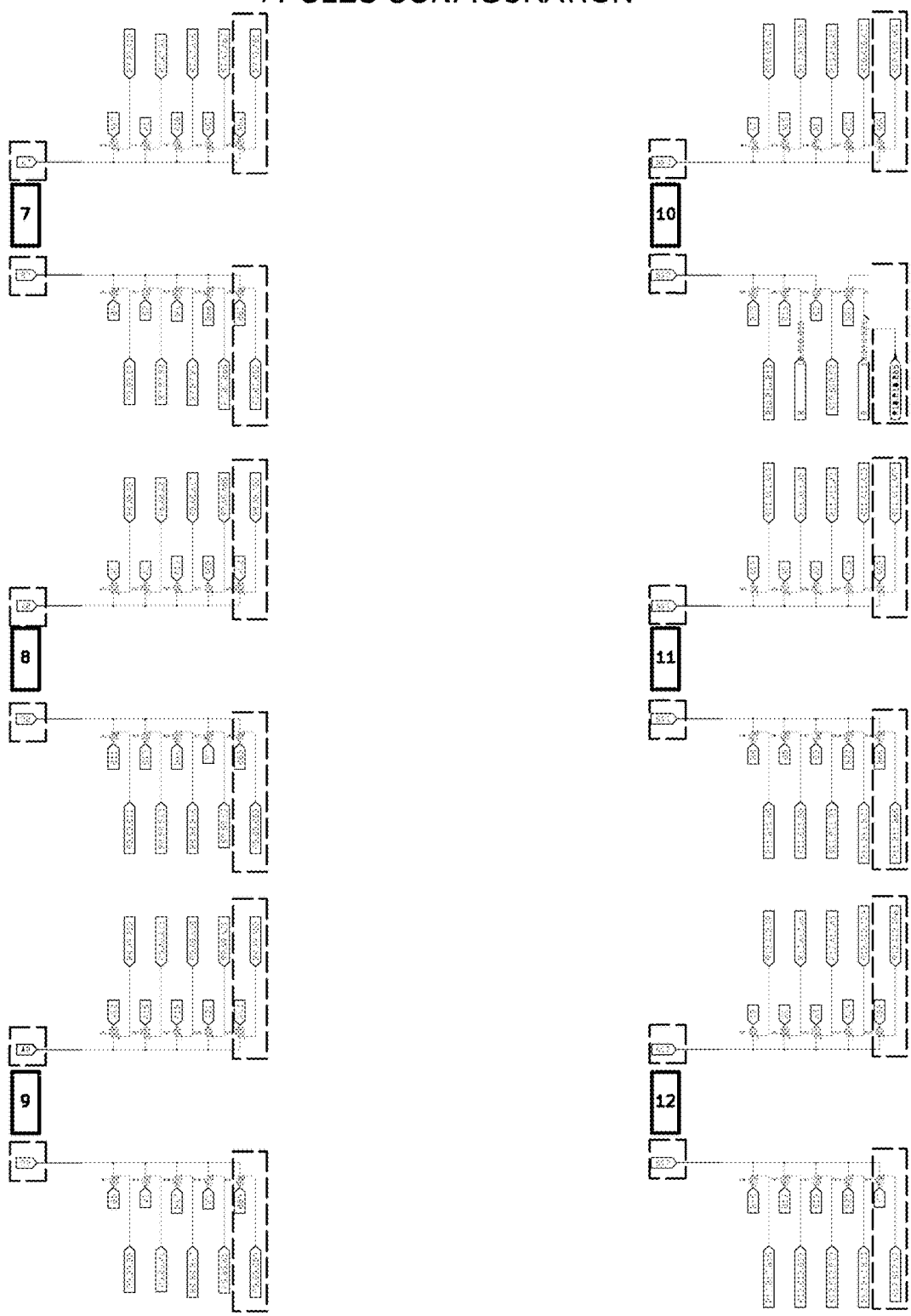
Figure 21C:
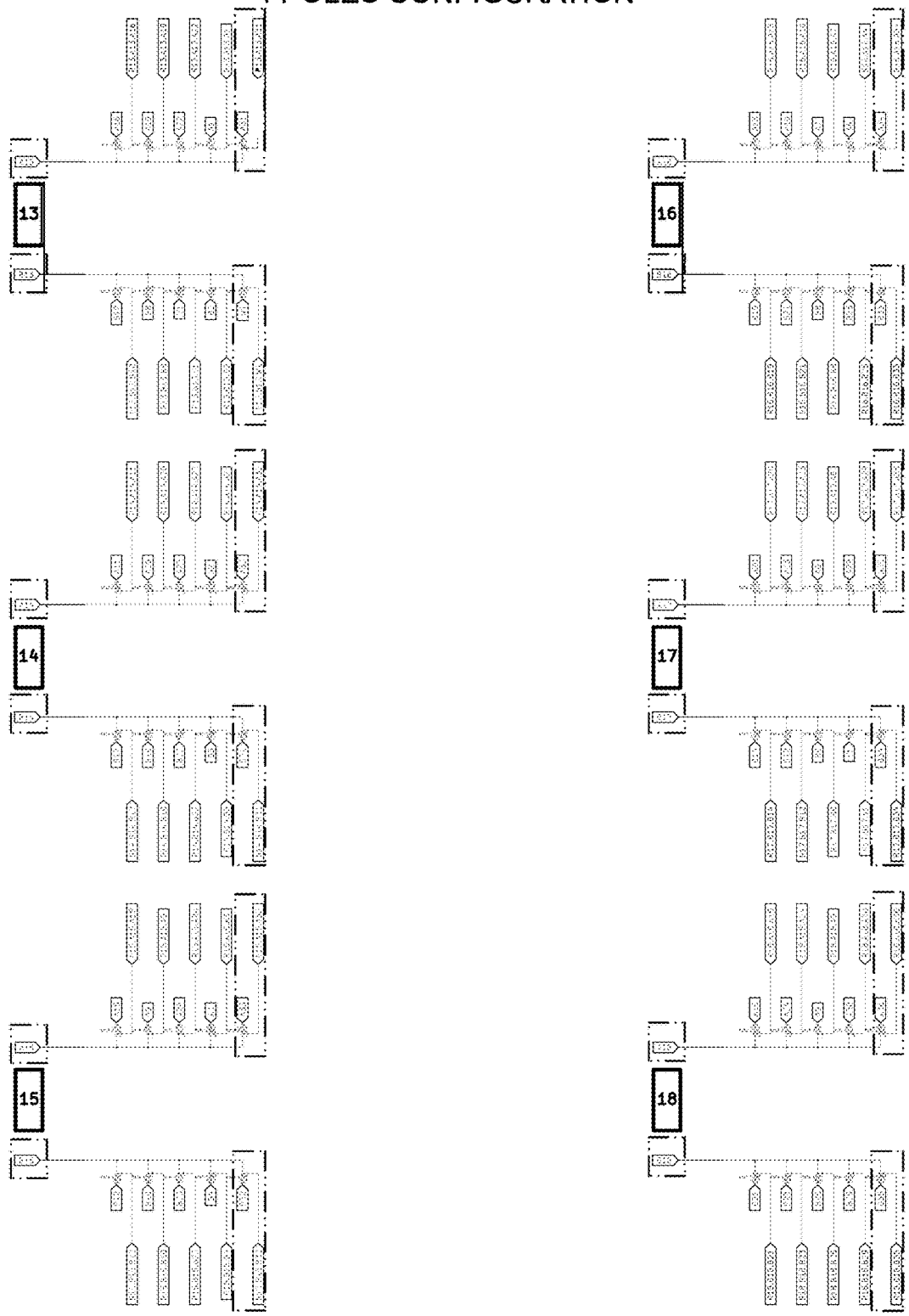
Figure 21D:
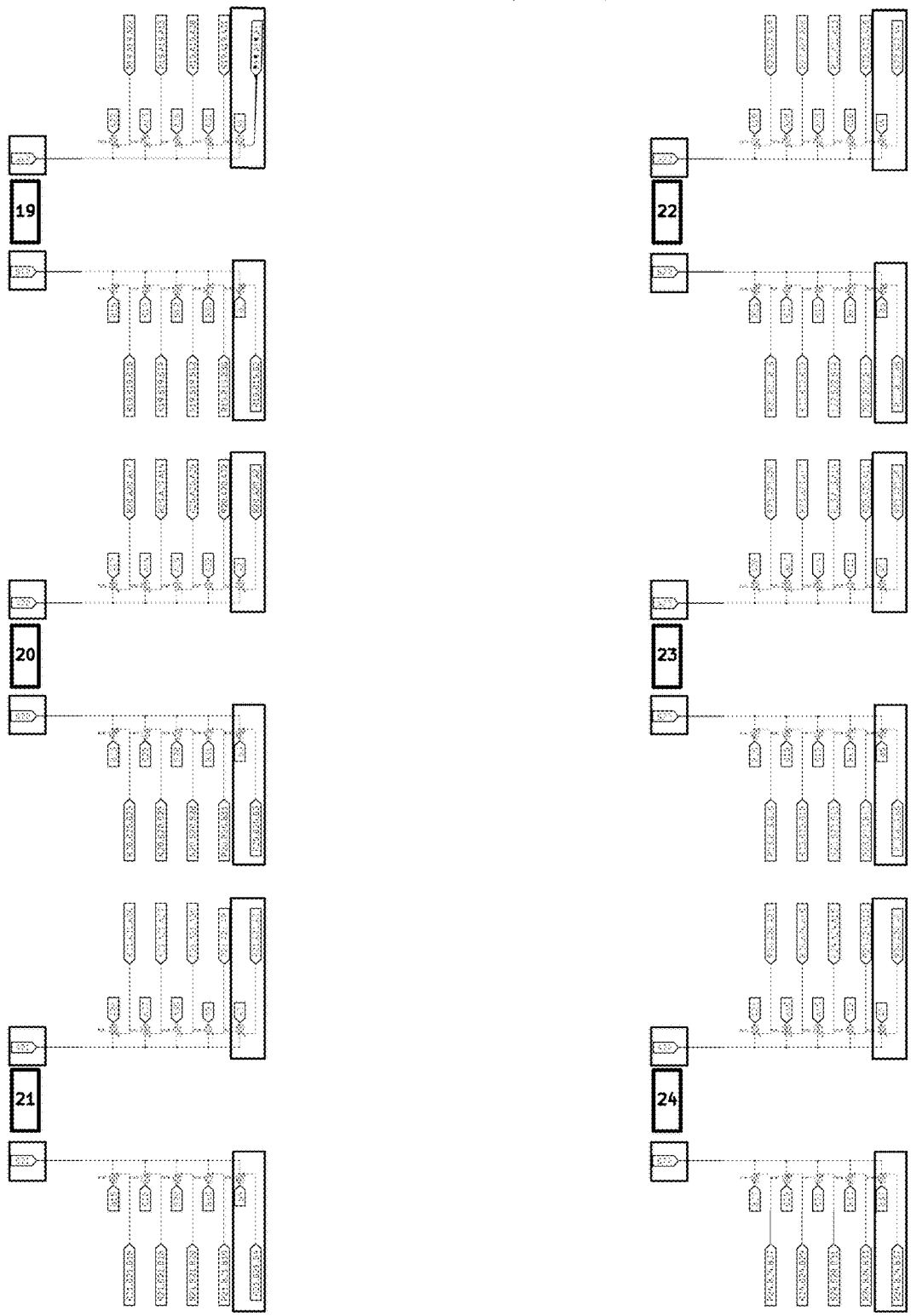
Figure 21E:
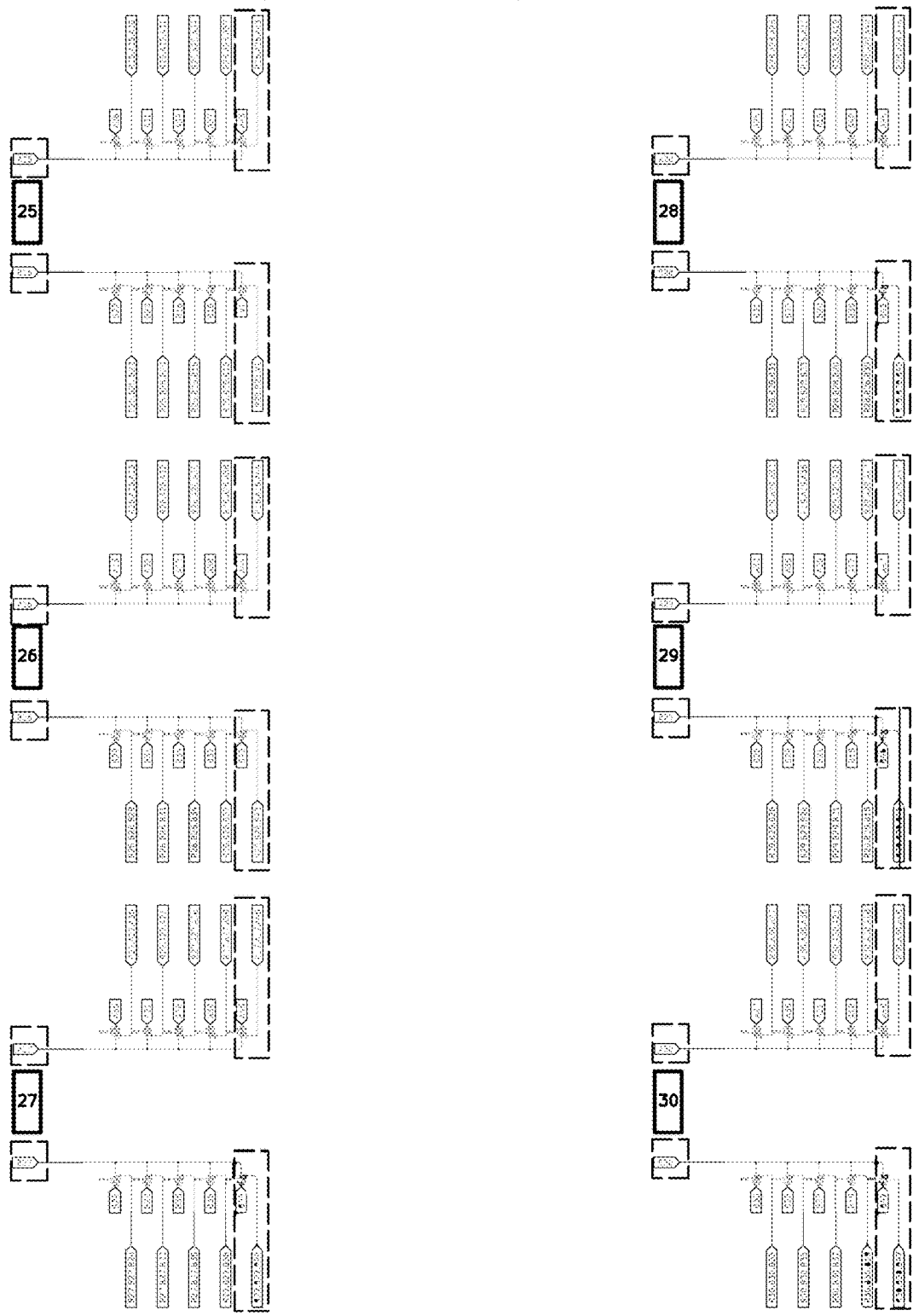
Figure 21F:
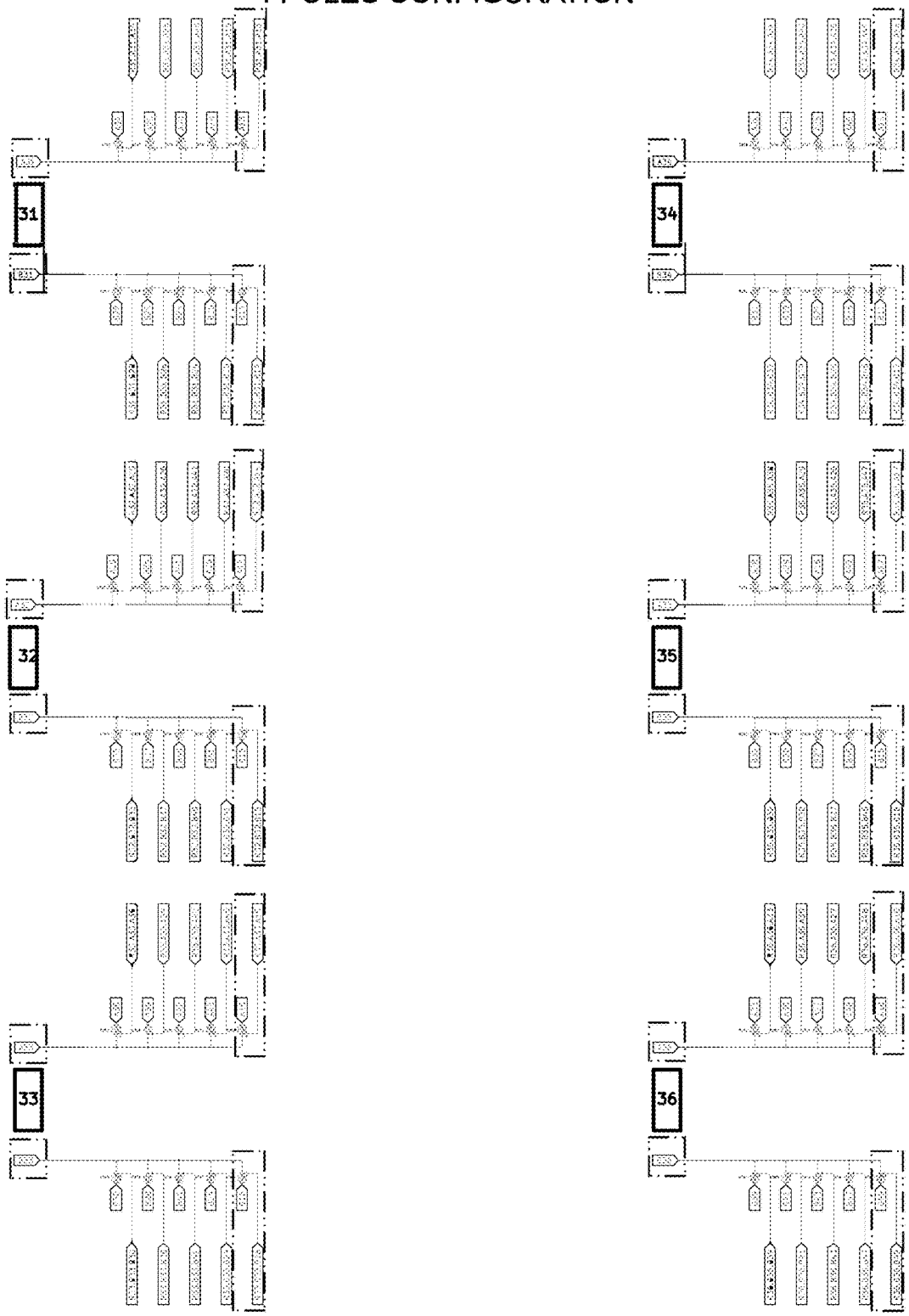
Figure 21G:
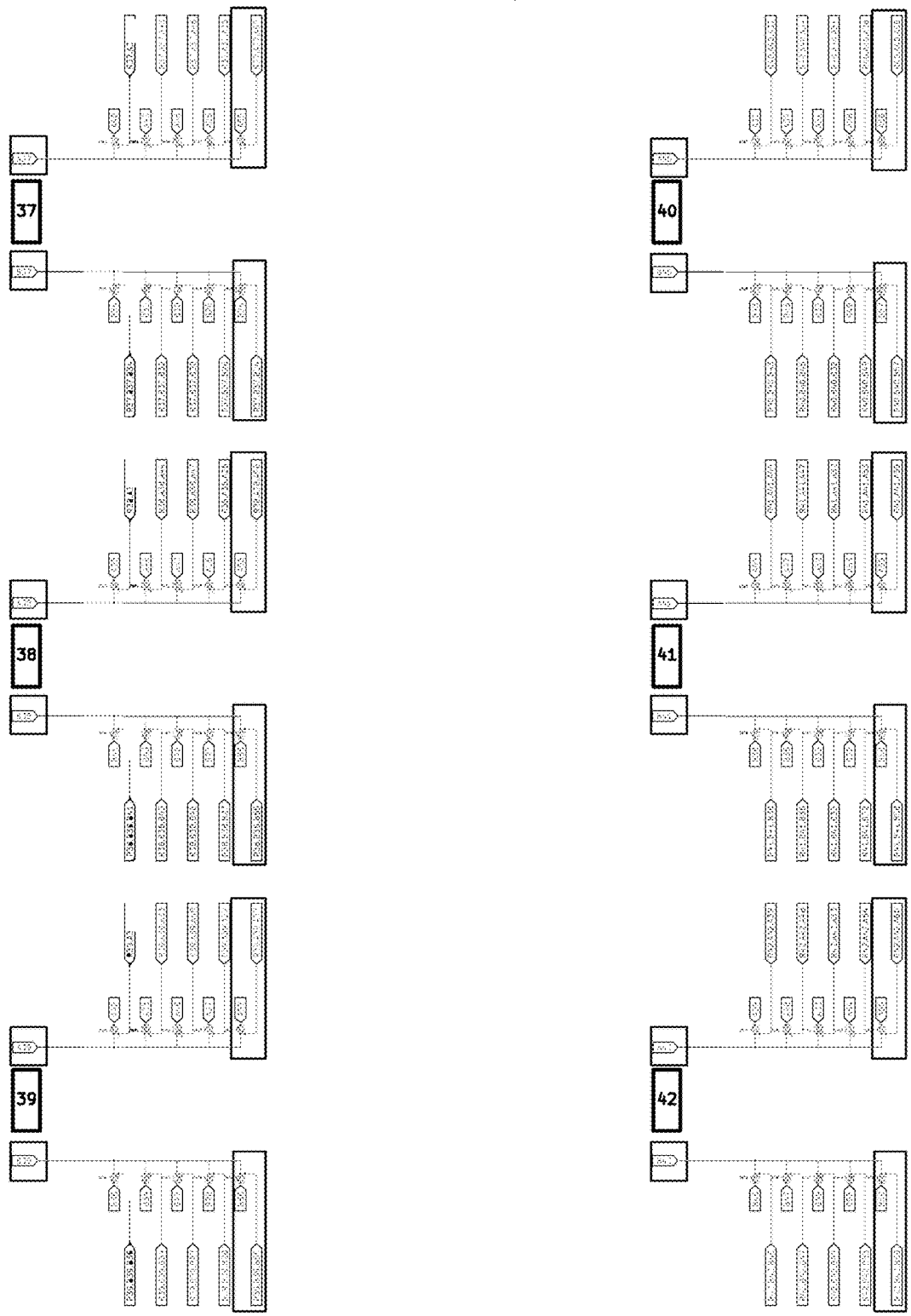
Figure 21H:
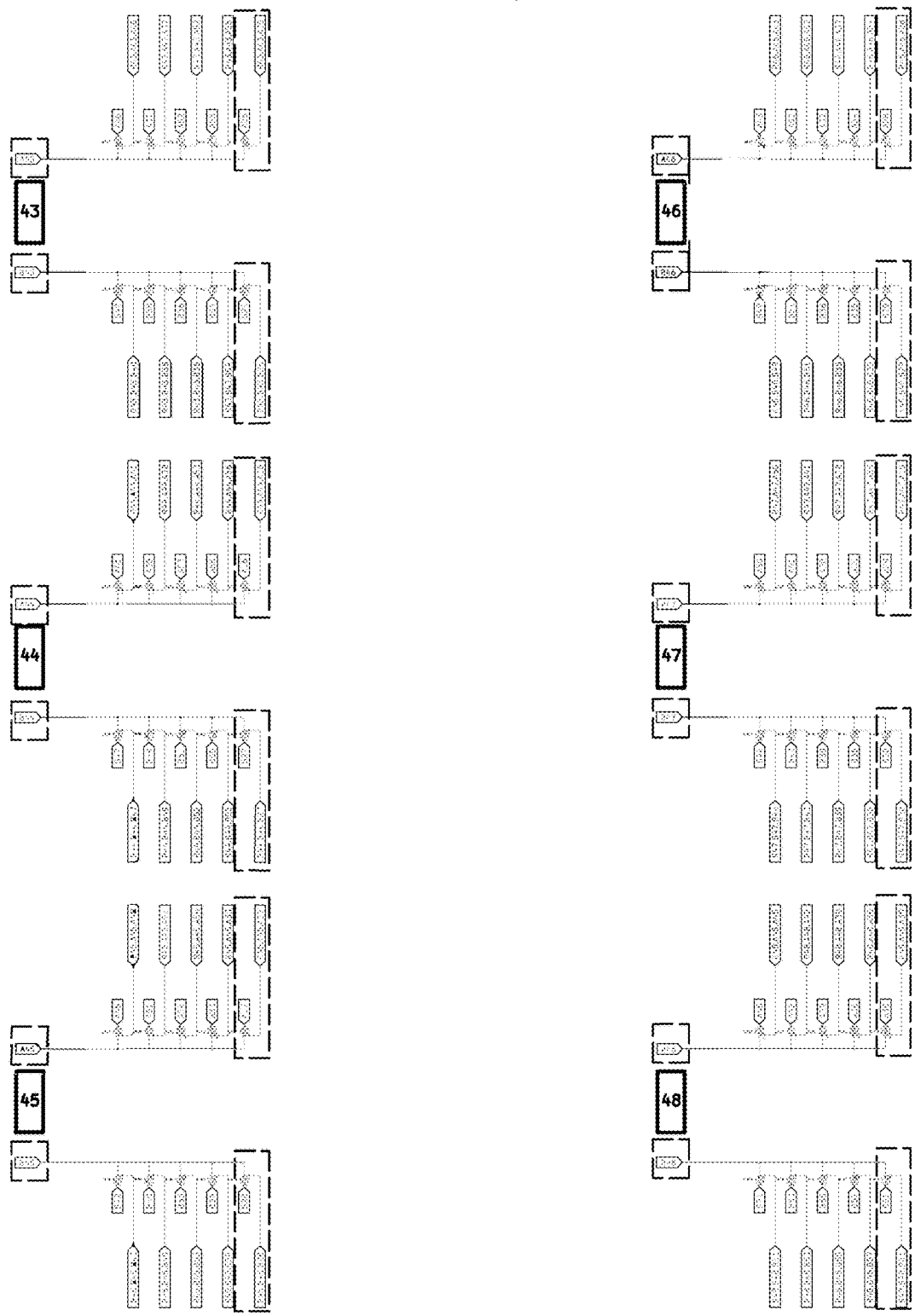
Figure 21I:
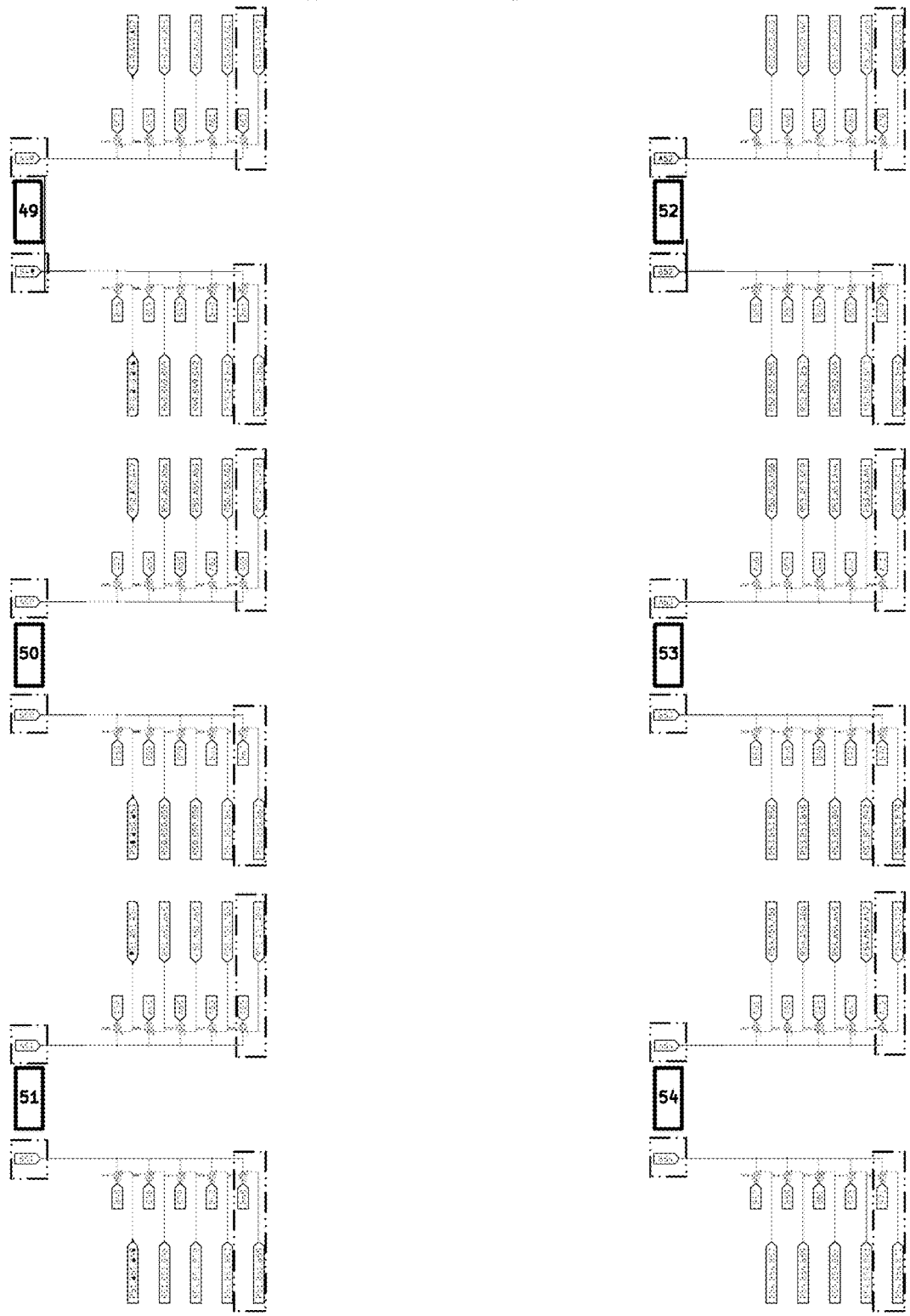
Figure 21J:
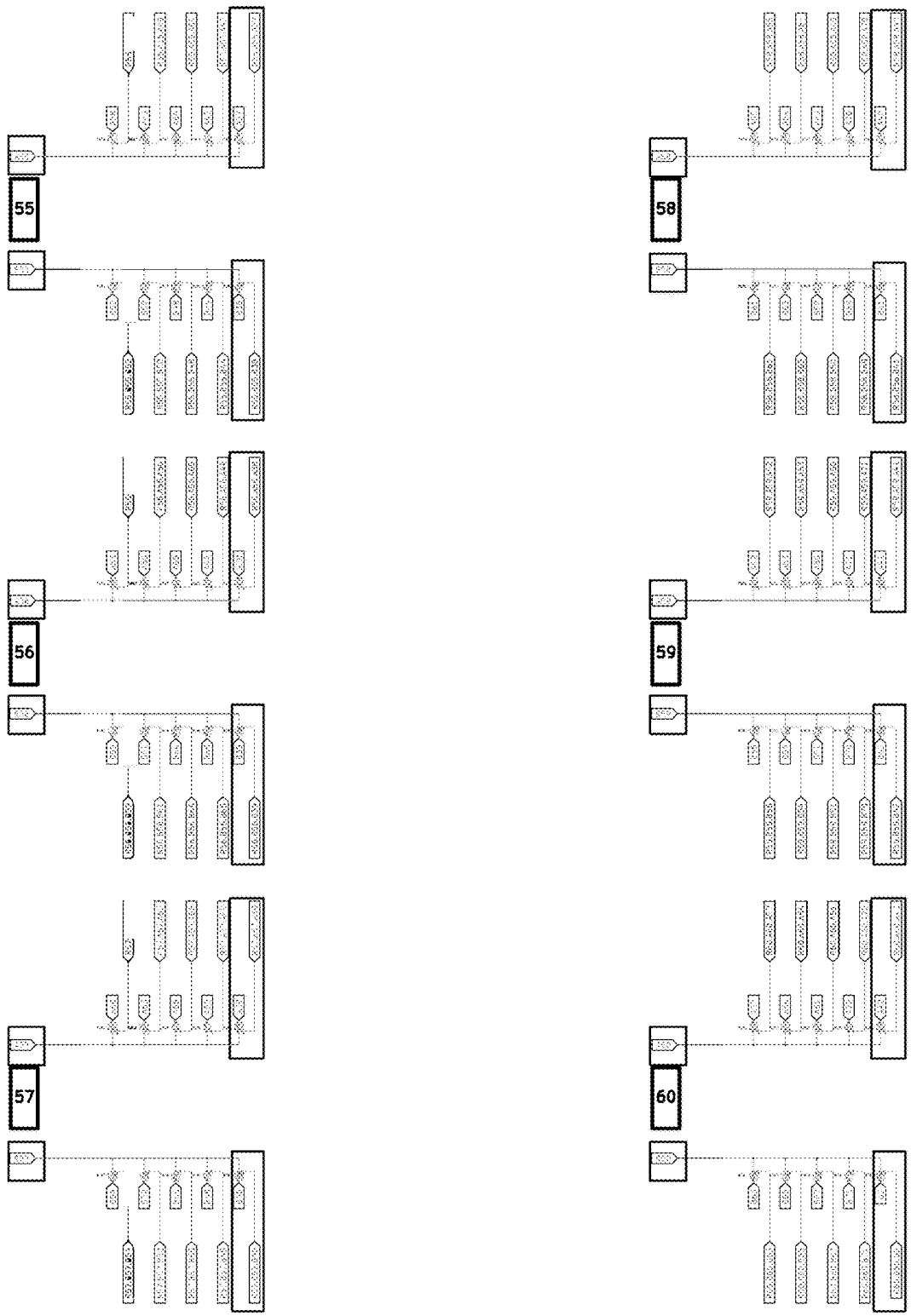
Figure 21K:
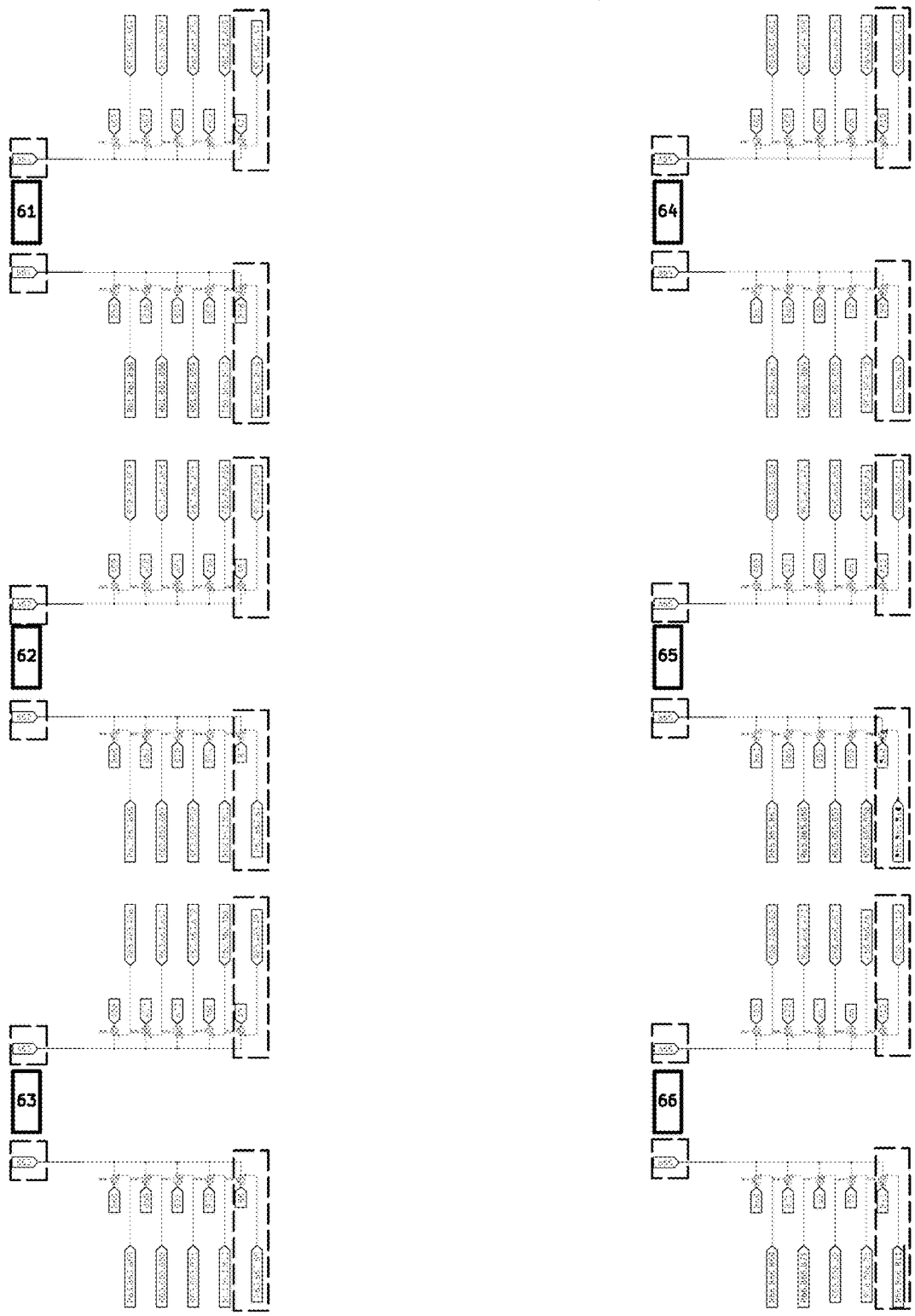
Figure 21L:
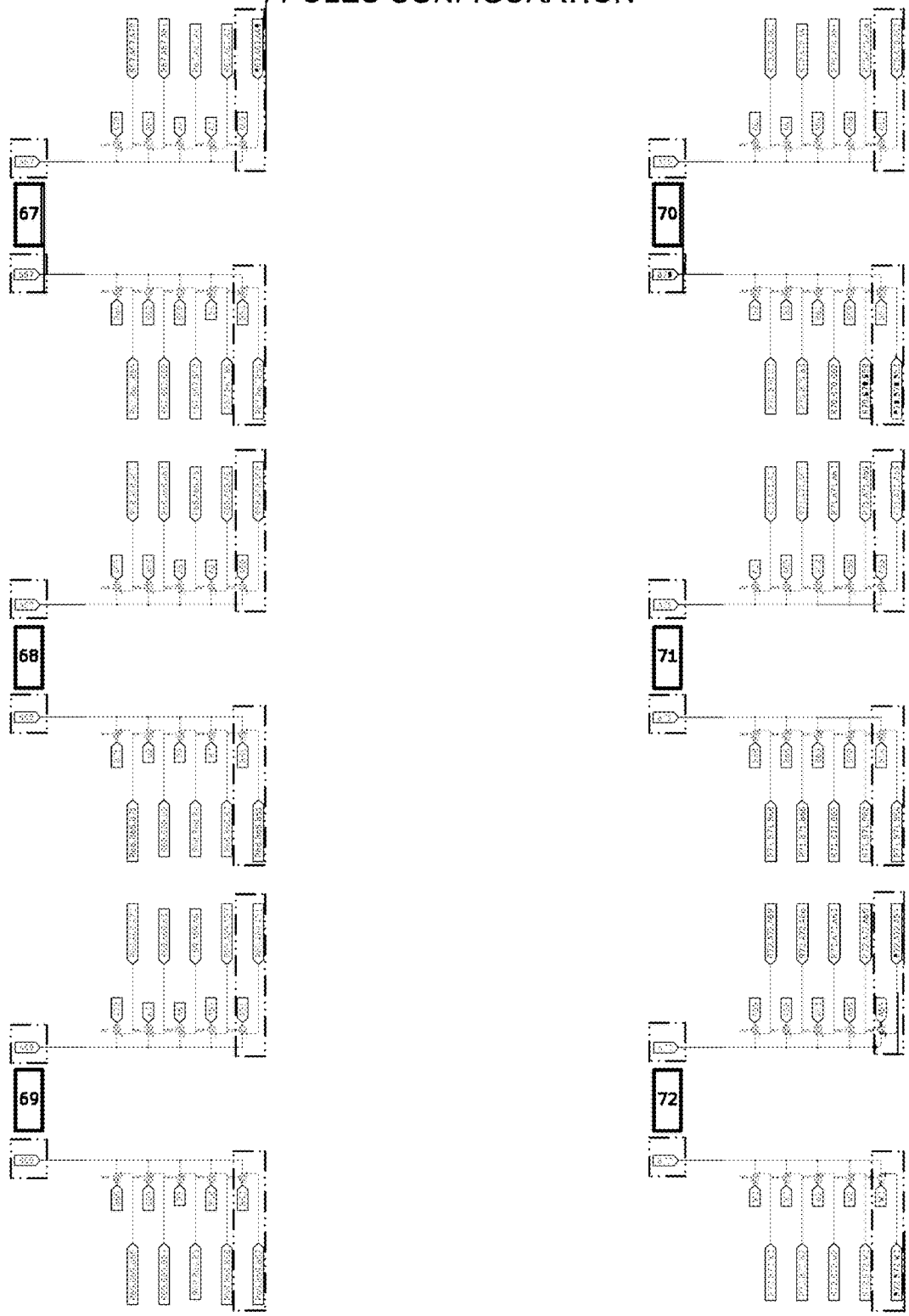

FIG. 20 illustrates a winding diagram for a configuration of the electric motor with 4 poles in accordance with aspects of this disclosure.

FIGS. 21A-21L illustrate the switching panel slots for a configuration of the electric motor with 4 poles in accordance with aspects of this disclosure.

Conclusion

It is to be understood that not necessarily all objects or advantages may be achieved in accordance with any particular embodiment described herein. Certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language used herein, such as, among others, "can," "might," "may," "e.g.," "for example," and the like, unless specifically stated otherwise, or otherwise understood within the context as used, is generally intended to convey that certain embodiments include, while other embodiments do not include, certain features, elements, or states. Thus, such conditional language is not generally intended to imply that features, elements or states are in any way required for one or more embodiments.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Such disjunctive language is not generally intended to, and should not, imply that certain embodiments require at least one of X, at least one of Y, and at least one of Z to each be present. Thus, the term "or" is used in its inclusive sense (and not in its exclusive sense) so that when used, for example, to connect a list of elements, the term "or" means one, some, or all of the elements in the list.

Any process descriptions, elements or blocks in the flow diagrams described herein and/or depicted in the attached figures should be understood as representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The terms "comprising," "including," "having," and the like are synonymous and are used inclusively, in an open-ended fashion, and do not exclude additional elements, features, acts, operations, and so forth.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. An electric motor comprising:
a stator including a plurality of slots, each of the slots housing a magnetic conductive wire;
a rotor configured to rotate in response to a magnetic field generated by the stator; and
an electronic control module electrically coupled to the magnetic conductive wires arranged in the plurality of slots of the stator, the electronic control module comprising:
an electronic switch electrically coupled to each of the magnetic conductive wires; and
a controller configured to control the electronic switch to adjust connections between the magnetic conductive wires to adjust a variable number of poles in the stator.

2. The electric motor of claim 1, wherein the electronic control module is further configured to connect the magnetic conductive wires to form a plurality of separate paths, each path of the plurality of separate paths being connected between a corresponding first voltage and a corresponding second voltage provided by the electronic control module.

3. The electric motor of claim 1, wherein the electronic control module is further configured to connect the magnetic conductive wires in each of the slots to form a plurality of paths that are interleaved with at least two adjacent magnetic conductive wires of the magnetic conductive wires that have a same polarity.

4. The electric motor of claim 1, wherein the electric control module further comprises:
a power supply configured to supply power; and
a step down voltage converter configured to receive the power from the power supply and generate a stepped down voltage;
wherein the controller comprises a field programmable gate array (FPGA) configured to receive the stepped down voltage from the step down voltage converter,
wherein the electronic switch comprises an optocoupler module configured to connect the magnetic conductive wires to form the variable number of poles in the stator, and
wherein the FPGA is configured to control the optocoupler module.

5. The electric motor of claim 4, wherein the FPGA is further configured to:
receive a signal indicative of a requested speed or torque of the electric motor;
determine that the requested speed or torque is outside of a band of efficient output of the electric motor; and
control the optocoupler module to adjust the variable number of poles in the stator in response to determining that the requested speed or torque is outside of a band of efficient output of the electric motor.

6. The electric motor of claim 1, wherein:
each of the magnetic conductive wires has two connectors;
the electronic switch is electrically coupled to each of the two connectors; and
the electronic switch is configured to connect the magnetic conductive wires together to adjust the variable number of poles.

7. The electric motor of claim 6, further comprising:
a plurality of electrical wires configured to electrically connect each of the two connectors to the electronic switch; and
a plurality of electrical cables, each electrical cable of the plurality of electrical cables including a subset of the plurality of electrical wires.

8. The electric motor of claim 1, wherein:
the rotor comprises a squirrel cage configured to provide a static magnetic field,
the plurality of magnetic conductive wires are configured to be connected to an alternating current power source to produce the magnetic field as a rotating magnetic field, and
interaction between the rotating magnetic field and the static magnetic field results in a torque in the rotor.

9. The electric motor of claim 1, further comprising one or more sensors configured to monitor a parameter of the electric motor, wherein adjusting the configuration of the plurality of poles is based at least in part on the monitored parameter of the electric motor.

10. A method of controlling an electric motor, comprising:
receiving, at an electronic control module of the electric motor, a control signal to adjust a variable number of poles in a stator of the electric motor, the stator including a plurality of slots, each of the slots housing a magnetic conductive wire;
coupling an electronic switch of the electric control module to each wire of the plurality of magnetic conductive wires;
controlling, using the electronic control module, the electronic switch to adjust connections between the plurality of magnetic conductive wires to adjust the variable number of poles in the stator; and
providing an alternating current power source to the plurality of magnetic conductive wires to generate a magnetic field that causes a rotor of the electric motor to produce torque.

11. The method of claim 10, further comprising connecting, using the electronic control module, the plurality of magnetic conductive wires to form a plurality of separate paths, each path of the plurality of separate paths being connected between a corresponding first voltage and a corresponding second voltage provided by the electronic control module.

12. The method of claim 10, further comprising connecting, using the electronic control module, the magnetic conductive wires in each of the slots to form a plurality of paths that are interleaved with at least two adjacent magnetic conductive wires of the magnetic conductive wires that have a same polarity.

13. The method of claim 10, wherein the electric control module comprises:
a power supply configured to supply power;
a step down voltage converter configured to receive the power from the power supply and generate a stepped down voltage; and
a field programmable gate array (FPGA) configured to receive the stepped down voltage from the step down voltage converter, wherein the electronic switch comprises an optocoupler module configured to connect the magnetic conductive wires to form the variable number of poles in the stator, and wherein the FPGA is configured to control the optocoupler module.

14. The method of claim 13, further comprising:

receiving, using the FPGA, a signal indicative of a requested speed or torque of the electric motor;

determining, using the FPGA, that the requested speed or torque is outside of a band of efficient output of the electric motor; and controlling, using the FPGA, the optocoupler module to adjust the variable number of poles in the stator in response to determining that the requested speed or torque is outside of a band of efficient output of the electric motor.

15. The method of claim 10, wherein:

each wire of the plurality of magnetic conductive wires has two connectors;

the electronic switch is electrically coupled to each of the two connectors; and the method further comprises connecting, using the electronic switch, the plurality of magnetic conductive wires together to adjust a number of poles of the plurality of poles.

16. The method of claim 10, further comprising monitoring, using one or more sensors, a parameter of the electric motor, wherein adjusting the variable number of poles is at least in part based on the monitored parameter.

17. An electric motor comprising:

a stator including a plurality of slots, each of the slots housing a magnetic conductive wire;

a rotor configured to rotate in response to a magnetic field generated by the stator; and an electronic control module electrically coupled to the magnetic conductive wires arranged in the plurality of slots of the stator, the electronic control module configured to:

connect the magnetic conductive wires to adjust a variable number of poles in the stator, and receive an input indicative of a requested torque of the electric motor, wherein adjusting the variable number of poles in the stator comprises increasing an efficiency of the electric motor for the requested torque.

18. An electric motor comprising:

a stator including a plurality of slots, each of the slots housing a magnetic conductive wire;

a rotor configured to rotate in response to a magnetic field generated by the stator;

one or more sensors configured to monitor a parameter of the electric motor; and an electronic control module electrically coupled to the magnetic conductive wires, the electronic control module configured to connect the magnetic conductive wires to adjust a variable number of poles in the stator based at least in part on the monitored parameter of the electric motor.

* * * * *